(12) United States Patent
Kurniawan et al.

(10) Patent No.: US 12,174,290 B2
(45) Date of Patent: Dec. 24, 2024

(54) TECHNIQUES FOR GENERATING MOTION INFORMATION FOR VIDEOS

(71) Applicant: Amazon Technologies, Inc., Seattle, WA (US)

(72) Inventors: Erick Kurniawan, San Francisco, CA (US); Alexander Jukl, Santa Monica, CA (US); Michael Kalajian, Calabasas, CA (US); Mykyta Sytyi, Chernihiv (UA); Andrii Tytarenko, Kyiv (UA); Oleg Yurchenko, Kyiv (UA); Olha Shkurka, Kyiv (UA); Yevhen Tsyba, Kyiv (UA); Gabriel Carstoiu, Timisoara (RO)

(73) Assignee: Amazon Technologies, Inc., Seattle, WA (US)

( * ) Notice: Subject to any disclaimer, the term of this patent is extended or adjusted under 35 U.S.C. 154(b) by 331 days.

(21) Appl. No.: 17/219,558

(22) Filed: Mar. 31, 2021

(65) Prior Publication Data

US 2022/0268918 A1    Aug. 25, 2022

Related U.S. Application Data

(60) Provisional application No. 63/153,302, filed on Feb. 24, 2021.

(51) Int. Cl.
*G01S 13/86*    (2006.01)
*G01S 13/42*    (2006.01)
(Continued)

(52) U.S. Cl.
CPC ............ *G01S 13/867* (2013.01); *G01S 13/42* (2013.01); *G01S 13/46* (2013.01); *G01S 13/72* (2013.01);
(Continued)

(58) Field of Classification Search
CPC ........ G01S 13/867; G01S 17/86; G01S 13/42; G01S 13/46; G01S 13/72; G01S 13/865;
(Continued)

(56) References Cited

U.S. PATENT DOCUMENTS 4,697,185 A * 9/1987 Thomas ................... G01S 7/298
342/185
4,764,953 A 8/1988 Chern et al.
(Continued)

FOREIGN PATENT DOCUMENTS

CN    2585521    11/2003
CN    2792061    6/2006
(Continued)

OTHER PUBLICATIONS

Office Action for U.S. Appl. No. 17/219,537, mailed on Jan. 9, 2023, Erick Kurniawan, "Techniques for Displaying Motion Information With Videos", 46 pages.
(Continued)

*Primary Examiner* — Peter M Bythrow
*Assistant Examiner* — Nazra Nur Waheed
(74) *Attorney, Agent, or Firm* — Eversheds Sutherland (US) LLP

(57) ABSTRACT

This disclosure describes, in part, techniques for generating location information associated with a video. For instance, an electronic device may use a radar sensor to generate radar data. The electronic device may then analyze the radar data in order to determine a location associated with an object. In some instances, the location may correspond to at least a first coordinate along a first axis and a second coordinate along a second axis. The electronic device may also generate image data using the imaging device. Additionally, the electronic device may analyze the image data in order to determine that the image data represents an object and/or a
(Continued)

type of object. The electronic device may then generate location data representing an identifier for the object and the location. Next, the electronic device may send the image data and the location data to one or more computing devices.

20 Claims, 25 Drawing Sheets

(51) Int. Cl.

| | | |
|---|---|---|
| G01S 13/46 | (2006.01) | |
| G01S 13/72 | (2006.01) | |
| G01S 13/89 | (2006.01) | |
| G01S 17/06 | (2006.01) | |
| G01S 17/86 | (2020.01) | |
| G06T 7/20 | (2017.01) | |
| G06T 7/50 | (2017.01) | |
| G06T 7/70 | (2017.01) | |
| G06T 7/73 | (2017.01) | |
| G06T 11/00 | (2006.01) | |
| G06V 20/52 | (2022.01) | |
| G08B 13/196 | (2006.01) | |
| H04N 5/445 | (2011.01) | |
| H04N 7/18 | (2006.01) | |

(52) U.S. Cl.
CPC .......... *G01S 13/865* (2013.01); *G01S 13/89* (2013.01); *G01S 17/06* (2013.01); *G01S 17/86* (2020.01); *G06T 7/20* (2013.01); *G06T 7/50* (2017.01); *G06T 7/70* (2017.01); *G06T 7/75* (2017.01); *G06T 11/001* (2013.01); *G06V 20/52* (2022.01); *G08B 13/19619* (2013.01); *G08B 13/1966* (2013.01); *H04N 5/445* (2013.01); *H04N 7/183* (2013.01); *G01S 2013/466* (2013.01); *G06T 2200/24* (2013.01); *G06T 2207/10016* (2013.01); *G06T 2207/10028* (2013.01); *G06T 2207/10044* (2013.01); *G06T 2207/30196* (2013.01); *G06T 2207/30232* (2013.01)

(58) Field of Classification Search
CPC .... G01S 13/89; G01S 17/06; G01S 2013/466; G06T 7/50; G06T 7/75; G06T 7/70; G06T 7/20; G06T 11/001; G06T 2200/24; G06T 2207/10016; G06T 2207/10028; G06T 2207/10044; G06T 2207/30196; G06T 2207/30232; G06V 20/52; G08B 13/19619; G08B 13/1966; H04N 5/445; H04N 7/183
See application file for complete search history.

(56) References Cited

U.S. PATENT DOCUMENTS

| | | |
|---|---|---|
| 5,428,388 A | 6/1995 | von Bauer et al. |
| 5,760,848 A | 6/1998 | Cho |
| 6,072,402 A | 6/2000 | Kniffin et al. |
| 6,192,257 B1 | 2/2001 | Ray |
| 6,271,752 B1 | 8/2001 | Vaios |
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,778,351 B1 | 10/2017 | Khosla et al. |
| 9,786,133 B2 | 10/2017 | Harrison et al. |
| 9,799,183 B2 | 10/2017 | Harrison et al. |
| 10,663,302 B1 | 5/2020 | Shen |
| 11,694,452 B1 | 7/2023 | Christopher |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0008081 A1 | 1/2007 | Tylicki et al. |
| 2007/0088488 A1 | 4/2007 | Reeves |
| 2010/0225455 A1 | 9/2010 | Claiborne et al. |
| 2012/0293359 A1* | 11/2012 | Fukuda ............ G01S 13/64 342/107 |
| 2013/0057695 A1 | 3/2013 | Huisking |
| 2014/0267716 A1 | 9/2014 | Child et al. |
| 2015/0035987 A1 | 2/2015 | Fernandez |
| 2015/0163463 A1 | 6/2015 | Hwang et al. |

(56) References Cited

U.S. PATENT DOCUMENTS

| | | | |
|---|---|---|---|
| 2016/0078662 A1 | 3/2016 | Herman et al. | |
| 2016/0125713 A1 | 5/2016 | Blech et al. | |
| 2016/0300476 A1* | 10/2016 | Kasmir | G08B 13/1418 |
| 2019/0279366 A1 | 9/2019 | Sick | |
| 2019/0333233 A1 | 10/2019 | Hu et al. | |
| 2019/0353775 A1* | 11/2019 | Kirsch | G01S 7/4004 |
| 2020/0217948 A1* | 7/2020 | Wang | G01S 13/581 |
| 2021/0117659 A1* | 4/2021 | Foroozan | G06V 10/25 |
| 2021/0125636 A1* | 4/2021 | Ross | H04N 7/183 |
| 2021/0190936 A1* | 6/2021 | Sabripour | G06T 7/0002 |
| 2021/0226810 A1 | 7/2021 | Peng | |
| 2021/0359396 A1 | 11/2021 | Mattheijssen | |
| 2022/0117211 A1 | 4/2022 | Sibley | |

FOREIGN PATENT DOCUMENTS

| | | |
|---|---|---|
| EP | 0944883 | 9/1999 |
| EP | 1480462 | 11/2004 |
| GB | 2286283 | 8/1995 |
| GB | 2354394 | 3/2001 |
| GB | 2357387 | 6/2001 |
| GB | 2400958 | 10/2004 |
| JP | 2001103463 | 4/2001 |
| JP | 2002033839 | 1/2002 |
| JP | 2002125059 | 4/2002 |
| JP | 2002342863 | 11/2002 |
| JP | 2002344640 | 11/2002 |
| JP | 2002354137 | 12/2002 |
| JP | 2002368890 | 12/2002 |
| JP | 2003283696 | 10/2003 |
| JP | 2004128835 | 4/2004 |
| JP | 2005341040 | 12/2005 |
| JP | 2006147650 | 6/2006 |
| JP | 2006262342 | 9/2006 |
| JP | 2009008925 | 1/2009 |
| WO | WO9839894 | 9/1998 |
| WO | WO0113638 | 2/2001 |
| WO | WO0193220 | 12/2001 |
| WO | WO02085019 | 10/2002 |
| WO | WO03028375 | 4/2003 |
| WO | WO03096696 | 11/2003 |
| WO | WO2006038760 | 4/2006 |
| WO | WO2006067782 | 6/2006 |
| WO | WO2007125143 | 11/2007 |

OTHER PUBLICATIONS

Office Action for U.S. Appl. No. 17/219,501, mailed on Oct. 24, 2023, Erick Kurniawan, "Techniques for Providing Motion Information With Videos", 33 pages.

Office Action for U.S. Appl. No. 17/219,501, mailed on Feb. 12, 2024, Erick Kurniawan, "Techniques for Providing Motion Information With Videos", 32 pages.

PCT Search Report and Written Opinion mailed on Jun. 10, 2023, for PCT Application No. PCT/US2022/017760, 11 pages.

PCT International Preliminary Report on Patentability mailed Sep. 7, 2023 for PCT Application No. PCT/US22/17760, 9 pages.

* cited by examiner

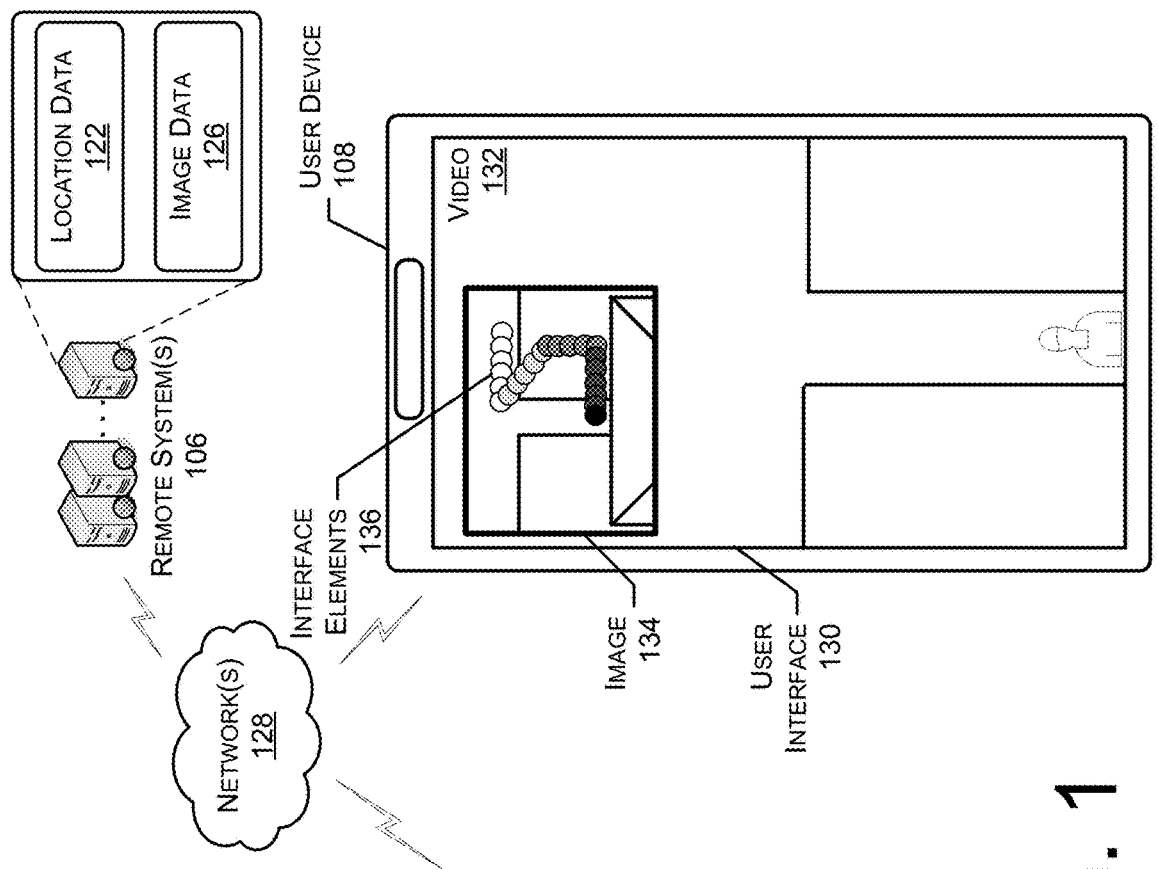
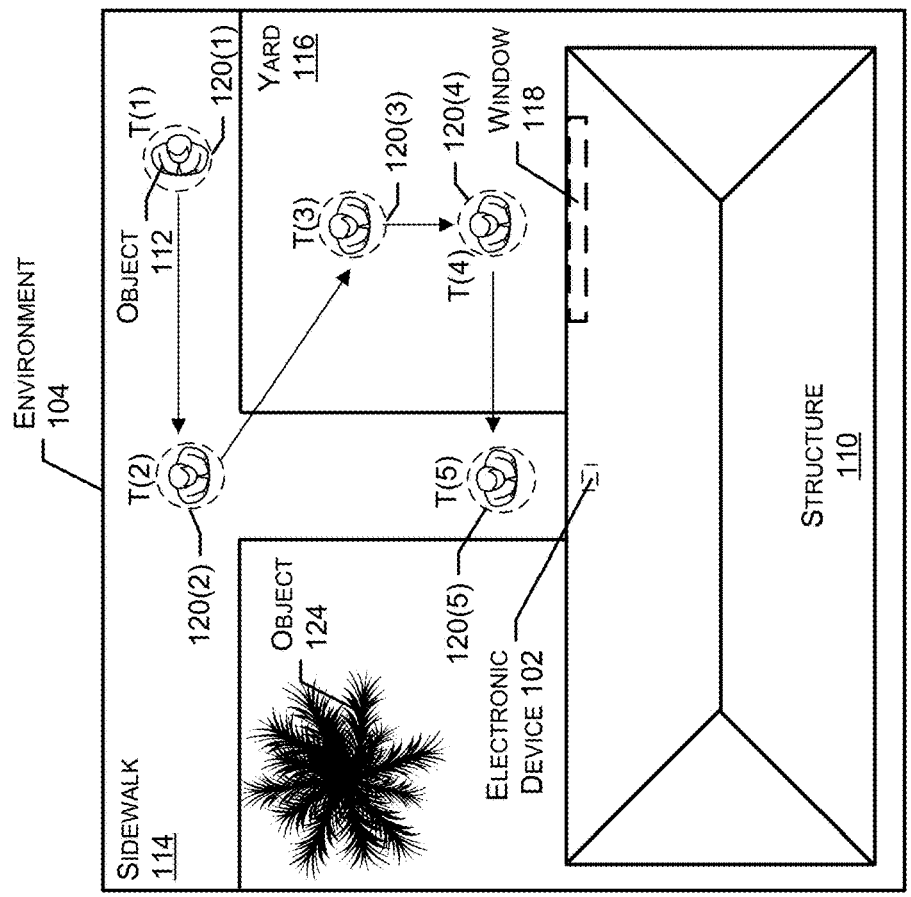
FIG. 1

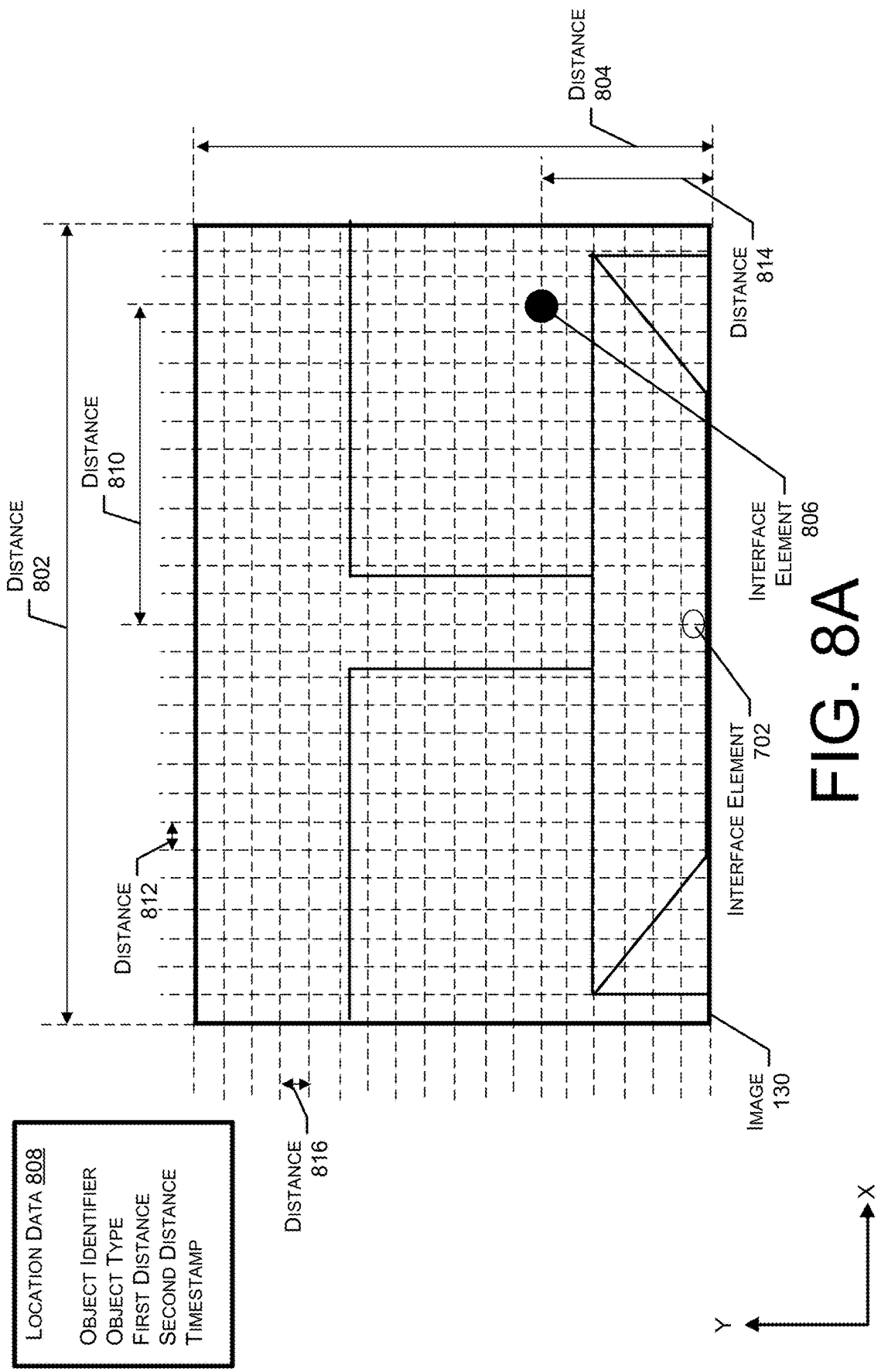

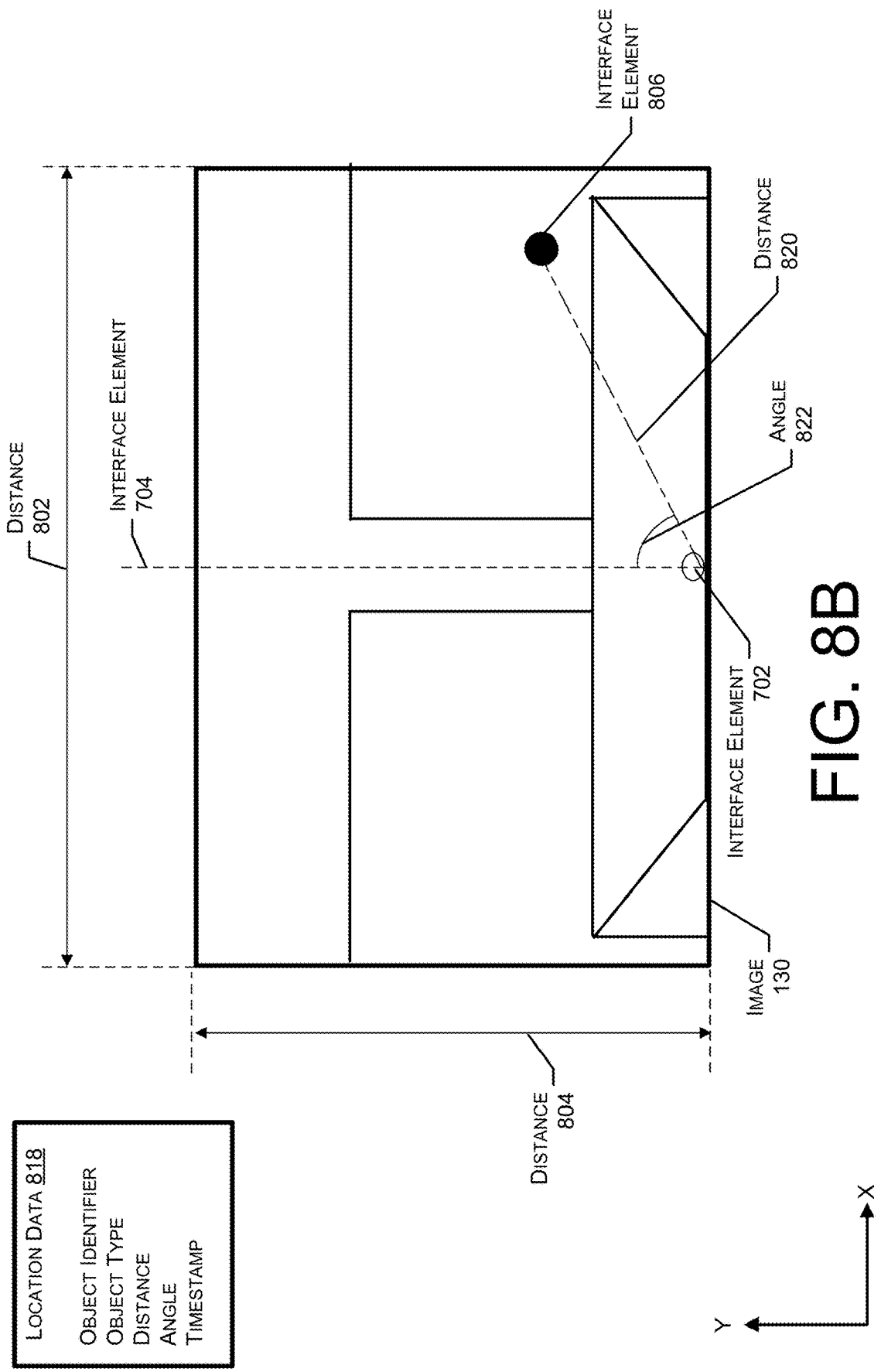

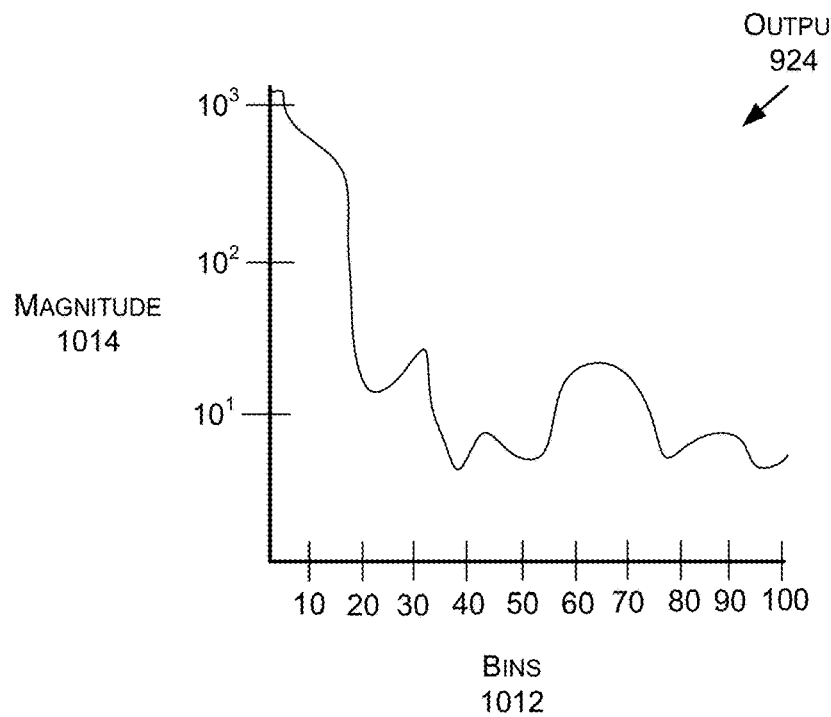
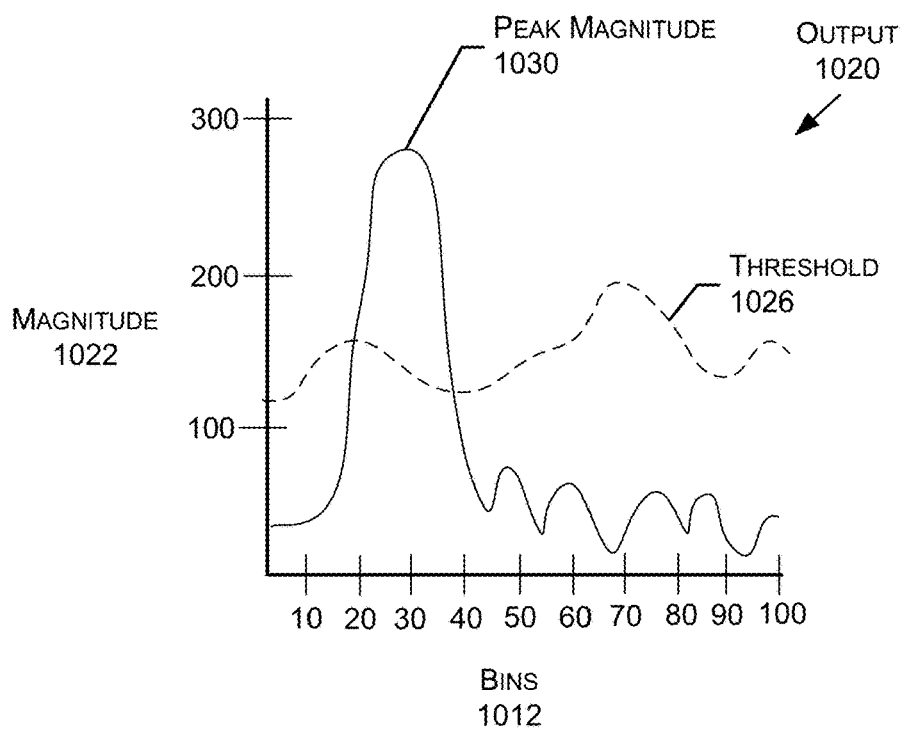
FIG. 10B

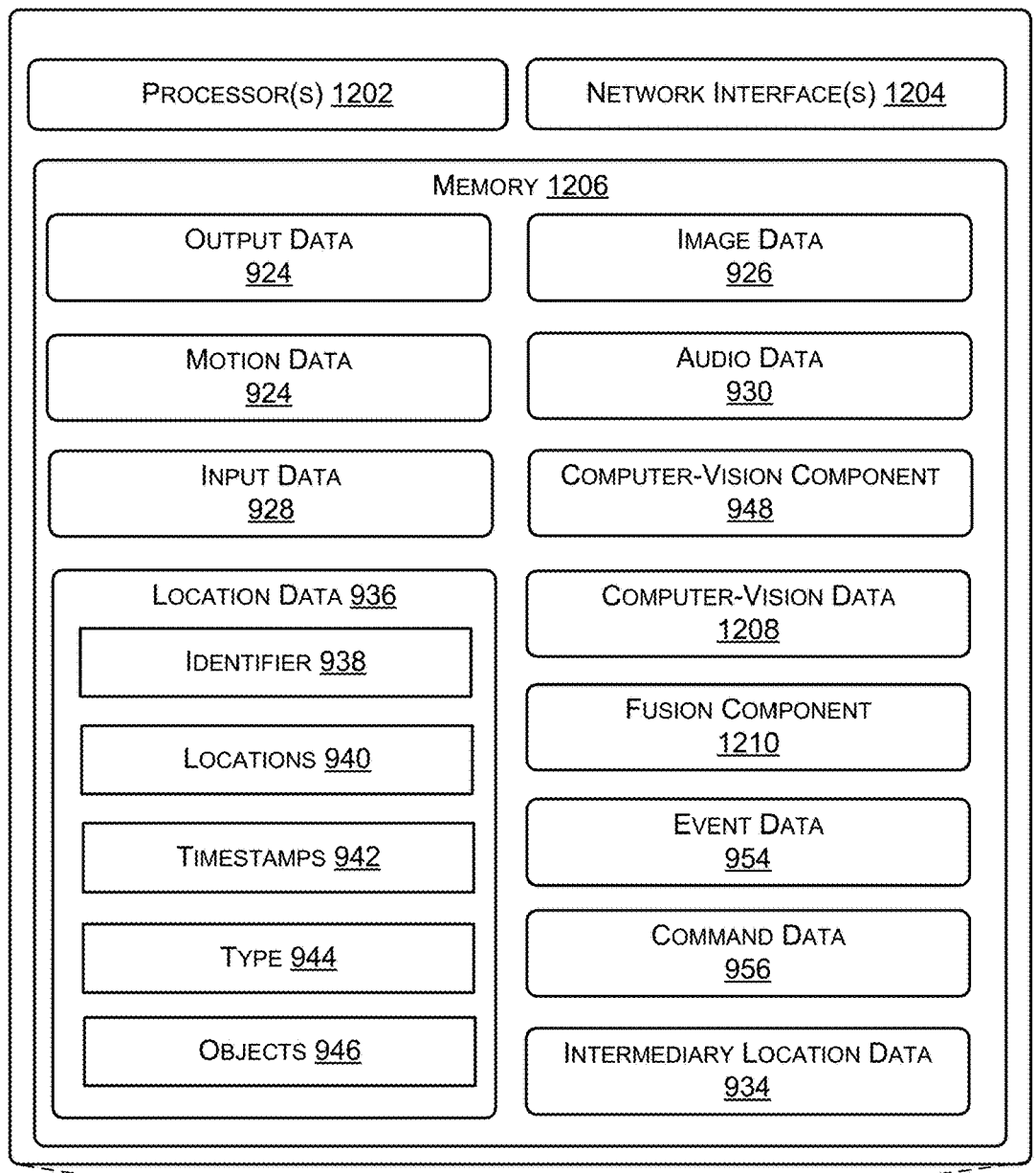
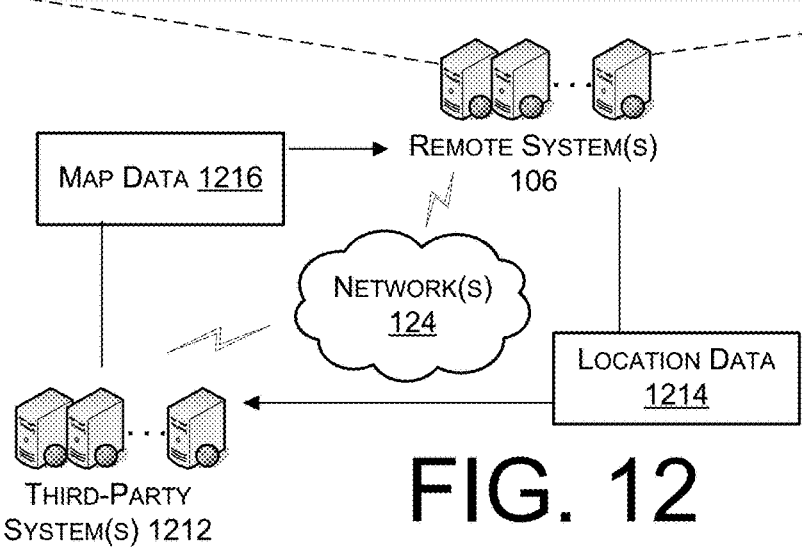
FIG. 12

1400

```
         ( 14A )
            ↓
DETERMINE THAT THE SECOND LOCATION WITHIN THE THRESHOLD
DISTANCE FROM THE ELECTRONIC DEVICE
1418
            ↓
GENERATE IMAGE DATA USING AN IMAGING DEVICE
1420
            ↓
ANALYZE THE IMAGE DATA TO DETERMINE THAT THE IMAGE DATA
REPRESENTS A SECOND OBJECT
1422
            ↓
DETERMINE A THIRD LOCATION ASSOCIATED WITH THE SECOND OBJECT
USING THE IMAGE DATA
1424
            ↓
DETERMINE, BASED AT LEAST IN PART ON THE THIRD LOCATION, THAT THE
SECOND OBJECT CORRESPONDS TO THE FIRST OBJECT
1426
            ↓
SEND THE FIRST LOCATION DATA, THE SECOND LOCATION DATA, AND THE
IMAGE DATA
1428
```

DISPLAY THE SECOND IMAGE
1716

↓

DISPLAY A SECOND INTERFACE ELEMENT AT A SECOND POSITION ON THE MAP, THE SECOND POSITION REPRESENTING THE SECOND LOCATION
1718

```
┌─────────────────────────────────────────────────────────────┐
│  DETERMINE A FIRST LOCATION ASSOCIATED WITH AN ENVIRONMENT  │
│                            1902                             │
└─────────────────────────────────────────────────────────────┘
                              ↓
┌─────────────────────────────────────────────────────────────┐
│ RECEIVE IMAGE DATA REPRESENTING AN IMAGE DEPICTING A GEOGRAPHIC │
│         AREA THAT INCLUDES THE FIRST LOCATION               │
│                            1904                             │
└─────────────────────────────────────────────────────────────┘
                              ↓
┌─────────────────────────────────────────────────────────────┐
│ DETERMINE A POSITION ON THE IMAGE THAT IS ASSOCIATED WITH A │
│         SECOND LOCATION OF AN ELECTRONIC DEVICE             │
│                            1906                             │
└─────────────────────────────────────────────────────────────┘
                              ↓
┌─────────────────────────────────────────────────────────────┐
│ DETERMINE AN ORIENTATION OF THE ELECTRONIC DEVICE WITH RESPECT │
│                       TO THE IMAGE                          │
│                            1908                             │
└─────────────────────────────────────────────────────────────┘
                              ↓
┌─────────────────────────────────────────────────────────────┐
│      CAUSE A STORING OF IMAGE DATA REPRESENTING THE IMAGE   │
│                            1910                             │
└─────────────────────────────────────────────────────────────┘
```

FIG. 19

TECHNIQUES FOR GENERATING MOTION INFORMATION FOR VIDEOS

RELATED APPLICATIONS

This application claims priority to U.S. Provisional Patent Application No. 63/153,302, filed Feb. 24, 2021, titled "Techniques for Providing Motion Information with Videos," the entire contents of which are incorporated herein by reference.

BACKGROUND

A user may place one or more security cameras around the user's property in order to monitor for objects, such as people. For example, a security camera may detect motion of a person and, in response to detecting the motion, begin to record a video of the person. The user is then able to view the recorded video using a user device and determine what the person is doing at the property. In many circumstances, the video may not depict the entire motion of the person at the user's property. For example, before being detected by the security camera, the person may have walked around the user's property, such as to view inside one or more windows or check to see if one or more doors are locked. As such, it may be beneficial for the user to also see the entire motion of the user at the property so that the user is able to get a better understanding of why the person is at the property.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1 illustrates an example of generating, and then providing, location information of an object along with a video recorded by an electronic device, according to various examples of the present disclosure.

FIG. 8A illustrates a first example of determining a position for placing, on an image of geographic area, an interface element indicating a location within the geographic area, according to various examples of the present disclosure.

FIG. 8B illustrates a second example of determining a position for placing, on an image of geographic area, an interface element indicating a location within the geographic area, according to various examples of the present disclosure.

FIG. 10B illustrates an example of determining a distance to an object, according to various examples of the present disclosure.

FIG. 12 illustrates an example architecture of remote system(s), according to various examples of the present disclosure.

FIGS. 14A-14B are a flowchart illustrating an example process for generating location data that corresponds to an object represented by image data, according to various examples of the present disclosure.

FIGS. 17A-17B are a flowchart illustrating an example process for displaying location information associated with a person along with a video depicting the person, according to various examples of the present disclosure.

FIG. 19 is a flowchart illustrating an example process for creating a map of a geographic area that includes an electronic device, according to various examples of the present disclosure.

DETAILED DESCRIPTION

Figure 2:
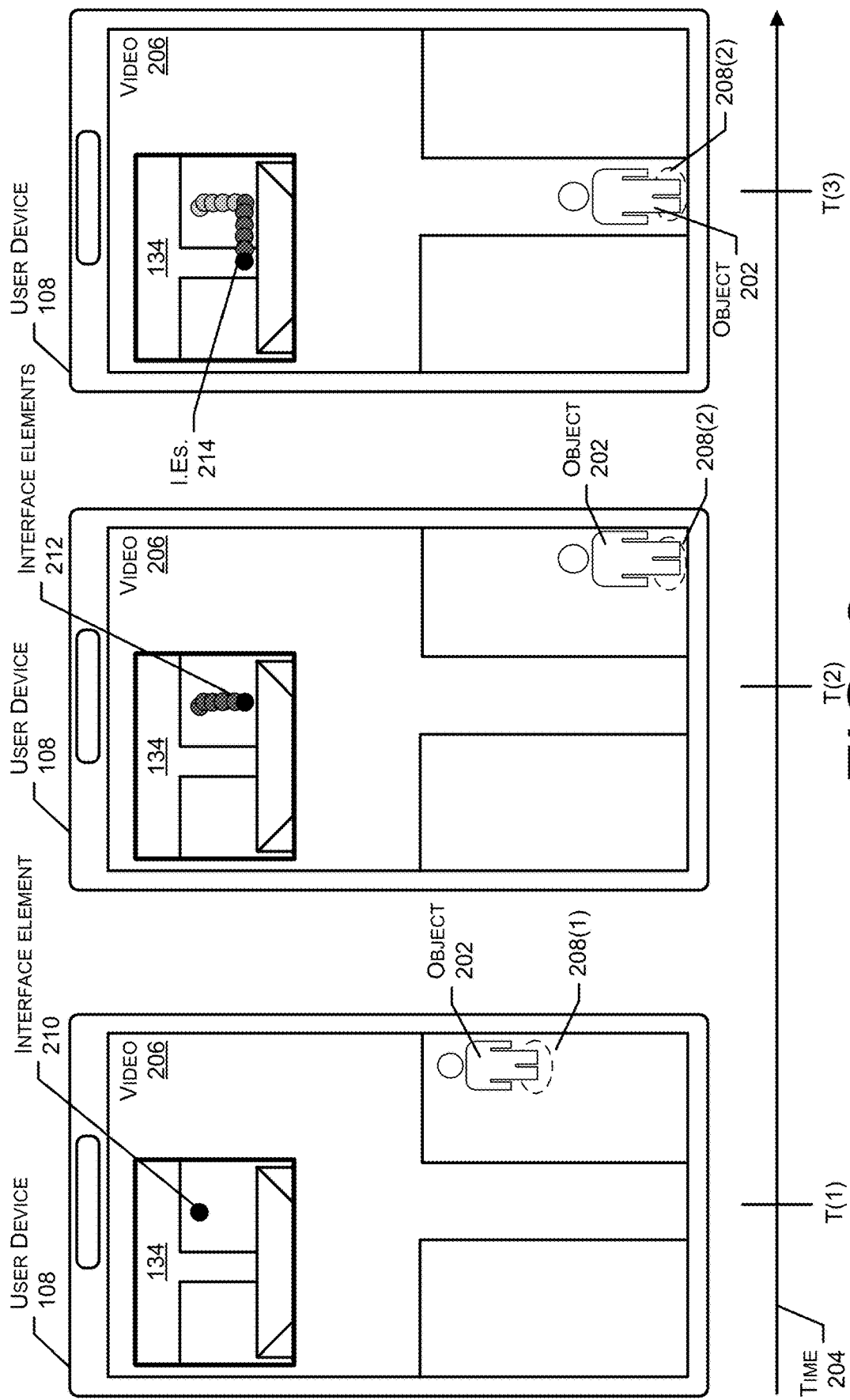
FIG. 2 illustrates an example user interface displaying locations of an object when a user is viewing a "live view" video, according to various examples of the present disclosure.

This disclosure describes, in part, techniques for providing motion information and also displaying the motion information with videos. For example, an electronic device may use one or more location sensors, such as one or more radar sensors, to determine locations of an object(s) relative to the electronic device. The electronic device may then store, in a buffer memory, data (referred to as "location data") representing the locations of the object(s). Additionally, the electronic device may use an imaging device to generate image data and analyze the image data in order to determine an object of interest represented by the image data. The electronic device (and/or remote system(s)) may then match the object to one of the objects detected using the location sensor(s). Based on the match, the remote system(s) may send, to a user device, the image data along with the location data representing the locations of the object. The user device may then use a user interface to display the video represented by the image data. Additionally, along with the video, the user device may display a map of an environment for which the electronic device is located. The electronic device may then use the location data to indicate, on the map, the locations of the object. This way, the user is able to view both the video of the object as well as the location information describing the motion of the object while at the environment.

For example, FIG. 1 illustrates an example of generating, and then providing, location information for an object along with a video recorded by an electronic device 102, according to various examples of the present disclosure. As shown, the example of FIG. 1 includes an environment 104 for which the electronic device 102 is located, remote system(s) 106, and a user device 108. In the example of FIG. 1, the electronic device 102 may be disposed on a structure 110 located on the environment 104. An object 112, which includes a person in the example of FIG. 1, may be walking around the environment 104. For example, the object 112 may initially be walking down a sidewalk 114 between a first time T(1) and a second time T(2). The object 112 may then turn and walk onto a yard 116 associated with the environment 104 between the second time T(2) and a third time T(3). Next, the object 112 may walk closer to the structure 110 between the third time T(3) and a fourth time T(4) in order to look into a window 118 of the structure 110. Finally, between the fourth time T(4) and a fifth time T(5), the object 112 may walk over the front door (not shown) of the structure 110.

While the object 112 is walking around the environment 104, the electronic device 102 may be using a location sensor, such as a radar sensor, in order to determine locations of the object 112 relative to the electronic device 102. For example, at the first time T(1), the electronic device 102 may use the location sensor to determine that the object 112 is located at a first location 120(1) relative to the electronic device 102. The electronic device 102 may then generate location data 122 representing the first location 120(1) of the object 112. Additionally, at the second time T(2), the electronic device 102 may use the location sensor to determine that the object 112 is located at a second location 120(2) relative to the electronic device 102. The electronic device 102 may then generate location data 122 representing the second location 120(2) of the object 112. Additionally, the electronic device 102 may perform similar processes to generate location data 122 representing the third location 120(3) of the object 112 at the third time T(3), the fourth location 120(4) of the object 112 at the fourth time T(4), and the fifth location 120(5) of the object 112 at the fifth time T(5). Furthermore, the electronic device 102 may perform similar processes to generate location data 122 representing locations of the object 112 between the times T(1)-T(5) represented in the example of FIG. 1.

For more detail about the location sensor, the electronic device 102 may include at least a radar sensor that the electronic device 102 uses to determine locations of objects, such as the object 112, within a given distance to the electronic device 102. The given distance may include, but is not limited to, 15 feet, 30 feet, 48 feet, 70 feet, and/or any other distance. To determine the locations of the object 102, the radar sensor includes at least one antenna that is configured to transmit signals and at least two antennas (which may include the at least one antenna) that are configured to receive the signals after the signals are reflected off objects. The at least one antenna may transmit the signals at a given frame rate and/or the at least two antennas may receive the signals at the given frame rate. As described herein, a frame rate for the location sensor may include, but is not limited to, 10 frames per second, 15 frames per second, 30 frames pers second, and/or any other frame rate. After receiving the reflected signals, the radar sensor may process each reflected signal in order to measure how strong the reflected signal is at given distances.

For example, and for a given frame that corresponds to the object 112 located at the first location 120(1), the output from the radar sensor, which may be referred to "output data," may represent the amplitude values at various bins, where each bin corresponds to a given distance from the electronic device. The number of bins may include, but is not limited to, 50 bins, 100 bins, 150 bins, and/or any other number of bins. The distance between each bin may include, but is not limited to, 20 centimeters, 22.5 centimeters, 25 centimeters, 30 centimeters, and/or any other distance. Next, the electronic device 102 may analyze the output data in order to remove reflections of the signals that were caused by stationary objects within the environment 104, such as a tree 124. In order to remove reflections from the stationary objects, the electronic device 102 may subtract at least one previous frame from the given frame. The result of the subtraction may indicate the changes in the amplitude over a period of time (e.g., from frame to frame). The electronic device 102 may then use the results to identify a bin that is associated with a moving object, such as the object 112. Additionally, the electronic device 102 may use the distance associated with the bin to determine the distance to the object 112 at the first location 120(1). The electronic device 102 may perform similar processes over a period of time in order to track the distances of the object 112. In some examples, the electronic device 102 may perform similar processes to track the distances of multiple objects.

The electronic device 102 may also use the horizontal separation of the antennas to determine angle-of-arrival information for each distance bin per frame. For example, if the electronic device 102 takes the maximum peak from each frame as a target, the electronic device 102 may reconstruct how the object 112 moves through the environment 104. Examples of how the radar sensor generates the output data and how electronic device 102 uses the output data to determine the distances and the angles to object(s) are described in more detail with regard to FIGS. 10A-10B.

In some examples, and since each location 120 is represented as polar coordinates (e.g., a distance and range), the electronic device 102 may then convert the polar coordinates for each location 120 into cartesian coordinates. For example, and for the first location 120(1), the electronic device 102 may convert the distance and the range associated with the first location 120(1) to a first cartesian coordinate (e.g., a first distance) along a first axis (e.g., the "x-axis") relative to the electronic device 102 and a second cartesian coordinate (e.g., a second distance) along a second axis (e.g., the y-axis) relative to the electronic device 102. For example, the electronic device 102 may determine the coordinates using the following equations:

$$d \times \cos(a) = \text{first coordinate} \quad (1)$$

$$d \times \sin(a) = \text{second coordinate} \quad (2)$$

In the equations above, d may include the distance and a may include the angle for the first location 120(1). Additionally, in some examples, the electronic device 102 may use the height of the electronic device 102 on the structure 110 when determining the cartesian coordinates. For example, a user may input the height into the user device 108. The user device 108 may then send data representing the height to the remote system(s) 106, which may then send the data to the electronic device 102. The electronic device 102 may then determine a new distance, d', using the height, h, by the following equation:

$$\sqrt{d^2 \times h^2} = d' \quad (1)$$

When using the height to determine the new distance, the electronic device 102 may then use the new distance, d', in equations (1) and (2) above instead of the original distance, d, when determining the cartesian coordinates.

The electronic device 102 may perform similar processes in order to convert the global coordinates for each of the other locations 120 to cartesian coordinates. The electronic device 102 may then generate and store the location data 122 representing the cartesian coordinates in one or more buffers. In some examples, the electronic device 102 stores the location data 122 that is associated with a most recent time period in the one or more buffers. The time period may include, but is not limited to, 5 seconds, 6 seconds, 10 seconds, and/or any other time period. In some examples, the one or more buffers may include a rolling buffer, where the electronic device 102 may begin to override the oldest location data 122 as the electronic device 102 continues to generate and store new location data 122.

The electronic device 102 may also use an imaging device in order to generate image data 126 representing the object 112. In some examples, the electronic device 102 is continuously generating the image data 126 using the imaging device. For example, the electronic device 102 may continuously provide power to the imaging device such that the imaging device is activated (e.g., turned on) and generating the image data 126 at all times. In other examples, the electronic device 102 may begin to generate the image data 126 based on detecting the occurrence of an event. As described herein, an event may include, but is not limited to, detecting an object (e.g., a dynamic object) within a threshold distance to the electronic device 102, receiving an input using an input device (e.g., receiving an input to a button), receiving a command from the remote system(s) 106 to begin generating the image data 126 (which is described in more detail with respect to FIG. 9), and/or any other event. As described herein, a dynamic object may include any object that is moving. For example, a dynamic object may include, but is not limited to, a person, an animal, a car, and/or any other moving object.

In the example of FIG. 1, the electronic device 102 may begin to generate the image data 126 and/or begin to analyze the image data 126 based on detecting motion of the object 112 within a threshold distance to the electronic device 102. For instance, the electronic device 102 may generate the image data 126 and/or begin to analyze the image data 126 based on detecting that the object 112 is located at the second location 120(2) at the second time T(2). The threshold distance may include, but is not limited to, 10 feet, 15 feet, 20 feet, and/or any other distance. In some examples, the electronic device 102 is preprogrammed with the threshold distance. In other examples, the electronic device 102 may receive data representing the threshold distance (e.g., the user of the electronic device 102 may set the threshold distance). In some examples, the electronic device 102 may continue to generate and/or analyze the image data 126 until detecting another event. As described herein, the other event may include, but is not limited to, no longer detecting an object (e.g., a dynamic object) within the threshold distance to the electronic device 102, no longer detecting motion, receiving an additional command from the remote system(s) 106 to cease generating the image data 126, and/or any other type of event.

To analyze the image data 126, the electronic device 102 may use one or more techniques, such as one or more computer-vision and/or object detection techniques (which are described in more detail with regard to FIG. 9), in order to determine that the image data 126 represents a type of object. In some examples, the type of object may include a general object such as, but is not limited to, a person, a vehicle, a package, an animal, and/or any other type of object. Additionally, in some examples, the type of object may include a specific type of object. For example, the type of object may include a specific person (e.g., a parent), a specific animal (e.g., the family dog), a specific type of vehicle (e.g., a delivery truck), and/or the like.

Based on the determination that the image data 126 represents the object 112 (and/or the type of object), the electronic device 102 may determine that the location data 122 is associated with the object 112 represented by the image data 126. For example, and as described in more detail with regard to FIG. 11, the electronic device 102 may generate a hypothesis that the location data 122 is associated with the object 112. The electronic device 102 may then use the locations 120 represented by the location data 122 and the locations of the object 112 determined using the image data 126 to determine a score for the hypothesis. For example, if the locations 120 represented by the location data 122 are similar to the locations of the object 112 determined using the image data 126, then the electronic device 102 may increase the score. However, if the locations 120 represented by the location data 122 are not similar to the locations of the object 112 determined using the image data 126, then the electronic device 102 may decrease the score. The electronic device 102 may then use the score to determine if the location data 122 is associated with the object 112. In the example of FIG. 1, the electronic device 102 may determine, based on the score, that the location data 122 is associated with the object 112.

In some examples, the electronic device 102 may then add additional data to the location data 122 based on determining that the location data 122 is associated with the object 112. The additional data may include, but is not limited to, identifier data associated with the object 112, type data associated with the object 112, timestamp data, and/or the like. As described herein, the identifier data may represent an identifier, such as a numerical identifier, an alphabetic identifier, a mixed numerical and alphabetic identifier, and/or any other type of identifier associated with the object 112. Additionally, the type data may represent the type of the object 112. In some examples, each type of object may be associated with a specific number, letter, and/or the like. For example, a person may be associated with type "0", a vehicle may be associated with type "1", an animal may be associated with type "2", and/or so forth. Furthermore, the timestamp data may represent timestamps for relating the location data 122 with the image data 126.

For example, the timestamp data may indicate that a start of the video represented by the image data 126 (e.g., the first frame of the video) corresponds to a time of "0 seconds". The timestamp data may then indicate times of various portions of the video between the start of the video and the end of the video (e.g., the last frame of the video). In some examples, the various portions may include each frame of the video. In other examples, the various portions may include a given number of frames of the video (e.g., each fifth frame, each tenth frame, etc.). The timestamp data may also indicate portions of the location data 122 that relate to the portions of the video. For example, a portion of the location data 122 that relates to the start of the video may also include a time of "0 seconds". Additionally, a portion of the location data 122 that relates to 5 seconds within the video may include a time of "5" seconds.

As described above, the electronic device 102 may generate location data 122 representing the locations 120 of the object 112 before the electronic device 102 began generating the image data 126 and/or before the electronic device 102 detected the event. As such, the timestamp data associated with these portions of the location data 122 may indicate negative times. For example, if the electronic device 102 generated the location data 122 representing the first location 120(1) of the object at the first time T(1), where the first time T(1) is 5 seconds before the electronic device 102 detected the event at the second time T(2), then this location data 122 may include a timestamp of "−5" seconds. Additionally, if the electronic device 102 generated the location data 122 representing the second location 120(2) of the object at the second time T(2), where the electronic device 102 detected the event at the second time T(2), then this location data 122 may include a timestamp of "0" seconds. Furthermore, if the electronic device 102 generated the location data 122 representing the third location 120(3) of the object at the third time T(3), where the third time T(3) is "5" seconds after the electronic device 102 detected the event at the second time T(2), then this location data 122 may include a timestamp of 5 seconds The electronic device 102 may then send, to the remote system(s) 106 and over network(s) 128, the location data 122 and the image data 126. In some examples, the electronic device sends the location data 122 to the remote system(s) 106 at given time intervals. A given time interval may include, but is not limited to, 100 milliseconds, 500 milliseconds, 1 second, and/or any other time interval. In some examples, the electronic device 102 continues to generate and send, to the remote system(s) 106, the location data 122 associated with the object 112. For a first example, the electronic device 102 may continue to generate and/or send the location data 122 while the electronic device 102 is generating and/or sending the image data 126. For a second example, the electronic device 102 may continue to generate and/or send the location data 122 while the electronic device 102 continues to detect the object 112 using the location sensor. For third example, the electronic device 102 may continue to generate and/or send the location data 122 for a threshold period of time after detecting the object 112 and/or after beginning the sending of the location data 122. The threshold period of time may include, but is not limited to, 10 seconds, 20 seconds, 30 seconds, 1 minutes, and/or any other period of time. Still, for a fourth example, the electronic device 102 may continue to generate and/or send the location data 122 until receive a command from the remote system(s) 106 (which is described in more detail with respect to FIG. 9).

The remote system(s) 106 may then determine that the user device 108 is associated with the electronic device 102. In some examples, the remote system(s) 106 makes the determination that the user device 108 is associated with the electronic device 102 by using user profile data, where the user profile data represents at least an identifier associated with the electronic device 102 and an identifier associated with the user device 108. The remote system(s) 106 may then send, to the user device 108 and over the network(s) 128, the location data 122 and the image data 126. In some examples, such as when the electronic device 102 is still generating new location data 122 and/or new image data 126, the remote system(s) 106 may continue to receive and then send new location data 122 and/or new image data 126 to the user device 108.

In some examples, the remote system(s) 106 send the location data 126 to the user device 108 using the same time interval that the electronic device 102 used to send the location data 122 to the remote system(s) 106. In other examples, the remote system(s) 106 send the location data 122 to the user device 108 using a different time interval than the time interval that the electronic device 102 used to send the location data 122 to the remote system(s) 106. In some examples, the remote system(s) 106 send the data in "real-time" or "near real-time" as the electronic device 102 continues to generate the data. In other examples, the remote system(s) 106 send the data to the electronic device 102 based on receiving a request. For example, the remote system(s) 106 may store the data in one or more memories as the remote system(s) 106 continue to receive the data from the electronic device 102. After storing the data, the remote system(s) 106 may receive, from the user device 108, data representing the request. Based on receiving the request, the remote system(s) 106 may then send the data to the user device 108.

The user device 108 may display, on a display, a user interface 130 that includes a video 132 represented by the image data 126. As shown, the video 132 depicts the object 112 located at the fifth location 120(5). The user device 108 may further display, using a portion of the user interface 130 and/or over the video 132, an image 134 depicting a geographic area that includes at least a portion of the environment 114. For example, and as shown, the image 134 depicts the portion of the structure 110 (e.g., the front of the structure 110) for which the electronic device 102 is located. The image 134 further represents the sidewalk 114 and the yard 116 that are located within the FOV of the imaging device and/or the FOV of the location sensor. Additionally, and as described herein, the image 134 may be scaled such that the image 134 represents specific dimensions at least along a first axis (e.g., the x-axis) and a second axis (e.g., the y-axis).

The user device 108 may then use the location data 122 to display interface elements 136 representing locations of the object 112 as detected by the electronic device 102. As descried herein, an interface element may include, but is not limited to, a graphic (e.g., a line, a circle, a triangle, a square, and/or any other shape graphic), a number, a letter, an image, a button, a document, and/or any other type of content that may be displayed by the user interface. For instance, and as discussed in more detail with regard to FIG. 8A, the user device 108 may use a scale associated with the image 134 along with the first location 120(1) of the object 112 represented by the location data 122 in order to determine a position on the image 134 for placing an interface element 136 that represents the first location 120(1).

For example, and as discussed above, the location data 122 may represent the first cartesian coordinate (e.g., a first distance) along a first axis (e.g., the "x-axis") relative to the electronic device 102 and the second cartesian coordinate (e.g., a second distance) along a second axis (e.g., the y-axis) relative to the electronic device 102. Additionally, since the image 134 is scaled to specific dimensions, the user device 108 may determine that a first number of pixels represents the first distance along the first axis and that a second number of pixels represents the second distance along the second axis. The user device 108 may then determine the position for placing the interface element 136 as the first number of pixels from the position of the electronic device 102 along the first axis and the second number of pixels from the position of the electronic device 102 along the second axis within the image 134. The user device 108 may perform similar processes for each of the other locations 120 represented by the location data 122 in order to determine the positions for placing the interface elements 136.

In the example of FIG. 1, the interface elements 136 include graphical icons in the shape of circles. However, in other examples, the interface elements 136 may include any other type of interface element described herein. As shown, different groups of the interface elements 136 may include specific characteristics. As described herein, a characteristic may include, but is not limited to, a color, a shade, a shape, a size, and/or any other type of characteristic. For example, the interface element 136 that represents the object 112 located at the fifth location 120(5) (e.g., a current location) at the fifth time T(5) includes a first color (e.g., a first characteristic). Additionally, the interface elements 136 that represent the locations 120 of the object 112 between the fourth location 1204(4) at the fourth time T(4) and the fifth location 120(5) at the fifth time T(5) include a second color (e.g., a second characteristic). Furthermore, the interface elements 136 that represent the locations 120 of the object 112 between the third location 120(3) at the third time T(3) and the fourth location 120(4) at the fourth time T(4) include a third color (e.g., a third characteristic). Moreover, the interface elements 136 that represent the locations 120 of the object 112 between the second location 120(2) at the second time T(2) and the third location 120(3) at the third time T(3) include a fourth color (e.g., a fourth characteristic). Finally, the interface elements 136 that represent the locations 120 of the object 112 between the first location 120(1) at the first time T(1) and the second location 120(2) at the second time T(2) include a fifth color (e.g., a fifth characteristic).

The characteristics of the interface elements 136 may indicate the direction of movement of the object 112 at the environment 104. For example, the first characteristic may indicate the current location 120(5) of the object 112 at the environment 104. Additionally, the second characteristic may indicate the locations 120 of the object 112 during a first previous period of time that is between the fourth time T(4) and the fifth time T(5). Furthermore, the third characteristic may indicate the locations 120 of the object 112 during a second previous period of time that is between the third time T(3) and the fourth time T(4). Moreover, the fourth characteristic may indicate the locations 120 of the object 112 during a third previous period of time that is between the second time T(2) and the third time T(3). Finally, the fifth characteristic may indicate the locations 120 of the object 112 during a fourth previous period of time that is between the first time T(1) and the second time T(2).

In some examples, the periods of time that the user device 108 uses for changing the characteristics of the interface elements 136 may be equal to one another. For example, each period of time may include, but is not limited to, two seconds, five seconds, ten second, and/or any other period of time. In some examples, as the user device 108 continues to receive new location data 122 representing new locations of the object 112 at the environment 104, the user device 108 may continue to add new interface elements 136 representing the new locations to the image 134. Additionally, the user device 108 may continue to change the characteristics of the current interface elements 136 to indicate that the current interface elements 136 then represent older locations of the object 112 at the environment 104.

Figure 3:
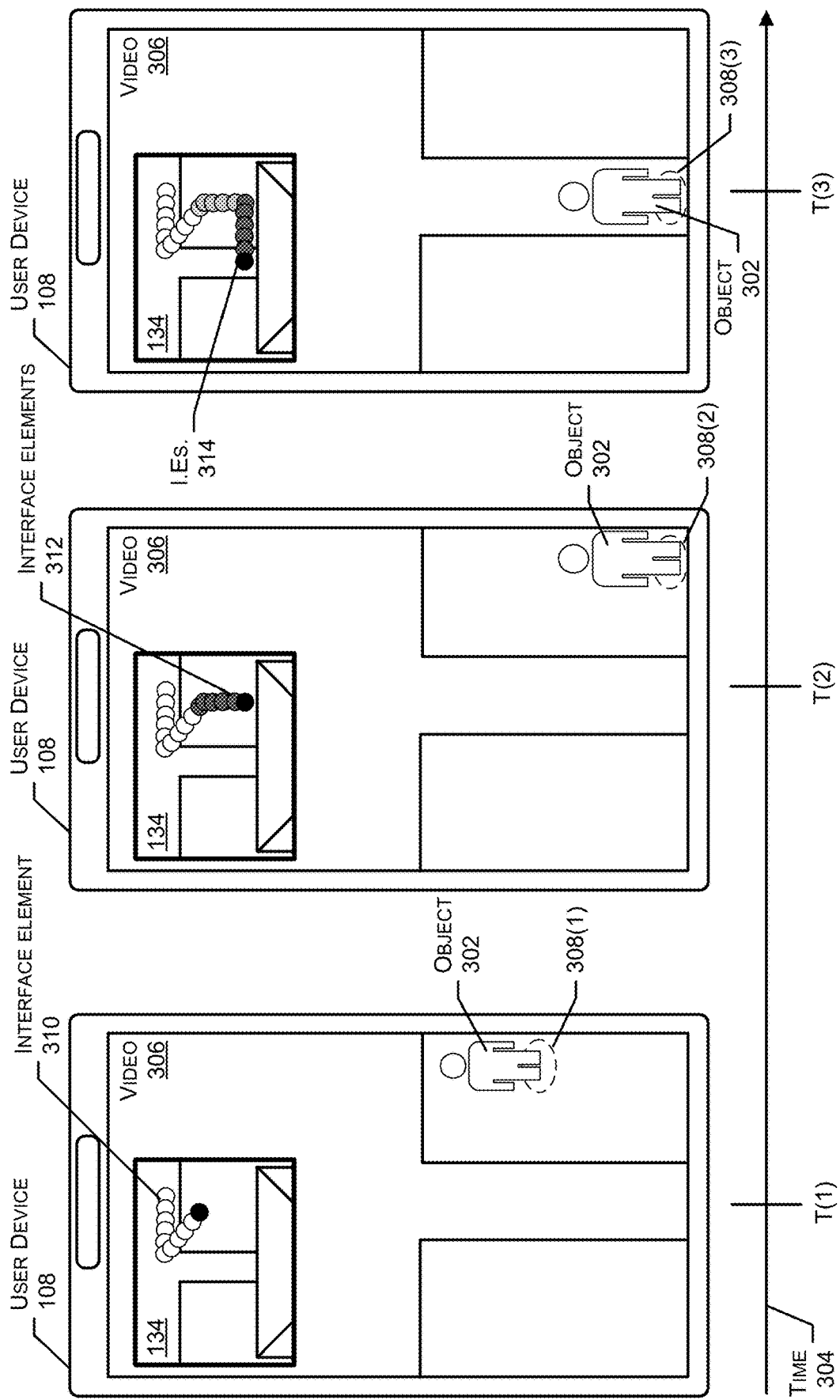
FIG. 3 illustrates an example user interface displaying locations of an object that occurred before an electronic device began generating a video depicting the object, according to various examples of the present disclosure.
Figure 4:
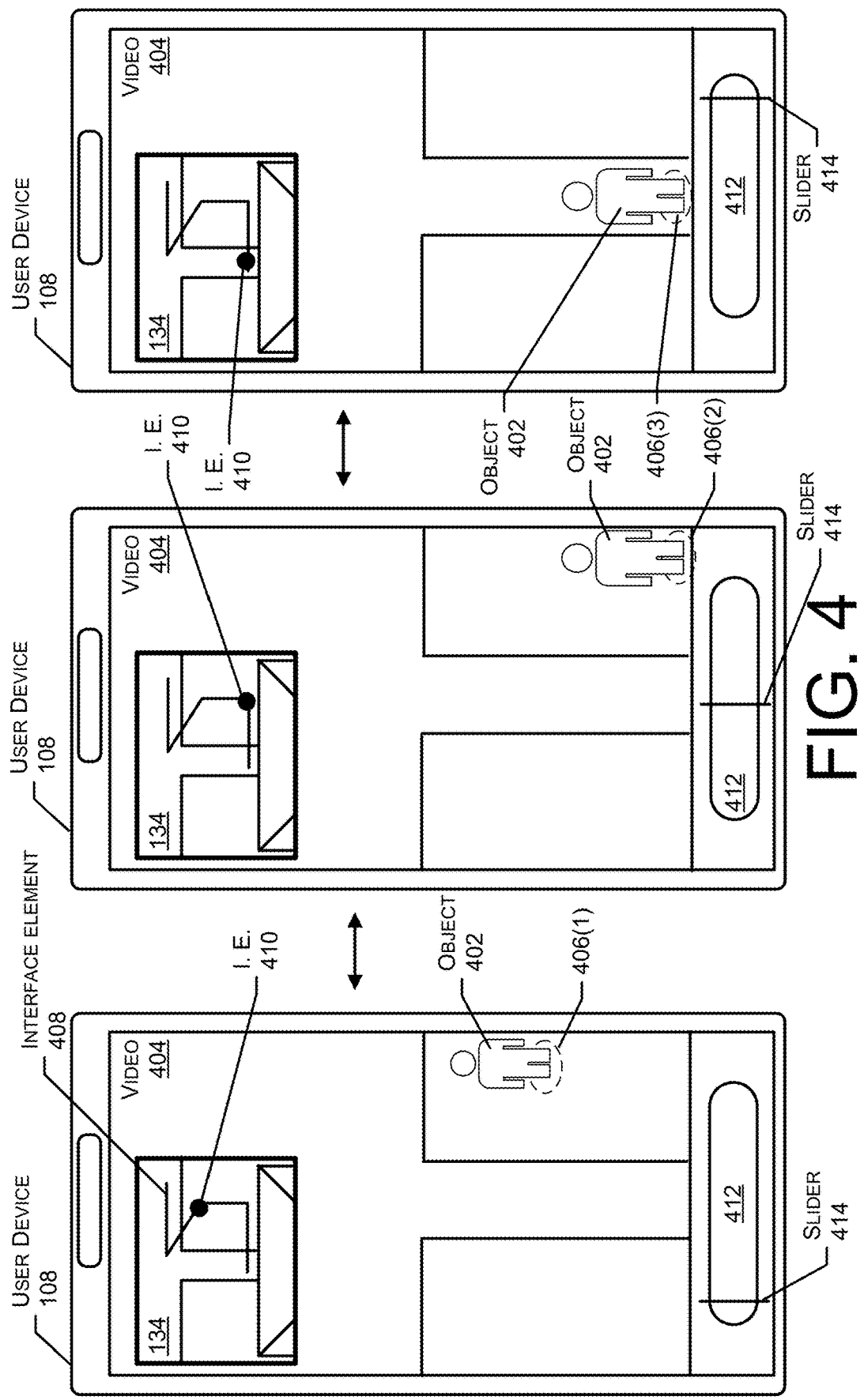
FIG. 4 illustrates an example user interface displaying locations of an object along with a video previously generated by an electronic device, according to various examples of the present disclosure.

In some examples, the user device 108 may use different techniques for displaying the locations of objects, which are illustrated in the examples of FIGS. 2-4. For a first example, FIG. 2 illustrates an example of the user device 108 displaying locations of an object 202 when the user device 108 requests a "live view" generated by the electronic device 102. In such an example, to view the live view, the user device 108 may send, to the remote system(s) 106, data representing a request to receive the image data. In examples where the electronic device 102 is continuously generating the image data, the remote system(s) 106 may then send, to the electronic device 102, data representing a request for the image data being generated by the electronic device 102. However, in examples where the electronic device 102 does not continuously generate the image data, the remote system(s) 106 may send, to the electronic device 102, data representing a request to activate the imaging device in order to generate the image data. In either of the examples, the remote system(s) 106 may then begin to receive, from the electronic device 102, the image data and the location data and then send the image data and the location data to the user device 108.

As shown by the example of FIG. 2 that occurs over a period of time 204, at a first time T(1), the electronic device 102 may receive first image data representing a first portion of a video 206. As shown, the first portion of the video 206 depicts the object 202 located at a first location 206(1) at the environment 104. The user device 108 may also receive first location data representing the first location of the object 202 as determined using the location sensor. The user device 108 may then display a first interface element 210 representing the first location 206(1) (e.g., the current location) of the object 202 at the environment 104. Since, in the example of FIG. 2, the user device 108 requested the live view, there may only be a single location of the object 202 at the first time T(1). Additionally, since the first interface element 210 represents the current location of the object 202, the first interface element 210 may include a first characteristic (e.g., black circle).

Next, the user device 108 may continue to receive second image data between the first time T(1) and a second time T(2). As shown at the second time T(2), the second image data may represent a second portion of the video 206, which now depicts the object 202 located at a second location 206(2) at the environment 104. The user device 108 may also receive second location data that represents second locations of the object 202 between the first time T(1) and the second time T(2) as determined using the location sensor. The user device 108 may then display second interface elements 212 representing the second locations of the object 202 at the environment 104. As shown, the second interface element 212 that represents the current location of the object 202 includes the first characteristic (e.g., black circle). Additionally, the second interface elements 212 that represent previous locations of the object 202 between the first time T(1) and the second time T(2) include a second characteristic (e.g., dark grey circles). Furthermore, the first interface element 210 that represents the first location 206(1) of the object 202 at the first time T(1) now includes the second characteristic (e.g., dark grey circle).

Next, the user device 108 may continue to receive third image data between the second time T(2) and a third time T(3). As shown at the third time T(3), the third image data may represent a third portion of the video 206, which now depicts the object 202 located at a third location 206(3) at the environment 104. The user device 108 may also receive third location data that represents third locations of the object 202 between the second time T(2) and the third time T(3) as determined using the location sensor. The user device 108 may then display third interface elements 214 representing the third locations of the object 202 at the environment 104. As shown, the third interface element 214 that represents the current location of the object 202 includes the first characteristic (e.g., black circle). Additionally, the third interface elements 214 that represent previous locations of the object 202 between the second time T(2) and the third time T(3) include the second characteristic (e.g., dark grey circles). Furthermore, the second interface elements 212 that represent the second locations of the object 202 between the first time T(1) and the second time T(2) include a third characteristic (e.g., light grey circles). Moreover, the first interface element 210 that represents the first location 206(1) of the object 202 at the first time T(1) now also includes the third characteristic (e.g., light grey circle).

In the example of FIG. 2, by updating the interface elements 210-214 representing the locations of the object 202 as new location data is received, the user device 108 is able to indicate the motion of the object 202 at the environment 104. For instance, a user of the user device 108 is able to determine the motion of the object 202 based on the characteristics of the interface elements 210-214 since the characteristics indicate the times at which the object 202 was located at the locations indicated by the interface elements 210-214.

For a second example, FIG. 3 illustrates an example of the user device 108 displaying locations of an object 302 that occurred before the electronic device 102 began generating image data representing the object 302 and/or before the electronic device 102 detected an event. In such an example, the electronic device 102 may begin to determine, using the location sensor, locations of the object 302 before the electronic device 102 begins to generate the image data representing the object 302 and/or before the electronic device 102 detected the event. The electronic device 102 may also begin to generate and then store location data representing these locations of the object 302. Next, based on the occurrence of an event, such as detecting the object 302 located within a threshold distance to the electronic device 102, the electronic device 102 may then begin to generate and/or send the image data while continuing to generate the location data representing the locations of the object 302. The electronic device 102 may also begin to send the location data and image data to the remote system(s) 106. Additionally, the remote system(s) 106 may begin to send the location data and the image data to the user device 108.

For instance, and shown by the example of FIG. 3 that occurs over a period of time 304, at a first time T(1), the electronic device 102 may receive first image data representing a first portion of a video 306. As shown, the first portion of the video 306 depicts the object 302 located at a first location 308(1) at the environment 104. The user device 108 may also receive first location data representing first locations of the object 302 as determined using the location sensor. The user device 108 may then display first interface elements 310 representing the first locations of the object 302 at the environment 104. Since, in the example of FIG. 3, the first location data represents both the previous locations of the object 302 as well as the first location 308(1) of the object 302 (e.g., the current location of the object 302), the first interface elements 310 include different characteristics. More specifically, the first interface elements 310 that represent the previous locations of the object 302 before the first time T(1) include a first characteristic (e.g., white circles) while the first interface element 310 that represents the current location of the object 302 includes a second characteristic (e.g., black circle).

Next, the user device 108 may continue to receive second image data between the first time T(1) and a second time T(2). As shown at the second time T(2), the second image data may represent a second portion of the video 306, which now depicts the object 302 located at a second location 308(2) at the environment 104. The user device 108 may also receive second location data that represents second locations of the object 302 between the first time T(1) and the second time T(2) as determined using the location sensor. The user device 108 may then display second interface elements 312 representing the second locations of the object 302 at the environment 104. As shown, the second interface element 312 that represents the current location of the object 302 includes the second characteristic (e.g., black circle). Additionally, the second interface elements 312 that represent previous locations of the object 202 between the first time T(1) and the second time T(2) include a third characteristic (e.g., dark grey circles). Furthermore, the first interface element 310 that represents the first location 308(1) of the object 302 at the first time T(1) now includes the third characteristic (e.g., dark grey circle). However, in the example of FIG. 3, the first interface elements 310 that represent the previous locations of the object 302 before the first time T(1) still include the first characteristic (e.g., white circles).

Next, the user device 108 may continue to receive third image data between the second time T(2) and a third time T(3). As shown at the third time T(3), the third image data may represent a third portion of the video 306, which now depicts the object 302 located at a third location 308(2) at the environment 104. The user device 108 may also receive third location data that represents third locations of the object 302 between the second time T(2) and the third time T(3) as determined using the location sensor. The user device 108 may then display third interface elements 314 representing the third locations of the object 302 at the environment 104. As shown, the third interface element 314 that represents the current location of the object 302 includes the first characteristic (e.g., black circle). Additionally, the third interface elements 314 that represent previous locations of the object 302 between the second time T(2) and the third time T(3) include the third characteristics (e.g., dark grey circles). Furthermore, the second interface elements 312 that represent the second locations of the object 302 between the first time T(1) and the second time T(2) include a fourth characteristic (e.g., light grey circles). Moreover, the first interface element 308 that represents the first location of the object 302 at the first time T(1) now also includes the fourth characteristic (e.g., light grey circle). However, in the example of FIG. 3, the first interface elements 308 that represents the previous locations of the object 302 before the first time T(1) still include the first characteristic (e.g., white circles).

In the example of FIG. 3, by updating the interface elements 310-314 representing the locations of the object 302 as new location data is received, the user device 108 is able to indicate the motion of the object 302 at the environment 104. Additionally, by maintaining the first characteristic of the first interface elements 310 that represent the locations of the object 302 before the first time T(1), the user device 108 is able to indicate the motion of the object 302 that occurred at the environment 104 and which is not represented by the image data. This way, the user of the user device 108 is able to determine the previous locations of the object 302 even when the image data does not represent these previous locations.

For a third example, FIG. 4 illustrates an example of the user device 108 displaying locations of an object 402 when the user device 108 requests to view the image data after the electronic device 102 is finished generating the image data. In such an example, the electronic device 102 may generate the location data representing the locations of the object 402 and the image data representing the object 402. The electronic device 102 may then send the location data and the image data to the remote system(s) 106. Based on receiving the location data and the image data, the remote system(s) 106 may store the location data and the image data in one or more memories. Additionally, the remote system(s) 106 may send, to the user device 108, a notification indicating an event associated with the image data. Later, when a user wishes to view a video 404 represented by the image data, the user device 108 may send, to the remote system(s) 106, data representing a request for the image data associated with the event. In response, the user device 108 may receive, from the remote system(s) 106, the location data and the image data.

As shown by the example of FIG. 4, the user device 108 may display a first interface element 408 that represents the entire motion of the object 402 at the environment 104. The user device 108 may also update the location of a second interface element 410 to relate the current position within the video 404 to the corresponding location of the object 402. For instance, and as shown by the left illustration of the user device 108, the user device 108 may be displaying a first portion (e.g., a first frame) of the video 404 that depicts the object 402 located at a first location 406(1) at the environment 104. The user device 108 may also display the second interface element 410 located at a first position on the first interface element 408, where the first position corresponds to the first location 406(1) of the object 402.

Additionally, and as shown by the middle illustration of the user device 108, the user device 108 may be displaying a second portion (e.g., a second frame) of the video 404 that depicts the object 402 located at a second location 406(2) at the environment 104. The user device 108 may also display the second interface element 410 located at a second position on the first interface element 408, where the second position corresponds to the second location 406(2) of the object 402. Furthermore, and as shown by the right illustration of the user device 108, the user device 108 may be displaying a third portion (e.g., a third frame) of the video 404 that depicts the object 402 located at a third location 406(3) at the environment 104. The user device 108 may also display the second interface element 410 located at a third position on the first interface element 408, where the third position corresponds to the third location 406(3) of the object 402.

In some examples, the user device 108 may use the timestamp data to determine the positions for the second interface element 408. For example, the start of the video 404 (e.g., the first frame of the video 404) may depict the object 402 located at the first location 406(1). The timestamp data may indicate that the start of the video 404 corresponds to time "0 seconds". Additionally, the timestamp data may indicate that the first location 406(1) represented by the location data also corresponds to time "0 seconds". As such, when displaying the start of the video 404, which is again illustrated by the left illustration of the user device 108, the user device 108 may analyze the timestamp data to determine that the first location 406(1) represented by the location data corresponds to the start of the video 404. The user device 108 may thus display the second interface element 410 at the first position on the first interface element 408.

Next, the middle of the video 404 (e.g., the middle frame of the video 404) may depict the object 402 located at the second location 406(2). The timestamp data may indicate that the middle of the video 404 corresponds to time "5 seconds". Additionally, the timestamp data may indicate that the second location 406(2) represented by the location data also corresponds to time "5 seconds". As such, when displaying the middle of the video 404, which is again illustrated by the middle illustration of the user device 108, the user device 108 may analyze the timestamp data to determine that the second location 406(2) represented by the location data corresponds to the middle of the video 404. The user device 108 may thus display the second interface element 410 at the second position on the first interface element 408. Additionally, the user device 108 may perform similar processes for other portions of the video 404.

As further illustrated in the example of FIG. 4, the user device 108 may display a time bar 412 that the user may use to move to different portions of the video 404. For instance, the user device 108 may receive input representing a selection and a movement of a slider 414 associated with the time bar 410. The movement of the slider 414 may cause the user device 108 to move backward or forward to different portions of the video 404. For instance, in the left illustration of the user deice 108, the slider 414 is located at a left portion of the time bar 412 indicating that the first portion of the video 404 represents a start of the video 404. Additionally, in the middle illustration of the user device 108, the slider 414 is located at a middle portion of the time bar 412 indicating that the second portion of the video 404 represents a middle of the video 404. Furthermore, in the right illustration of the user device 108, the slider 414 is located at a right portion of the time bar 412 indicating that the third portion of the video 404 represents the end of the video 404.

While the examples of FIGS. 2-4 illustrate the image 134 as being located in a top-left corner of the user interface, in other examples, the image 134 may be located at a different location on the user interface. For example, the image 134 may be located on a first portion of the display, such as a half of the display (e.g., left half, top half, etc.), while the video 404 is illustrated on a second portion of the display, such as the other half of the display (e.g., right half, bottom half, etc.). This way, the image 134 does not block any of the video 404. Additionally, in some examples, the user device 108 may move the image 134 to different locations based on one or more events occurring. For example, the user device 108 may move the image 134 such that the image 134 does not obstruct one or more of the objects depicted by the video.

Figure 5:
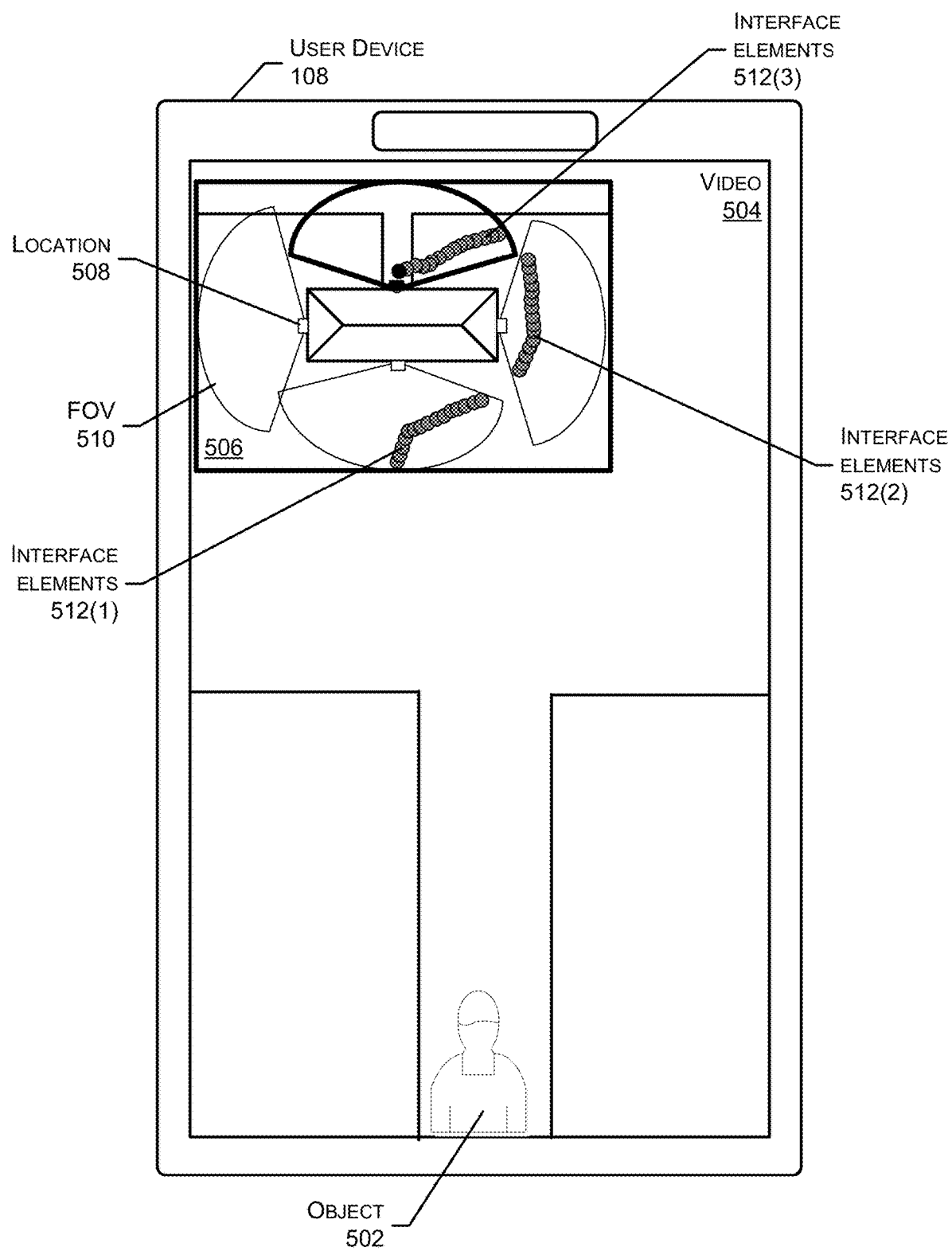
FIG. 5 illustrates an example user interface displaying locations of an object as determined by multiple electronic devices located at an environment, according to various examples of the present disclosure.

Additionally, while the examples of FIGS. 2-4 illustrate different techniques for displaying the locations of an object when a single electronic device 102 generates location data, in other examples, the user device 108 may display locations of an object when multiple electronic devices located around the environment 104 generate location data. For instance, FIG. 5 illustrates an example of the user device 108 displaying locations of an object 502 as detected by multiple electronic devices. In the example of FIG. 5, the user device 108 may receive image data generated by the electronic device 102. The user device 108 may also receive second location data generated by a second electronic device located at the back of the structure 110, third location data generated by a third electronic device located at the side of the structure 110, and first location data generated by the electronic device 102.

The user device 108 may then display a video 504 representing the image data. As shown, the image data depicts the object 502 located at the environment 104. Additionally, the user device 108 may display an image 506 representing a geographic area that includes the environment 104. As shown, the image 506 depicts the structure 110, locations 508 of the electronic devices on the structure 110 (although only one is labeled for clarity reasons), and FOVs 510 associated with the radar sensors of the electronic devices (although only one is labeled for clarity reasons). The user device 108 may then use the image 506 to display the locations of the object 502 at the environment 104.

For example, the user device 108 may use the second location data generated by the second electronic device in order to display first interface elements 512(1) indicating first locations of the object 502 as detected by the second electronic device. Additionally, the user device 108 may use the third location data generated by the third electronic device in order to display second interface elements 512(2) indicating second locations of the object 502 as detected by the third electronic device. Finally, the user device 108 may use the first location data generated by the electronic device 102 in order to display third interface elements 512(3) indicating third locations of the object 502 as detected by the electronic device 102. In the example of FIG. 5, each of the interface elements 512(1)-(3), except for the interface element 152(3) indicating the current location of the object 502, include similar characteristics. However, in other examples, the interface elements 512(1)-(3) may include different characteristics from one another.

For a first example, the user device 108 may use first characteristic(s) for the first interface elements 512(1), second characteristic(s) for the second interface elements 512(2), and third characteristic(s) for the third interface elements 512(3). For a second example, the user device 108 may change the characteristics of the interface elements 512(1)-(3), using the processes described herein, in order to indicate the direction of motion of the object 502 at the environment 104. While these are just a couple example techniques of how the user device 108 may use different characteristics for displaying the interface elements 512(1)-(3), in other examples, the user device 108 may use additional and/or alternative techniques.

In the example of FIG. 5, each of the electronic devices may perform the processes described herein in order to match the object 502 represented by image data with location data representing locations of the object 502 relative to the respective electronic devices. Additionally, each of the electronic devices may send, to the remote system(s) 106, the image data and/or the location data. The remote system(s) 106 may then use one or more processes to determine that first location data received from electronic device 102 and second location data received from a second electronic device are both associated with the same object 502 during the same event. In some examples, the remote system(s) 106 may make such a determination based on analyzing first image data from the electronic device 102 and analyzing second image data from the second electronic device and, based on the analysis, determining that the first image data and the second image data both represent the same object 502.

Additionally, or alternatively, in some examples, such as when the second electronic device generates the second location data, but does not generate second image data, the remote system(s) 106 may use one or more additional techniques to determine that the first location data and the second location data are associated with the same object 502. For example, the remote system(s) 106 may generate a hypothesis that the first location data and the second location data are both associated with the same object 502. In instances where a first field of view (FOV) associated with the location sensor of the electronic device 102 overlaps with a second FOV associated with the location sensor of the second electronic device, the remote system(s) 106 may then analyze the first locations represented by the first location data with respect to second locations represented by the second location data to determine if one or more of the first locations match one or more of the second locations within the overlapped area of the FOVs. Based on determining that one or more of the locations overlap, the remote system(s) 106 may then determine that the first location data and the second location data are associated with the same object 502.

Additionally, or alternatively, and in circumstances where the first FOV does not overlap with the second FOV, the remote system(s) 106 may analyze the first locations represented by the first location data in order to predict future locations of the object 502 that are outside of the first FOV. The remote system(s) 106 may then analyze the second locations represented by the second location data in order to determine if one or more of the second locations are similar to the predicted future locations. In some examples, the remote system(s) 106 may determine that a second location is similar to a predicted future location based on the second location being within a threshold distance (e.g., one foot, five feet, ten feet, etc.) to a predicted future location. The remote system(s) 106 may then determine a score, where the score is increased when the second location(s) are similar to the predicted future location(s) or decreased when the second location(s) are not similar to the predicted future location(s). Additionally, the remote system(s) 106 may use the score to determine whether the first location data and the second location data are associated with the same object 502. For example, the remote system(s) 106 may determine that the first location data and the second location data are associated with the same object 502 when the score satisfies (e.g., is equal to or greater than) a threshold score, or determine that the first location data and the second location data are not associated with the same object 502 when the score does not satisfy (e.g., is less than) the threshold score.

In some examples, when performing the processes described above, the remote system(s) 106 may use a timing aspect to determine that the first location data and the second location data are associated with the same object 502. For example, the remote system(s) 106 may determine the analyze the first location with respect to the second location data when the electronic device 102 generated the first location data within a threshold period of time to the second electronic device generating the second location data. The threshold period of time may include, but is not limited to, 5 seconds, 10 seconds, 30 seconds, and/or any other period of time. Additionally, in some examples, the remote system(s) 106 may perform similar processes to determine that the first location data and the third location data are associated with the same object 502 and/or determine that the second location data and the third location data area associated with the same object 502.

In some examples, the user device 108 may further indicate which electronic device is currently generating the video 504. For example, and in the example of FIG. 5, the interface element indicating the location of the electronic device 102 is a different color and the interface element displaying the FOV of the electronic device 102 includes a thicker line. However, while this is just one example technique of indicating which electronic device is currently generating the video 504, in other examples, the user device 108 may use additional and/or alternative techniques. For example, the user device 108 may display information that includes the identifier of the electronic device 102. For another examples, the user device 108 may display an interface element that points to and/or indicates the electronic device 102.

As described in the examples of FIGS. 1-5, the user device 108 may determine the positions for placing the interface elements that indicate the locations of the objects. In order to determine the positions, the user of the user device 108 may initially setup the image 134 that represents the geographic area. For instance, FIGS. 6A-7C illustrate techniques for creating the image 134 that the user device 108 uses to indicate the locations of objects at the environment 104 (which is represented by the dashed square). As illustrated in the example of FIG. 6A, the user device 108 may initially determine a location associated with the environment 104. In some examples, the user device 108 determines the location by receiving, from the remote system(s) 106 (and/or one or more other computing devices), data representing the location. Additionally, or alternatively, in some examples, the user device 108 determines the location by generating data (e.g., input data) representing the location. For example, the user may input the location into the user device 108 and, in response, the user device 108 may generate the input data representing the location. In either of the examples, the data representing the location may include, but is not limited to, data representing an address (e.g., the address associated with the structure 110), data representing a geographic area (e.g., the street, city, county, state, and/or the like for which the structure 110 is located), data representing geographic coordinates (e.g., GPS coordinates), and/or the like.

As shown in the example of FIG. 6A, based on determining the location associated with the environment 104, the user device 108 may display a map 602 of a geographic area that includes the location. For example, and as illustrated in the example of 12, the user device 108 and/or the remote system(s) 106 may send data representing the location associated with the environment to third-party system(s). The third-party system(s) may then send data representing the map 602 to the user device 108, where the user device 108 then uses the data to display the map 602. Additionally, the user device 108 may display an interface element 604 that indicates the location associated with the environment 104 on the map 602. Although the example of FIG. 6A illustrates the interface element 604 as including a graphical circle on the map 602, in other examples, the interface element 604 may include any other type of interface element, which are described with respect to FIG. 1.

Figure 6B:
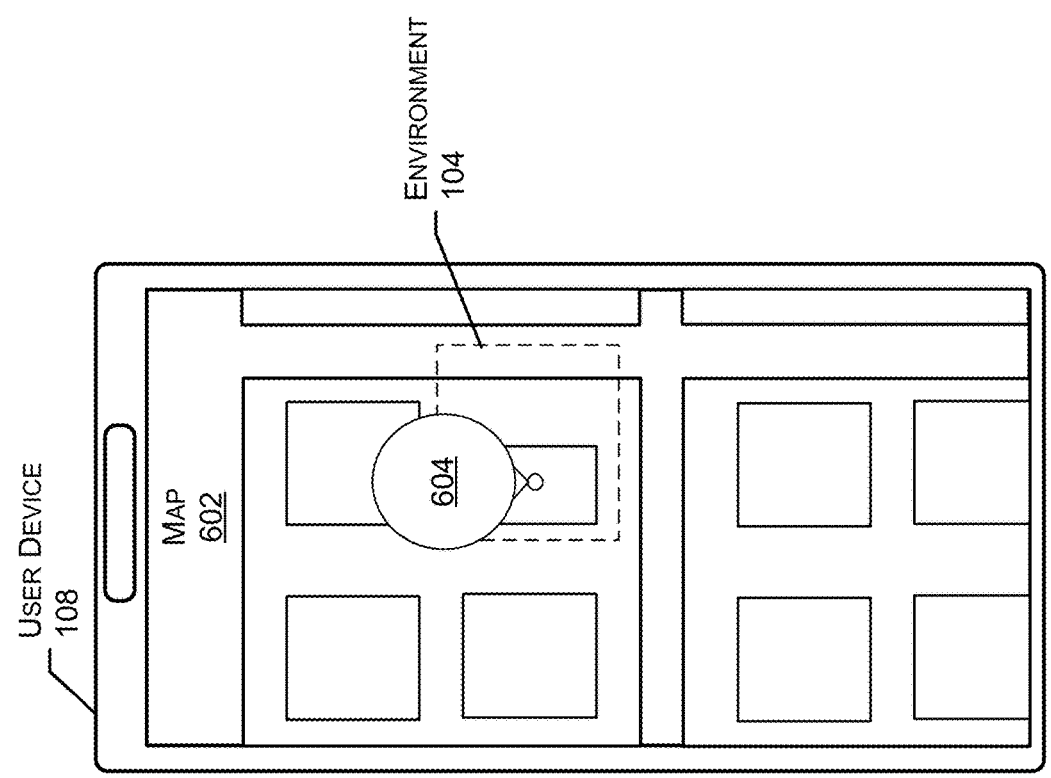
FIG. 6B illustrates the example user interface of FIG. 6A now displaying a location of the electronic device on the map, according to various examples of the present disclosure.
Figure 6A:
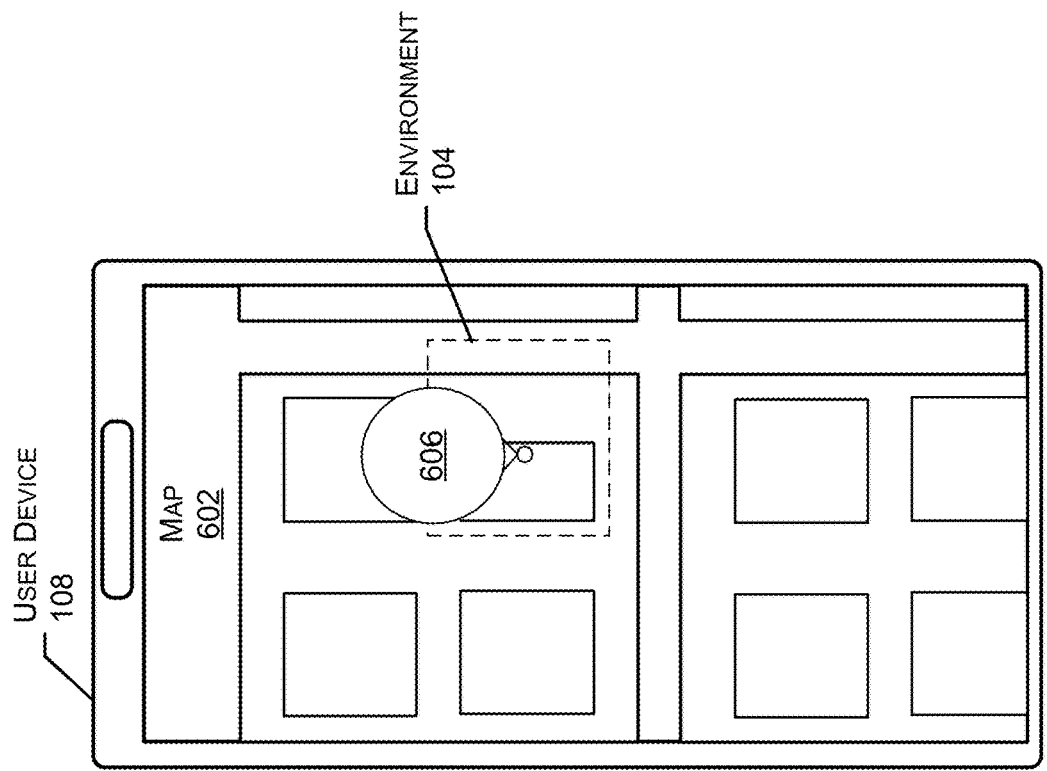
FIG. 6A illustrates an example user interface displaying a map of a geographic area that includes a location associated with an environment that includes an electronic device, according to various examples of the present disclosure.

Next, and as illustrated in the example of FIG. 6B, the user device 108 may generate data (e.g., input data) representing the location of the electronic device 102 at the environment 104. For example, and as shown by an interface element 606, the user may input that the location of the electronic device 102 is at a front of the structure 110 (the right side of the structure 110 on the map 602). Although the example of FIG. 6B illustrates the interface element 606 as including a graphical circle on the map 602, in other examples, the interface element 606 may include any other type of interface element, which are described with respect to FIG. 1.

Figure 7A:
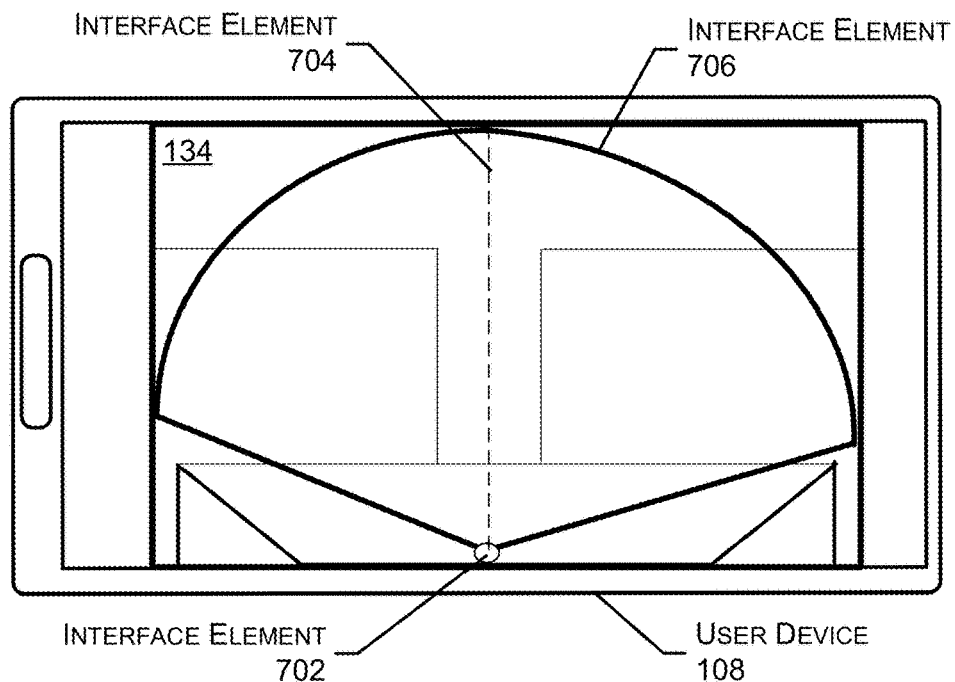
FIG. 7A illustrates an example user interface for setting an orientation of an electronic device, according to various examples of the present disclosure.

After determining the location of the electronic device 102 at the environment 104, the user device 108 may then determine the orientation of the electronic device 102. For instance, and as illustrated in the example of FIG. 7A, the user device 108 may display the image 134 of the geographic area, where the image 134 includes an interface element 702 indicating the location of the electronic device 102. As described herein, the image 134 may be scaled such that the image 134 represents a first distance in a first direction (e.g., along the x-axis) and a second distance in a second direction (e.g., along the y-axis) (which is discussed in more detail with regard to FIGS. 8A-8B). In some examples, the user device 108 and/or the remote system(s) 106 may scale the image 134 such that the image 134 represents the dimensions. For instance, the user device 108 and/or the remote system(s) 106 may determine an altitude associated with the location of the environment 104. The user device 108 and/or the remote system(s) 106 may then use the altitude to scale the image 134 to the correct dimensions.

For example, the user device 108 and/or the remote system(s) 106 may store data that relates various altitudes with various zoom levels associated with maps. Each of the zoom levels may be selected such that images representing geographic areas that include the zoom levels includes a specific scale. As such, the user device 108 and/or the remote system(s) 106 may determine an altitude that is associated with the location input by the user. The user device 108 and/or the remote system(s) 106 may then use the altitude associated with the location to determine a zoom level for the image 134 representing the geographic area. While this is just one example of how the user device 108 and/or the remote system(s) 106 may scale the image 134, in other examples, the user device 108 and/or the remote system(s) 106 may use one or more additional and/or alternative techniques.

The user device 108 may then determine the orientation of the electronic device 102 using the image 134. In some examples, to determine the orientation, the user device 108 may generate data (e.g., input data) representing the orientation of the electronic device 102. For example, the user may input the orientation of the electronic device 102 by selecting an area of the image 134 that is located in front of the electronic device 102. In some examples, to determine the orientation, the user device 108 may again generate data (e.g., input data) representing a bearing associated with the electronic device 102. For example, the user may input the bearing into the user device 108. The user device 108 may then determine the orientation using the bearing. For example, based on an orientation of the image 134, the user device 108 may be able to determine a reference bearing, such as a bearing of zero degrees. The user device 108 may then use the reference bearing along with the inputted bearing to determine the orientation of the electronic device 102. For example, if the reference bearing is zero degrees and the inputted bearing is ninety degrees, then the user device 108 may determine that the electronic device 102 is oriented ninety degrees from the reference bearing.

Still, in some examples, to determine the orientation, the user may stand directly in front of the electronic device 102 within the environment 104. The electronic device 102 may then use the location sensor to determine the location of the user with respect to the electronic device 102. After determining the location, the electronic device 102 may send, to the remote system(s) 106, location data representing the location, which may then send the location data to the user device 108. Using the processes described herein, the user device 108 may determine the position on the image 134 that corresponds to the location of the user and use the position to determine the orientation of the electronic device 102. For example, the user device 108 may determine that electronic device 102 is pointed in a direction that intersects with the location of the user.

As shown in the example of FIG. 7A, the user device 108 may display an interface element 704 that indicates the orientation of the electronic device 102. Additionally, the user device 108 may display an interface element 706 that indicates the FOV of the location sensor of the electronic device 102. The user device 108 may then generate data representing at least the location of the electronic device 102, the orientation of the electronic device 102, and/or a height of the electronic device 102. In some examples, the location may include the coordinates (e.g., the latitude and longitude) of the electronic device 102. Additionally, in some examples, the orientation may include the bearing of the electronic device 102 and/or a direction of the electronic device 102 that is relative to the image 134. The user device 108 may then store the data and/or the user device 108 may send the data to the remote system(s) 106 for storage.

Figure 7B:
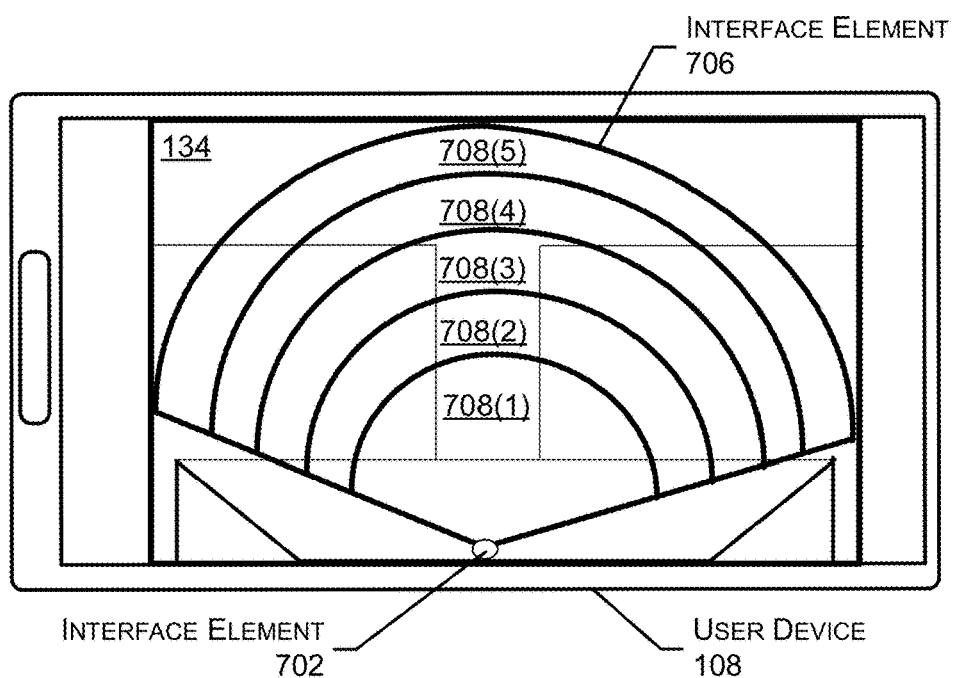
FIG. 7B illustrates an example of the user interface of FIG. 7A displaying various distances for setting motion detection, according to various examples of the present disclosure.

In some examples, after setting the location and/or the orientation of the electronic device 102, and as illustrated in the example of FIG. 7B, the user device 108 may then allow the user to select one or more distances for activating the imaging device of the electronic device 102. For example, the interface element 706 indicates representations of different distances 708(1)-(5) associated with the FOV of the electronic device 102 (e.g., the FOV of the radar sensor). In some examples, each representation corresponds to a specific distance from the electronic device 102. For example, the first representation of the first distance 708(1) may correspond to a first distance (e.g., 5 feet) from the electronic device 102, the second representation of the second distance 708(2) may correspond to a second distance (e.g., 10 feet) from the electronic device 102, and/or so forth. While the example of FIG. 7B illustrates five distances 708(1)-(5), in other examples, the user device 108 may provide more or less distances that are selectable by the user.

In some examples, the user device 108 may use preprogrammed distances 708(1)-(5). However, in other examples, the user device 108 may generate input data representing one or more of the distances 708(1)-(5). For example, the user may input one or more of the distances 708(1)-(5) when configuring the electronic device 102.

Figure 7C:
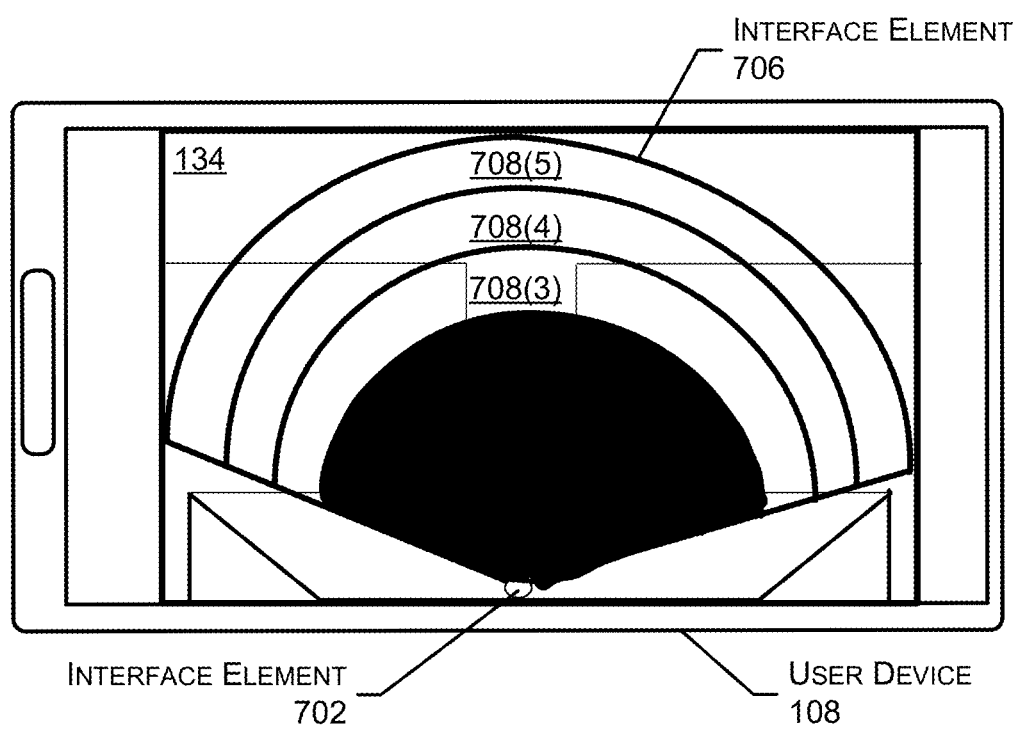
FIG. 7C illustrates an example of the user interface of FIG. 7B indicating selections of distances for the motion detection, according to various examples of the present disclosure.

As illustrated in the example of FIG. 7C, the user may have selected the first representation of the first distance 708(1) and the second representation of the second distance 708(2). As such, the user device 108 may generate data (e.g., input data) representing the selections of the first representation of the first distance 708(1) and the second representation of the second distance 708(2). Additionally, based on the selections, the user device 108 may have updated one or more characteristics of the interface element 706 to indicate the selections. For instance, and in the example of FIG. 7C, the user device 108 has changed the color and/or shading associated with the first representation of the first distance 708(1) and the second representation of the second distance 708(2). However, in other examples, the user device 108 may change one or more additional and/or alternative characteristics of the interface element 706 to indicate the selections by the user.

Once the user is done setting up the image 134, the user device 108 may send, to the remote system(s) 106, data representing the image 134 and/or data representing the distances 708(1)-(2) selected by the user. Additionally, in some examples, the user device 108 may store, in memory, data representing the image 134. The user device 108 may then use the image 134 when displaying locations of objects detected by the electronic device 102.

For example, FIG. 8A illustrates an example of using the image 134 to display a location of an object detected by the location sensor of the electronic device 102. As shown, the image 134 is scaled such that the image 134 represents a first distance 802 along a first axis (e.g., the x-axis in the example of FIG. 8A) and a second distance 804 along a second axis (e.g., the y-axis in the example of FIG. 8A). Additionally, the interface element 702 representing the electronic device 102 is located in the middle of the image 134 along the first axis. The user device 108 may then use the scale of the image 134 to determine a position for placing an interface element 806 that represents the location.

For example, the user device 108 may receive location data 808 (which is described in more detail below) from the remote system(s) 106. As shown, the location data 808 indicates at least an object identifier, an object type, a first distance along the first axis, a second distance along the second axis, and a timestamp of when the object was located at the location. While the location data 808 in the example of FIG. 8A only represents a single location of the object at a single point in time, in other examples, the location data 808 may represent multiple locations of the object at different points in time. Additionally, in other example, the location data 808 may include additional information about the object.

To determine the position for placing the interface element 806, the user device 108 may use the first distance represented by the location data 808 to determine a distance 810 along the first axis associated with the position. In some examples, the user device 108 may determine the distance 810 by segmenting the image 134 into multiple portions (which are represented by the dashed lines), where each portion includes a specific distance 812 (although only one is labeled for clarity reasons). A portion may include, but is not limited to, one pixel, two pixels, ten pixels, one hundred pixels, and/or any other number of pixels. In some examples, to determine the specific distance 812 represented by each portion, the user device 108 may divide the first distance 802 represented by the image 134 along the first axis by the number of portions. For example, if the first distance 802 is fifty-eight feet and the user device 108 segments the image 134 along the first axis into twenty-eight portions, then the specific distance 812 for each portion may include two foot.

Next, the user device 108 may determine a number of portions that corresponds to the first distance represented by the location data 808. For example, and using the example above where the specific distance 812 for each portion if two foot, if the first distance represented by the location data 808 is twenty-two feet, then the user device 108 may determine that the position for placing the interface element 806 is eleven portions in the positive direction along the first axis. As such, and as illustrated in the example of FIG. 8A, the distance 810 for placing the interface element 806 is eleven portions to the right from the middle of the image 134.

It should be noted that, in some examples, the first distance represented by the location data 808 data may be positive or negative. If the first distance is positive, then the user device 108 may place an interface element associated with the location on a first half of the image 134 (e.g., to the right of the interface element 702, which represents the positive direction). However, if the first distance is negative, then the user device 108 may place the interface element associated with the location on a second half of the image 134 (e.g., to the left of the interface element 702, which represents the negative direction).

The user device 108 may perform a similar process for determining a distance 814 along the second axis for the position of the interface element 806. For example, the user device 108 may segment the image 134 into multiple portions (which are also represented by the dashed lines), where each portion represents a specific distance 816 along the second axis (although only one is labeled for clarity reasons). Similar to the portions along the first axis, a portion may include, but is not limited to, one pixel, two pixels, ten pixels, one hundred pixels, and/or any other number of pixels. In some examples, to determine the specific distance 816 represented by each portion, the user device 108 may divide the second distance 804 represented by the image 134 along the second axis by the number of portions. For example, if the second distance 804 is thirty-six feet and the user device 108 segments the image 134 along the second axis into eighteen portions, then the specific distance 816 for each portion may include two feet.

Next, the user device 108 may determine a number of portions that corresponds to the second distance represented by the location data 808. For example, and using the example above where the specific distance 816 is two feet, if the second distance represented by the location data 808 is twelve feet, then the user device 108 may determine that the position for placing the interface element 806 is six portions in the positive direction along the second axis. As such, and as illustrated in the example of FIG. 8A, the distance 814 for placing the interface element 806 is six portions up from the bottom of the image 134.

While this is just one example technique for how the use device 108 may determine the position for placing the interface element 806 representing the location of the object, in other examples, the user device 108 may use additional and/or alternative techniques. For a first example, and as illustrated in the example of FIG. 8B, location data 818 may represent a distance from the electronic device 102 and an angle with respect to the electronic device 102. In such an example, the user device 108 may again use the scale associated with the image 134 to determine a distance 820 on the image 134 that corresponds to the distance represented by the location data 818. Additionally, the user device 108 may use the orientation of the electronic device 102, which is represented by the interface element 704, to determine an angle 822 for the interface element 806 that corresponds to the angle represented by the location data 818.

For instance, if the interface element 704 represents a first angle with respect to the electronic device 102 (e.g., 0 degrees) and the location data 818 represents a second angle (e.g., 40 degrees) with respect to the electronic device 102, then the user device 108 may determine that the angle 822 includes the second angle (e.g., 40 degrees). The user device 108 may then determine the position for the interface element 806 as the position on the image 134 that is the distance 820 along the angle 822 from the interface element 702.

For a second example, the user device 108 may store data representing geographic coordinates, such as GPS coordinates, representing the location of the electronic device 102. The user device 108 may then use location data to determine geographic coordinates associated with the locations of the object. Using the geographic coordinates representing the location of the electronic device 102, the geographic coordinates representing the location from the location data 808, and the scale of the image 134, the user device 108 may determine the position for placing the interface element 806.

For instance, the user device 108 may segment the image 134 into different portions (similar to the example of FIG. 8A), where portions along the first axis represent various geographic coordinates along the first axis and portions along the second axis represent various geographic coordinates along the second axis. In some examples, the user device 108 determines the geographic locations along the first axis and/or the second axis based on the geographic coordinates associated with the electronic device 102 and the scale of the image 134. The user device 108 may then use the geographic coordinates associated with the location from the location data and the portions to determine the position for placing the interface element 806. For example, the user device 108 may match a first geographic coordinate along the first axis for the location from the location data to the portion of the image 134 along the first axis that represents the first geographic coordinate and match a second geographic coordinate along the second axis for the location from the location data to the portion of the image 134 along the second axis that represents the second geographic coordinate.

Figure 9:
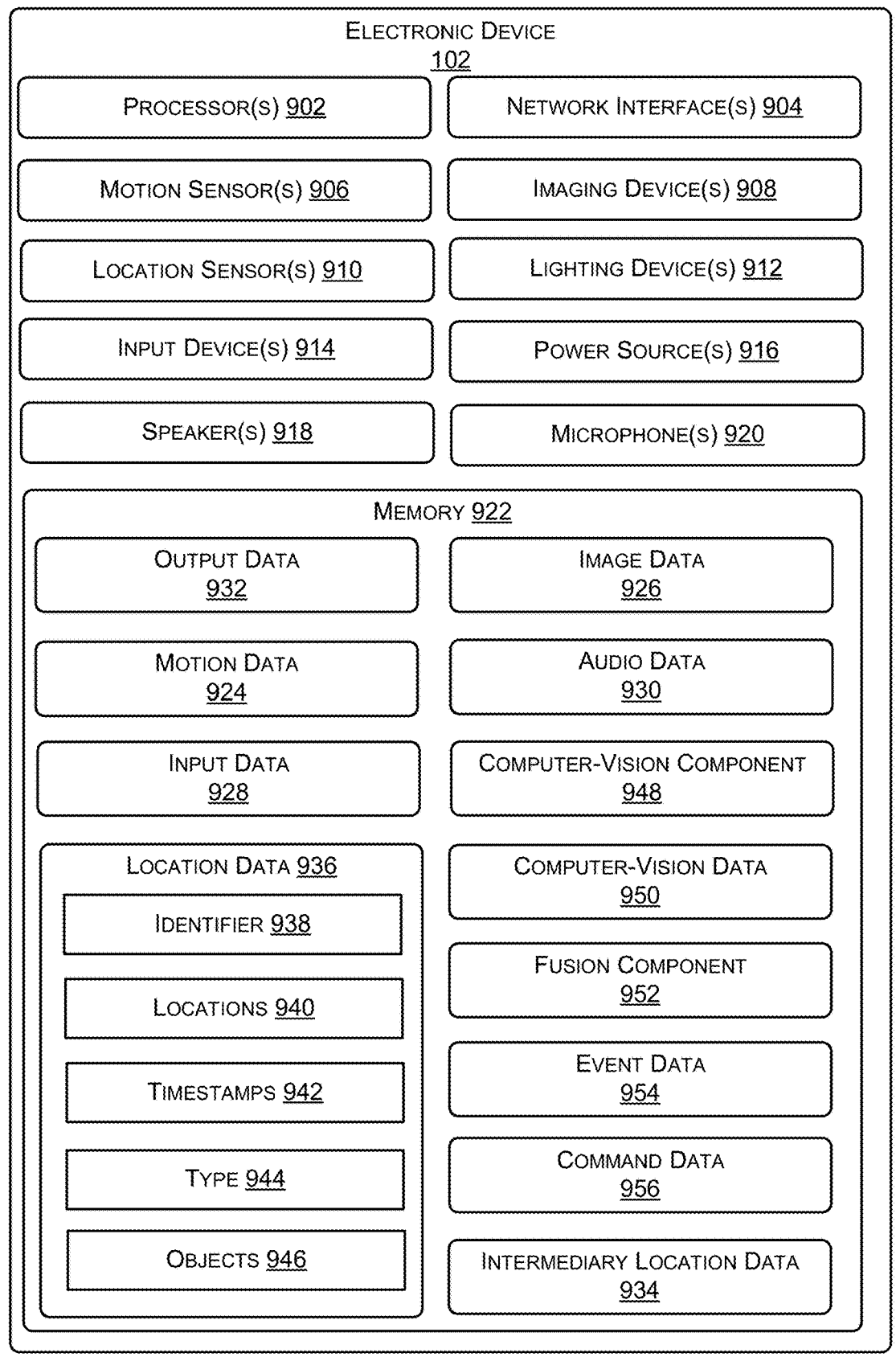
FIG. 9 illustrates an example architecture of an electronic device, according to various examples of the present disclosure.

In the examples above, the user device 108 uses location data generated by the electronic device 102 to display the information indicating the locations of the object. To generate the location data, the electronic device 102 initially uses a location sensor to determine the locations of the object relative to the electronic device 102. For instance, FIG. 9 illustrates an example architecture of the electronic device 102. As shown, the electronic device 102 may include one or more processors 902, one or more network interfaces 904, one or more motion sensors 906, one or more imaging devices 908, one or more location sensors 910, one or more lighting devices 912, one or more input devices 914, one or more power sources 916, one or more speakers 918, one or more microphones 920, and memory 922.

The motion sensor(s) 906 may be any type of sensor capable of detecting and communicating the presence of an object within their field of view. As such, the motion sensor(s) 906 may include one or more (alone or in combination) different types of motion sensors. For example, in some embodiments, the motion sensor(s) 906 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 902, for example, to one or more threshold voltage values to determine if the amount of voltage in the output signal is indicative of motion, and/or if the amount of voltage in the output signal is indicative of motion of an object that is to be captured by the imaging device(s) 908. The processor(s) 902 may then generate motion data 924 representing the motion detected by the motion sensor(s) 906 and/or the distance to the object detected by the motion sensor(s) 906. In some examples, the processor(s) 902 may determine the distance based on the amount of voltage in the output signal. Additionally, or alternatively, in some examples, the processor(s) 902 may determine the distance based on which motion sensor 906 detected the object.

Although the above discussion of the motion sensor(s) 906 primarily relates to PIR sensors, depending on the embodiment, the motion sensor(s) 906 may include additional and/or alternate sensor types that produce output signals including alternative data types. For example, and without limitation, the output signal may include an amount of voltage change based at least in part on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 906.

An imaging device 908 may include any device that includes an image sensor, such as a camera, that is capable of generating image data 926 (which may represent, and/or include, the image data 126), representing one or more images (e.g., a video). The image sensor may include a video recording sensor and/or a camera chip. In one aspect of the present disclosure, the imager sensor may comprise a complementary metal-oxide semiconductor (CMOS) array and may be capable of recording high definition (e.g., 722 p, 1800 p, 4K, 8K, etc.) video files. The imaging device 908 may include a separate camera processor, or the processor(s) 902 may perform the camera processing functionality. The processor(s) 902 (and/or camera processor) may include an encoding and compression chip. In some embodiments, the processor(s) 902 (and/or the camera processor) may comprise a bridge processor. The processor(s) 902 (and/or the camera processor) may process video recorded by the image sensor and may transform this data into a form suitable for transfer by the network interface(s) 904. In various examples, the imaging device 908 also includes memory, such as volatile memory that may be used when data is being buffered or encoded by the processor(s) 902 (and/or the camera processor). For example, in certain embodiments the camera memory may comprise synchronous dynamic random-access memory (SD RAM).

The lighting device(s) 912 may be one or more light-emitting diodes capable of producing visible light when supplied with power (e.g., to enable night vision). In some embodiments, when activated, the lighting device(s) 912 illuminates a light pipe. In some examples, the electronic device 102 uses the lighting device(s) 914 to illuminate specific components of the electronic device 102, such as the input device(s) 914. This way, users are able to easily see the components when proximate to the electronic device 102.

An input device 914 may include, but is not limited to, a button, a touch-sensitive surface, a switch, a slider, and/or any other type of device that allows a user to provide input to the electronic device 102. For example, if the electronic device 102 includes a doorbell, then the input device 914 may include a doorbell button. In some examples, based on receiving an input, the processor(s) 902 may receive a signal from the input device 914 and use the signal to determine that the input device 914 received the input. Additionally, the processor(s) 902 may generate input data 928 representing the input received by the input device(s) 914. For example, the input data 928 may represent the type of input (e.g., a push to a button), a time that the input occurred, and/or the like.

The power source(s) 916 may include one or more batteries that provide power to the electronic device 102. However, in other examples, the electronic device 102 may not include the power source(s) 916. In such examples, the electronic device 102 may be powered using a source of external AC (alternating-current) power, such as a household AC power supply (alternatively referred to herein as "AC mains" or "wall power"). The AC power may have a voltage in the range of 112-220 VAC, for example. The incoming AC power may be received by an AC/DC adapter (not shown), which may convert the incoming AC power to DC (direct-current) and may step down the voltage from 112-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

The speaker(s) 918 may be any electromechanical device capable of producing sound in response to an electrical signal input. The microphone(s) 920 may be an acoustic-to-electric transducer or sensor capable of converting sound waves into audio data 930 representing the sound. The speaker(s) 918 and/or microphone(s) 920 may be coupled to an audio CODEC to enable digital audio received by user devices to be decompressed and output by the speaker(s) 918 and/or to enable audio data captured by the microphone(s) 920 to be compressed into digital audio data 930. The digital audio data 930 may be received from and sent to user devices using the remote system(s) 106. In some examples, the electronic device 102 includes the speaker(s) 918 and/or the microphone(s) 920 so that the user associated with the electronic device 102 can communicate with one or more other users located proximate to the electronic device 102. For example, the microphone(s) 920 may be used to generate audio data representing the speech of the one or more other users, which is then sent to the user device 108. Additionally, the speaker(s) 918 may be configured to output user speech of the user, where the user's user speech may also be represented by audio data 930.

The location sensor(s) 910 may include, but are not limited to, radio detection and ranging (radar) sensor(s), light detection and ranging (lidar) sensor(s), proximity sensor(s), distance sensor(s), and/or any other type of sensor that is capable to generating output data 932 representing location(s) of object(s). In some examples, such as then the location sensor(s) 910 include a radar sensor, the location sensor 910 may include one or more antennas that transmit signals and two or more antennas (which may include the one or more antennas) that receive the signals after the signals are reflected off objects. In some examples, the antennas of the location sensor may both transmit and receive the signals. The at least one antenna 92 may transmit the signals and/or the at least two antennas may receive the signals at a given frame rate. As described herein, the frame rate may include, but is not limited to, 10 frames per second, 15 frames per second, 30 frames pers second, and/or any other frame rate. After receiving the reflected signals, the location sensor 910 may process each reflected signal in order to measure how strong the reflected signal is at given distances. As described in more detail with respect to FIGS. 10A-10B, the output data 932 from the location sensor 910 may then represent the amplitude values at various bins, where each bin corresponds to a given distance from the electronic device 102.

The number of bins may include, but is not limited to, 50 bins, 100 bins, 150 bins, and/or any other number of bins. The distance between each bin may include, but is not limited to, 20 centimeters, 22.5 centimeters, 25 centimeters, 30 centimeters, and/or any other distance. In order to remove reflections from stationary objects, and as illustrated in FIG. 10B, the electronic device 102 may analyze the output data 932 in order to subtract at least one previous frame from the given frame. The result of the subtraction may indicate the changes in the amplitude over a period of time (e.g., from frame to frame). The electronic device 102 may then use the results to identify a bin that is associated with a moving object, which also is illustrated in FIG. 10B. Additionally, the electronic device 102 may then use the distance associated with the bin to determine the distance to the object. The electronic device 102 may perform similar processes over a period of time in order to track the distances of the object. In some examples, the electronic device 102 may perform similar processes to track the distances of multiple objects.

Additionally, the electronic device 102 may also use the horizontal separation of the antennas to determine angle-of-arrival information for each distance bin per frame. For example, if the electronic device 102 takes the maximum peak from each frame as a target, the location sensor 910 may reconstruct how the object moves through the environment. An example of determining the angle-of-arrival is illustrated in FIG. 10B.

In some example, the electronic device 102 may generate intermediary location data 934 representing the distances and angles. For example, the intermediary location data 934 may represent polar coordinates to objects that are detected using the location sensor(s) 910. In some examples, and as described herein, the electronic device 102 may then convert the distances and the angles to cartesian coordinates. For example, the electronic device 102 may convert the distance and the range associated with the first polar location to a first cartesian coordinate (e.g., a first distance) along a first axis (e.g., the "x-axis") relative to the electronic device 102 and a second cartesian coordinate (e.g., a second distance) along a second axis (e.g., the y-axis) relative to the electronic device 102. In some examples, the electronic device 102 may convert the polar coordinates using equations (1) and (2) described above.

Additionally, in some examples, such as when the location sensor(s) 910 include a lidar sensor, the location sensor 910 may include one or more lasers that emit pulsed light waves into the environment 104. These pulsed light waves may then reflect off of surrounding objects and be recorded by the location sensor 910. The location sensor 910 may then use the time that it took for each light pulse to return to the light sensor 910, along with the speed of the light pulse, to calculate the distance that the pulse traveled. Additionally, the light sensor 910 may use the angle at which each light pulse returned to the location sensor 910 in order to determine the angle to the object relative to the electronic device 102. The electronic device 102 may then perform similar processes as those described above to convert the distances and the angles to the cartesian coordinates.

As further illustrated in the example of FIG. 9, the electronic device 102 may store location data 936 (which may represent, and/or include, the location data 122, the location data 808, and/or the location data 818) generated by at least the electronic device 102, wherein the location data 936 represents at least an identifier 938 associated with an object, locations 940 associated with the object, timestamps 942 for relating the locations 940 with the image data 926, a type 944 associated with the object, and a list of objects 946. Although the example of FIG. 9 illustrates the location data 936 as including the identifier 938, the locations 940, the timestamps 942, the type 944, and the list of objects 946, in other examples, the location data 936 may include additional data. Additionally, in other examples, the location data 936 may not include one or more of identifier 938, the locations 940, the timestamps 942, the type 944, or the list of objects 946.

As described herein, the identifier 938 may include, but is not limited to, a numerical identifier, an alphabetic identifier, a mixed numerical and alphabetic identifier, and/or any other type of identifier that identifies the object. Additionally, in some examples, and for a given location of the object, the location 940 may represent a first cartesian coordinate (e.g., a first distance) along a first axis (e.g., the "x-axis") relative to the electronic device 102 and a second cartesian coordinate (e.g., a second distance) along a second axis (e.g., the y-axis) relative to the electronic device 102. However, in other examples, and for a given location of the object, the location 940 may represent a distance to the object relative to the electronic device 102 and an angle to the object relative to the electronic device 102 (e.g., similar to the intermediary location data 934). Still, in some examples, and for a given location of the object, the location 940 may represent geographic coordinates (e.g., GPS coordinates). While these are just a couple of examples of locations 940 that may be represented by the location data 936, in other examples, the location data 936 may represent any other type of locations 940 that the user device 108 is able to use to display information indicating the locations of the object.

The type 944 may represent the type of object as determined using the computer-vision component 948 (described below). In some examples, each type 944 of object may be associated with a specific number, letter, and/or the like. For example, a person may be associated with type 944 "0", a vehicle may be associated with type 944 "1", an animal may be associated with type 944 "2", and/or so forth. Additionally, the list of objects 946 may indicate each of the objects represented by the image data 926 and/or detected by the location sensor(s) 910. In examples where the list of objects 946 includes more than one object, the location data 936 may include a respective identifier 938, respective locations 940, respective timestamps 942, and/or a respective type 944 for each object. This way, the electronic device 102 is able to track multiple objects, even when the objects include the same type of object. For example, each of the objects will be associated with a respective identifier 938 that the electronic device 102 uses to track the locations of the respective object.

For example, when the location sensor(s) 910 detect multiple objects, the location data 936 may include a first identifier 938 for a first object and a second identifier 938 for a second object. The location data 936 may further include at least first locations 940 that are associated with the first identifier 938 and second locations 940 that are associated with the second identifier 938. As new locations 940 are determined by the electronic device 102, the electronic device 102 is able to store the new locations 940 with respect to the correct object. For example, if the electronic device 102 detects new locations 940 for the first object, the electronic device 102 stores the new locations 940 in association with the first identifier 938 for the first object. In other words, the electronic device 102 uses the identifiers 938 to track different objects detected by the location sensor(s) 910.

The timestamps 942 associate the locations 940 of the object to the image data 926. For example, a first timestamp 942 may indicate that a first location 940 of an object is associated with a start of a video represented by the image data 926. Additionally, a second timestamp 942 may indicate that a second location 940 of the object is associated with a middle of the video. Furthermore, a third timestamp 942 may indicate that a third location 940 of the object is associated with an end of the video. In some examples, the timestamp 942 at the start of the video (e.g., the first frame of the video) is associated with a time of "0 seconds". As such, the first location 940 that is associated with the start of the video may also be associated with a time of "0 seconds". The timestamps 942 may then increase in time until the end of the video. In some examples, the timestamps 942 increase in milliseconds, seconds, and/or the like.

An example of the location data 936 may look as follows:
[{"objects":[{"id":95, "type":0, "x":0.87, "y":2.74}], "pts":8433}
{"objects":[{"id":95, "type":0, "x":0.93, "y":2.94}], "pts":8953}]

In this example, the "id" includes the identifier 938, the "type" includes the type 944, the "x" and "y" coordinates include the locations 940, and the "pts" includes the timestamp 942. As discussed above, in some examples, the location data 936 may be associated with more than one object. For examples, the location data 936 may look as follows:
[{"objects":[{"id":95, "type":0, "x":0.87, "y":2.74}], "pts":8433}
{"objects":[{"id":95, "type":0, "x":0.93, "y":2.94}], "pts":8953}
{"objects":[{"id":102, "type":0, "x":1.33, "y":3.50}], "pts":9553}]

As discussed above, in some examples, the location data 936 may represent locations 940 of the object before the imaging device(s) 908 began generating the image data 926. In such examples, the timestamps 942 for those locations 940 may include negative times. For example, if the location data 936 represents a location 940 of the object that was detected by the location sensor(s) 910 ten seconds before the imaging device(s) 908 began generating the image data 926 representing the object, then the timestamp 942 for the location 940 may include a time of "−10 seconds". For a second example, if the location data 936 represents a location 940 of the object that was detected by the location sensor(s) 910 five seconds before the imaging device(s) 908 began generating the image data 926 representing the object, then the timestamp 942 for the location 940 may include a time of "−5 seconds". This way, the user device 108 is able to identify which locations 940 of the object the location sensor(s) 910 detected before the imaging device(s) 908 began generating the image data 926.

In some examples, the electronic device 102 determines that the start of the video is the first frame of the video. In some examples, such as when the electronic device 102 continuously generates the image data 926 (e.g., the electronic device 102 does not turn off the imaging device(s) 908), the start of the video corresponds to the portion of the video that the imaging device(s) 908 were generating right after detecting an event. For example, the start of the video may correspond to the first frame of the video after detecting the event. In other examples, such as when the electronic device 102 does not continuously generate the image data 926 (e.g., the electronic device 102 turns off the imaging device(s) 908 until detecting an event), the start of the video corresponds to the first frame of the video that is generated by the imaging device(s) 908. In either of the examples, the electronic device 102 may determine that the start of the video (e.g., the first frame of the video) corresponds to a time of "0 seconds."

The electronic device 102 may then determine that an given portion of the location data 936 corresponds to the start of the video. In some examples, the electronic device 102 determines the given portion of the location data 936 based on the given portion of the location data 936 including locations 940 that were determined using output data 932 that was generated at a same time as the start of the video. The electronic device 102 may then determine that this given portion of the location data 936 includes a timestamp 942 of "0 seconds." In other words, the electronic device 102 relates this given portion of the location data 936 to the start of the video. Next, the electronic device 102 may determine that any portion(s) of the location data 936 that were generated before this given portion of the location data 936 occurred before the start of the video and as such, these portion(s) of the location data 936 include timestamp(s) 942 that are negative in time. Additionally, the electronic device 102 may determine that any portion(s) of the location data 936 that were generated after this given portion of the location data 936 occurred after the start of the video and as such, these portion(s) of the location data 936 include timestamp(s) 942 that are positive in time.

As further illustrated in the example of FIG. 9, the electronic device 102 may include the computer-vision component 948. The computer-vision component 948 may be configured to analyze the image data 926 using one or more computer-vision techniques and output computer-vision data 950 based on the analysis. The computer-vision data 950 may represent information, such as the presence of an object represented by the image data 926, the type of object represented by the image data 926, locations of the object relative to the electronic device 102, a direction of movement of the object, a velocity of the object, and/or any other type of information. As described herein, the type of object may include, but is not limited to, a person, an animal (e.g., a dog, a cat, a bird, etc.), a car, a tree, a wall, and/or any other type of object. In some examples, the computer-vision data 950 may further represent a bounding box indicating the respective location of each object represented by the image data 926.

For example, the computer-vision component 948 may analyze the image data 926 using one or more computer-vision techniques such as, but not limited to, object detection technique(s), object tracking technique(s), semantic segmentation technique(s), instance segmentation technique(s), and/or any other computer vision technique(s). Computer-vision analysis includes methods for acquiring, processing, analyzing, and understanding digital images, such as by extracting high-dimensional data from the real world in order to produce numerical or symbolic information. This information is then used to identify object(s) represented in the image, locations of the object(s), a respective velocity of each object, and/or the like.

For a first example of performing computer-vision analysis, the computer-vision component 948 may use image segmentation technique(s) that use the computer-vision analysis to locate objects and boundaries (e.g., lines, curves, etc.) in images. Image segmentation may further assign labels to the segments, where segments that include the same label also include the same characteristics. As described herein, the one or more image segmentation techniques may include, but are not limited to, clustering technique(s), compression-based technique(s), histogram-based technique(s), edge detection technique(s), dual clustering technique(s), multi-scale segmentation technique(s), and/or any other type of image segmentation technique that may be use to segment the frame(s) of the video.

Clustering technique(s) may partition an image into a number of clusters (e.g., portions). For instance, the clustering technique(s) may pick a number of cluster centers, either randomly or based on some heuristic method. The clustering technique(s) may then assign each pixel in the image to the cluster that minimizes the distance between the pixel and the cluster center. Next, the clustering technique(s) may re-compute the cluster centers by averaging all of the pixels in the cluster. These steps may be repeated until a convergence is attained, which is when no pixel changes clusters.

Compression-based technique(s) attempts to find patterns in an image and any regularity in the image can then be compressed. The compression-based technique(s) describe each segment (e.g., portion) by its texture and boundary shape, where each component is modeled by a probability distribution function and its coding length. The goal of the compression-based technique(s) is to find the segmentation which produces the shortest coding length. This may be achieved by a simple agglomerative clustering method.

Histogram-based technique(s) compute a histogram from all of the pixels in the image, where the peaks and values in the histogram are used to locate the clusters (e.g., portions) in the image. In some instances, color and intensity can be used as the measure of the clusters. In some instances, the histogram-based technique(s) may recursively apply the histogram-seeking method to clusters in the image in order to divide the clusters into smaller clusters. This operation may be repeated until no more clusters are formed.

Edge detection technique(s) use region boundaries and edges that are closely related, since there is often a sharp adjustment in intensity at the region boundaries. As such, the edge detection technique(s) use the region boundaries to segment an image. In some instances, the edge detection technique(s) use image detectors to identify the region boundaries.

Dual clustering technique(s) uses a combination of three characteristics of an image: partition of the image based on histogram analysis is checked by high compactness of the clusters, and high gradients of their borders. The dual clustering technique(s) use two spaces, one space is a one-dimensional histogram of brightness and a second space is a dual three-dimensional space of the original image. The first space allows the dual clustering technique(s) to measure how compactly the brightness of the image is distributed by calculating a minimal clustering. The clustering technique(s) use the two spaces to identify objects within the image and segment the image using the objects.

For a second example of performing computer-vision analysis, the computer-vision component 446 may use object detection technique(s) that use computer-vision analysis to perform informative region selection, features extraction, and then classification of object(s) represented by the image data 926. Informative region selection may include selecting different portions (e.g., windows) of an image represented by the image data for analysis. Feature extraction may then include extracting visual features of the object(s) located within the portions of the image in order to provide a semantic and robust representation of the object(s). Finally, classification may include classifying the type(s) of object(s) based on the extracted features for the object(s). In some examples, the object detection technique(s) may include machine learning technique(s), such as a Viola-Jones object detection technique, a scale-invariant feature transform technique, a histogram of oriented gradients features technique, and/or the like. Additionally, and/or alternatively, in some examples, the object detection technique(s) may include deep learning approaches, such as region proposal technique(s) (e.g., CNN technique(s)), you only look once technique(s), deformable convolutional networks technique(s), ad/or the like.

As further illustrated in the example of FIG. 9, the electronic device 102 may store a fusion component 952. As described in more detail with respect to FIG. 11, the fusion component 952 may be configured to analyze the location data 936 output by the location sensor(s) 910 and the computer-vision data 950 output by the computer-vision component 948 and, based on the analysis, associate each object represented by the image data 926 to respective location data 936 representing the locations of the object.

As further illustrated in the example of FIG. 9, the electronic device 102 may store event data 954. The event data 954 may represent one or more events that cause the electronic device 102 to begin generating the image data 926 using the imaging device(s) 908. For a first example, the event data 954 may represent an event indicating that the imaging device(s) 908 are to begin generating the image data 926 based on the electronic device 102 detecting, using the location sensor(s) 910 and/or the motion sensor(s) 906, an object within a threshold distance to the electronic device 102 (which is described with respect to FIG. 7C). As such, the electronic device 102 may determine, using the intermediary location data 934 and/or the location data 936, location(s) of object(s) detected by the location sensor(s) 910. The electronic device 102 may then determine if the location(s) are within the threshold distance to the electronic device 102. Based on event data 954, and based on determining that the location(s) are within the threshold distance, the electronic device 102 may detect an event.

For a second example, the event data 954 may represent an event indicating that the imaging device(s) 908 are to begin generating the image data 926 based on the electronic device 102 detecting an input using the input device(s) 914. As such, the electronic device 102 may generate input data 928 using the input device(s) 914, where the input data 928 indicates that the input device(s) 914 received an input. Based on event data 954, and based on determining that the input device(s) 914 received the input, the electronic device 102 may detect an event. While these are just a couple examples of events, in other examples, the event data 954 may represent additional and/or alternative events.

The electronic device 102 may also store command data 956. As described above, in some circumstances, a user of the user device 108 may want to receive a live view from the electronic device 102. As such, the electronic device 102 may receive the command data 956 from the remote system(s) 106, the user device 108, and/or another device. The command data 956 may represent an identifier associated with the electronic device 102, a command to generate the image data 926, a command to send the image data 926, and/or the like. In some examples, the electronic device 102 may then analyze the command data 956 and, based on the identifier, determine that the command data 956 is directed to the electronic device 102. For example, the electronic device 102 may match the identifier represented by the command data 956 to an identifier associated with, and stored by, the electronic device 102. Additionally, the electronic device 102 may cause the imaging device(s) 908 to begin generating the image data 926 (e.g., if the imaging device(s) 908 are not already generating the image data 926) and send the image data 926 to the remote system(s) 106, the user device 108, and/or another device. Additionally, if the image data 926 represents an object, the electronic device 102 may send the location data 936 associated with the object to the remote system(s) 106, the user device 108, and/or another device.

In some examples, the data represented in FIG. 9 may correspond to values. For example, the output data 932 may represent magnitude values, phase different values, and/or the like. Additionally, the intermediary location data 934 may represent distance values, angle values, and/or the like. Furthermore, the locations 940 may represent first cartesian coordinate values, second cartesian coordinate values, and/or the like.

As used herein, a processor may include multiple processors and/or a processor having multiple cores. Further, the processor(s) may comprise one or more cores of different types. For example, the processor(s) may include application processor units, graphic processing units, and so forth. In one instance, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the memory, or the same functionality may alternatively be implemented in hardware, firmware, application specific integrated circuits, field programmable gate arrays, or as a system on a chip (SoC). In addition, while not illustrated, the memory may include at least one operating system (OS) component that is configured to manage hardware resource devices such as the network interface(s), the I/O devices of the respective apparatuses, and so forth, and provide various services to applications or components executing on the processor(s). Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Network interface(s) may enable data to be communicated between electronic devices. The network interface(s) may include one or more network interface controllers (NICs) or other types of transceiver devices to send and receive messages over network(s). For instance, the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, the network interface(s) may include a wide area network (WAN) component to enable message over a wide area network.

Figure 10A:
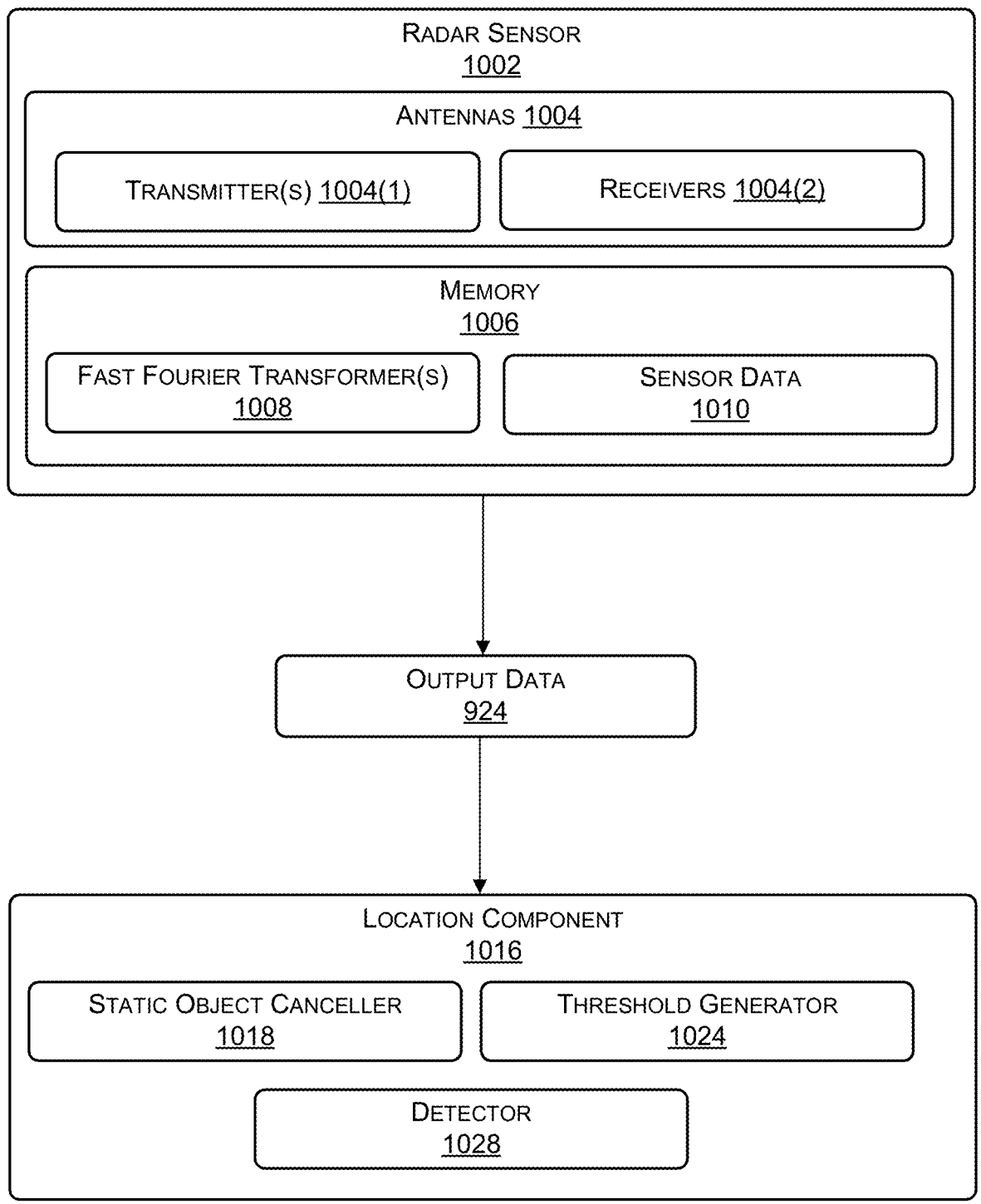
FIG. 10A illustrates an example architecture of a radar sensor, according to various examples of the present disclosure.

FIG. 10A illustrates an example architecture of a location sensor, according to various examples of the present disclosure. Referring to FIG. 10A, the location sensor includes a radar sensor 1002 that includes antennas 1004 and memory 1006. The memory 1006 includes at least one Fast Fourier Transformer(s) (FFT(s)) 1008. While the example of FIG. 10A illustrates the transmitter 1004(1) as being separate from the receivers 1004(2), in other examples, the receivers 1004(2) may include the transmitters 1004(1). Additionally, while the example of FIG. 10A illustrates the FFT(s) 1008 as being included in the memory 1006, in other examples, the FFT(s) may be included in the memory 922.

In some examples, each frame output by the transmitter(s) 1004(1) consists of a signal that represents a chirp. The transmitter(s) 1004(1) output the signal, which is reflected off of at least one object, and then received by the receivers 1004(2), which generate sensor data 1010 representing the signal. The sensor data 1010 is then passed to the FFT(s) 1008 for processing. For example, the FFT(s) 1008 include one or more algorithms that are configured to convert a time domain and/or space domain from the signal to a representation in a frequency domain. The output is a measure of how strong the reflected signal is at a specific distance from the electronic device 102. In some examples, each frequency bin of the FTT(s) 1008 corresponds to a physical distance away the electronic device 102. For example, and as illustrated in FIG. 10B, an output data 932 representing a frame may include one hundred bins 1012, where each bin 1012 represents a distance (e.g., 22.5 centimeters) from the electronic device 102. The output data 932 further represents a magnitude 1014 of the frequency of the signal at each of the bins 1012. A location component 1016 may then use the output data 932 to determine a distance of an object relative to the electronic device 102.

For example, since the output data 932 represents the magnitude for all objects, a static object canceller 1018 may be configured to subtract an output data 932 representing a previous frame (and/or output data 932 representing more than one previous frame) from the current output data 932.

Based on the subtraction, the static object canceller 1018 may generate an output 1020 that represents a magnitude 1022 of dynamic objects. In some examples, a threshold generator 1024 may then generate a threshold magnitude level 1026 associated with detecting objects. In some examples, the threshold generator 1024 generates the threshold magnitude level 1026 using one or more algorithms, such as a constant false alarm rate (CFAR) algorithm. For instance, the threshold generator 1024 may generate the threshold magnitude level 1026 by taking the average of the magnitudes detected by the radar sensor 1002 over a period of time. The period of time may include, but is not limited to, one minute, five minutes, one hour, one day, and/or any other period of time. Additionally, or alternatively, in some examples, the threshold generator 1024 generates the threshold magnitude level 1026 by multiplying the average of the magnitudes by a given multiplier. The multiplier may include, but is not limited to, 1.2, 1.5, 2, 3, and/or any other multiplier.

For a first example, a cell-averaging CFAR algorithm may determine the threshold magnitude level 1026 by estimating the level of noise around a cell under test. In some examples, the cell-averaging CFAR algorithm estimates this level of noise by calculating an average magnitude of a block of cells around the cell under test. In some examples, the cell-averaging CFAR algorithm further ignores cells that are immediately adjacent to the cell under test. Additionally, in some examples, the cell-averaging CFAR algorithm increases the average magnitude by the multiplier. The cell-averaging CFAR algorithm then performs similar processes for each of the cells in order to determine the threshold magnitude level 1026.

For a second example, the threshold generator 1024 may use the greatest-of CFAR algorithm that calculates separate averages for cells to the left and right of a cell under test. The greatest-of CFAR algorithm may then use the greatest of these magnitudes to define the local magnitude at the cell. The greatest-of CFAR algorithm may perform similar processes for each cell in order to determine the threshold magnitude level 1026. Still, for a third example, the threshold generator 1024 may use the least-of CFAR algorithm that again calculates separate averages for cells to the left and right of a cell under test. However, the least-of CFAR algorithm may then use the least of these magnitudes to define the local magnitude at the cell. The least-of CFAR algorithm may perform similar processes for each cell in order to determine the threshold magnitude level 1026.

A detector 1028 may then analyze the output 1020 in order to identify at least one peak magnitude that satisfies the threshold magnitude level 1026. For example, and in the example of FIG. 10B, the detector 1028 may identify a peak magnitude 1030 around bin 1012 third-two that satisfies the threshold magnitude level 1026. Based on identifying the peak magnitude 1030, the detector 1028 may detect a dynamic object. Additionally, the detector 1028 may analyze the output 1020 to determine a distance to the object. In some examples, the detector 1028 may determine the distance by multiplying the bin 1012 for which the peak magnitude 1030 was detected by the distance associated with each bin 1012. For instance, and in the example of FIG. 10B, the detector 1028 may determine that the distance is 720 centimeters (e.g., 32×22.5). The detector 1028 may then output data representing the distance to the object.

The location component 1016 may also determine an angle to the object. For example, the detector 1028 may use the one or more algorithms, along with the horizontal-separation between the receivers 1004(2), to convert the time domain from the signal to output phase information for determining the angle. For example, assume that a complex vector for a first receiver channel is $C_1$ and that a complex vector for a second receiver channel is $C_2$. The detector 1028 may then determine a complex conjugate Y as (conjugate $(C_1 \times C_2)$ and a phase difference P is derived as (atan2(imag(Y),real(Y)). In some examples, the detector 1028 may determine a moving average of the phase difference.

The detector 1028 may then convert the phase difference P to the angle A using the following equation:

$$A = \sin^{-1}\left(\frac{W(P)}{2\pi d}\right) \tag{4}$$

In equation (4), w is the wavelength (e.g., 12.4 mm) and d is the distance between the antennas 1002 (e.g., 5.76 mm). While this is just one example of how to determine the angle, in other examples, the detector may use additional and/or alternative techniques.

The location component 1016 may then output the intermediary location data 934 that represents the distances and the angles. In some examples, the location component 1016 may be included within the radar sensor 1002. Additionally, or alternatively, in some examples, the location component 1016 is included within the memory 922 of the electronic device. Additionally, in the examples of FIGS. 10A-10B, the radar sensor 1002 may include, but is not limited to, a bistatic location sensor, a doppler location sensor, a monopulse location sensor, a passive location sensor, an instrumentation location sensor, a continuous wave location sensor, and/or any other type of radar. For example, the radar sensor 1002 may include a SOCIONEXT SARINIA© (e.g., SC1233AR3) location sensor, a SMR-SERIES© location sensor, an InnoSenT© location sensor, an ISYS© location sensor, and/or any other location sensor.

Figure 11:
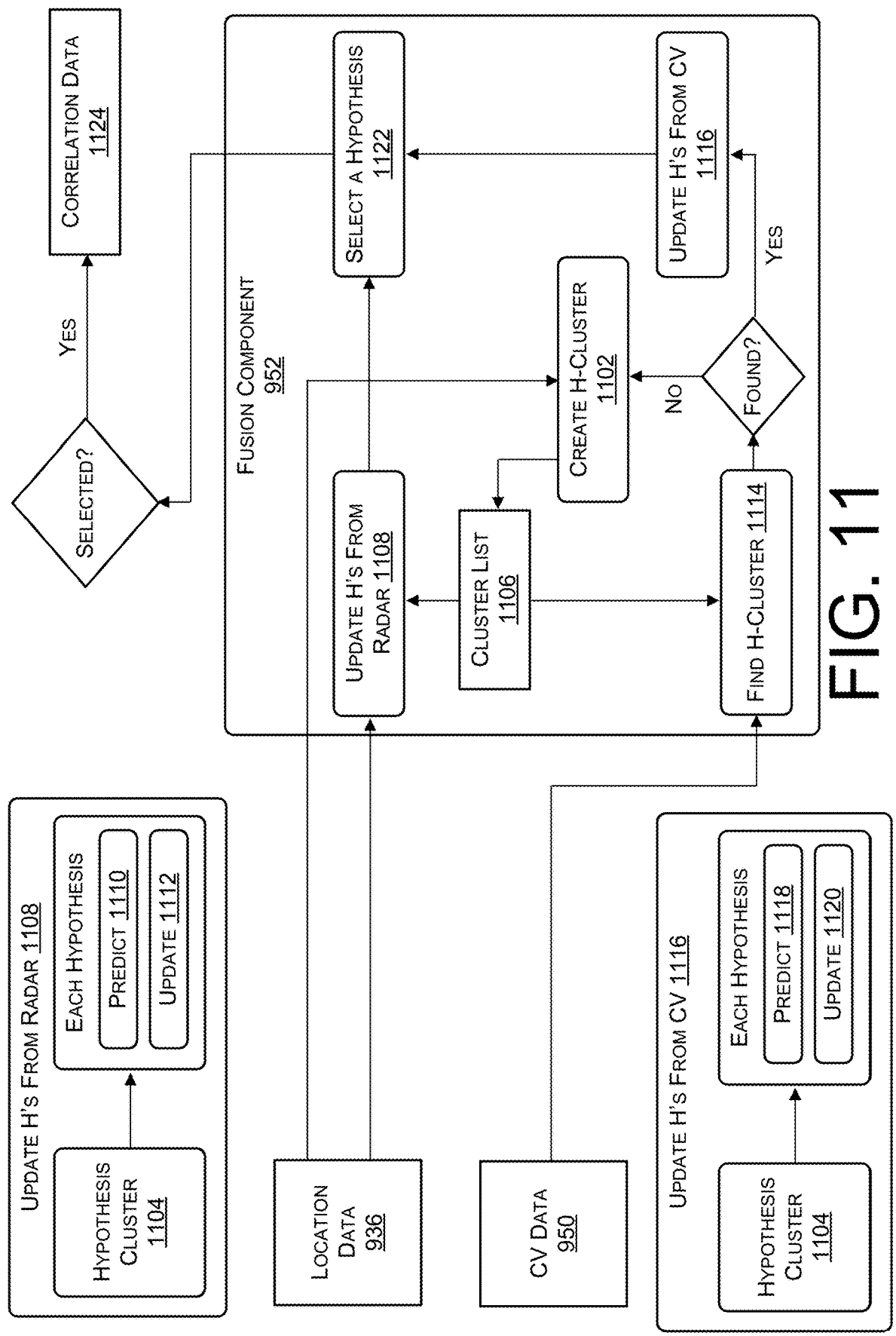
FIG. 11 illustrates an example of correlating objects detected by a location sensor to objects represented by image data, according to various examples of the present disclosure.

As discussed above, the electronic device 102 (e.g., the fusion component 952) may then match an object detected by the location sensor(s) 910 to an object represented by the image data 926. For instance, FIG. 11 illustrates an example of the fusion component 952 correlating objects detected by the location sensor 910 to objects represented by the image data 926. As shown, the electronic device 102 may initially input the location data 936 and the computer-vision data 950 into the fusion component 952. As described above, the location data 936 may represent at least the respective locations of each object detected by the location sensor 910 and the computer-vision data 950 may represent the respective locations of each object represented by the image data 926. The fusion component 952 then associates the object(s) represented by the location data 936 with the object(s) represented by the computer-vision data 950.

For instance, and at 1102, the fusion component 952 may create a hypothesis-cluster 1104 for object(s) represented by the computer-vision data 950 (referred to, in these examples, as "computer-vision object(s)") and object(s) represented by the location data 936 (referred to, in these examples, as "sensor object(s)"). In some examples, the fusion component 952 creates a hypothesis that each computer-vision object correlates to each sensor object. For example, if the computer-vision data 950 represents one computer-vision object and the location data 936 represents three sensor objects, then, at 1102, the fusion component 952 may generate the hypothesis cluster 1104 that includes a first hypothesis that a first sensor object correlates with the computer-vision object, a second hypothesis that a second sensor object correlates with the computer-vision object, and a third hypothesis that a third sensor object correlates with the computer-vision object. The fusion component 952 may then generate a cluster list 1106 representing the hypothesis cluster 1104.

The fusion component 952 may then, at 1108, continue to receive additional location data 936 and use the additional location data 936 to update a respective score for each hypothesis. In some examples, the fusion component 952 updates the score for a hypothesis based on predicted location(s) associated with the computer-vision object and the location(s) of a sensor object as represented by the additional location data 936. For example, and for the first hypothesis, the fusion component 952, at 1110, may use the locations of the computer-vision object and the velocity of the computer-vision object to predict the future locations for the computer-vision object. The fusion component 952 may then, at 1112, use the locations represented by the additional location data for the first object to increase or decrease a first score associated with the first hypothesis.

For example, if the locations of the sensor object represented by the additional location data 936 for the first sensor object are similar to the predicted locations, then the fusion component 952 may, at 1112, increase the first score associated with the first hypothesis. However, if the locations represented by the additional location data 936 for the first sensor object are not similar to the predicted locations, then the fusion component 952 may, at 1112, decrease the first score associated with the first hypothesis. In some examples, a location may be similar to a predicted location when the location is within a threshold distance to the predicted location. The threshold distance may include, but is not limited to, 1 foot, 5 feet, 10 feet, and/or any other threshold distance. Additionally, or alternatively, in some examples, a location may be similar to a predicted location when the location is within a zone that includes the predicted location.

The fusion component 952 may, at 1108, continue to perform these processes in order to increase or decrease the first score associated with the first hypothesis as the fusion component 952 continues to receive new location data 936. Additionally, at 1108, and using the example above, the fusion component 952 may perform similar processes to determine a second score for the second hypothesis and a third score for the third hypothesis.

Additionally to performing the processes above, the fusion component 952 may, at 1114, find a hypothesis-cluster using the cluster list 1106 and additional computer-vision data 950. In some examples, the fusion component 952 may find the hypothesis-cluster based on the additional computer-vision data 950 representing a computer-vision object included in the cluster list 1106. If the fusion component 952 finds a hypothesis cluster at 1114, then the fusion component 952 may, at 1116, update hypothesis from computer-vision.

For instance, the fusion component 952 may, at 1116, continue to receive additional computer-vision data 950 and use the additional computer-vision data 950 to update a respective score for each hypothesis. In some examples, the fusion component 952, at 1116, updates a score for a hypothesis based on predicted location(s) associated with a sensor object and the location(s) of a computer-vision object as represented by the additional computer-vision data 950. For example, and for the first hypothesis, the fusion component 952, at 1118, may use the locations of the first sensor object and the velocity of the first sensor object to predict the future locations for the first sensor object. The fusion component 952 may then, at 1120, use the locations represented by the additional computer-vision data 950 for the computer-vision object to increase or decrease a fourth score associated with the first hypothesis.

For example, if the locations of the computer-vision objects represented by the additional computer-vision data 950 for the computer-vision object are similar to the predicted locations, then the fusion component 952 may, at 1120, increase the fourth score associated with the first hypothesis. However, if the locations represented by the additional computer-vision data 950 for the computer-vision object are not similar to the predicted locations, then the fusion component 952 may, at 1120, decrease the fourth score associated with the first hypothesis. The fusion component 952 may, at 1116, continue to perform these processes in order to increase or decrease the fourth score associated with the first hypothesis. Additionally, at 1116, and using the example above, the fusion component 952 may perform similar processes to determine a fifth score for the second hypothesis and a sixth score for the third hypothesis.

The fusion component 952 may then, at 1122, select a hypothesis. For example, the fusion component 952 may analyze the scores associated with the hypothesis-cluster 1104 as determined at 1108 and the scores associated with the hypothesis-cluster 1104 as determined at 1116 to select a hypothesis. In some examples, the fusion component 952 selects a hypothesis that is associated with a score that satisfies (e.g., is equal to or greater than) a threshold score. If the scores are associated with percentages, then the threshold score may include, but is not limited to, 80%, 85%, 90%, 95%, 99%, and/or any other percentage. In some examples, if more than one score satisfies the threshold score, then the fusion component 952 may select the hypothesis that is associated with the highest score among the scores that satisfy the threshold score. Still, in some examples, the fusion component 952 may not select a hypothesis if none of the scores satisfy the threshold score.

If the fusion component 952 selects a score at 1122, then the fusion component 952 may generate and output correlation data 1124. The correlation data 1124 may indicate that a sensor object correlates to a computer-vision object. Based on the correlation data 1124, the electronic device 102 may then send, along with the image data, the location data 936 associated with the object.

While the examples above describe the electronic device 102 as including the fusion component 952 that correlates objects represented by the location data 936 with objects represented by the computer-vision data 950, in other examples, the remote system(s) 106 may include the fusion component 952. In such examples, the electronic device 102 may send, to the remote system(s) 106, the location data 936 and the computer-vision data 950 for processing by the remote system(s) 106. Additionally, in other examples, processes performed by the fusion component 952 may be split between the electronic device 102 and the remote system(s) 106. For example, the electronic device 102 may generate the cluster list 1106 and send data representing the cluster list 1106 to the remote system(s) 106. The remote system(s) 106 may then update the hypothesis for the cluster list 1106, select one of the hypotheses, and generate the correlation data 1124.

As discussed above, the electronic device 102 may send data to the remote system(s) 106. As such, FIG. 12 illustrates an example architecture of the remote system(s) 106, according to various examples of the present disclosure. As shown, the remote system(s) 106 may include one or more processor(s) 1202, one or more network interface(s) 1204, and memory 1206. As further shown, the remote system(s) 106 may receive, from the electronic device 102, the motion data 924, the image data 926, the input data 928, the audio data 930, and/or the location data 936. Additionally, the remote system(s) 106 may receive, from the user device 108, the event data 954 and/or the command data 956.

The remote system(s) 106 may further store a computer-vision component 1208 and a fusion component 1210. In some examples, the computer-vision component 1208 may be configured to perform similar processes as the computer-vision component 948 and/or the fusion component 2110 may be configured to perform similar processes as the fusion component 952. In other words, the remote system(s) 106 may be configured to perform at least some of the processing that is described herein with respect to the electronic device 102.

As further illustrated in the example of FIG. 12, the remote system(s) 106 may communicate with third-party system(s) 1212 over the network(s) 128. In some examples, the third-party system(s) 1212 may be configured to provide the remote system(s) 106 and/or the user device 108 with the maps of the geographic areas described herein. For example, the remote system(s) 106 and/or the user device 108 may send, to the third-party system(s) 1212, location data 1214 representing a location. The location data 1214 may represent an address (e.g., the address associated with the structure 110), a geographic area (e.g., the street, city, county, state, and/or the like for which the structure 110 is located), geographic coordinates (e.g., GPS coordinates), and/or the like The third-party system(s) 1212 may then send, to the remote system(s) 106 and/or the user device 108, map data 1216 representing an image of a geographic area that includes the location.

Figure 13:
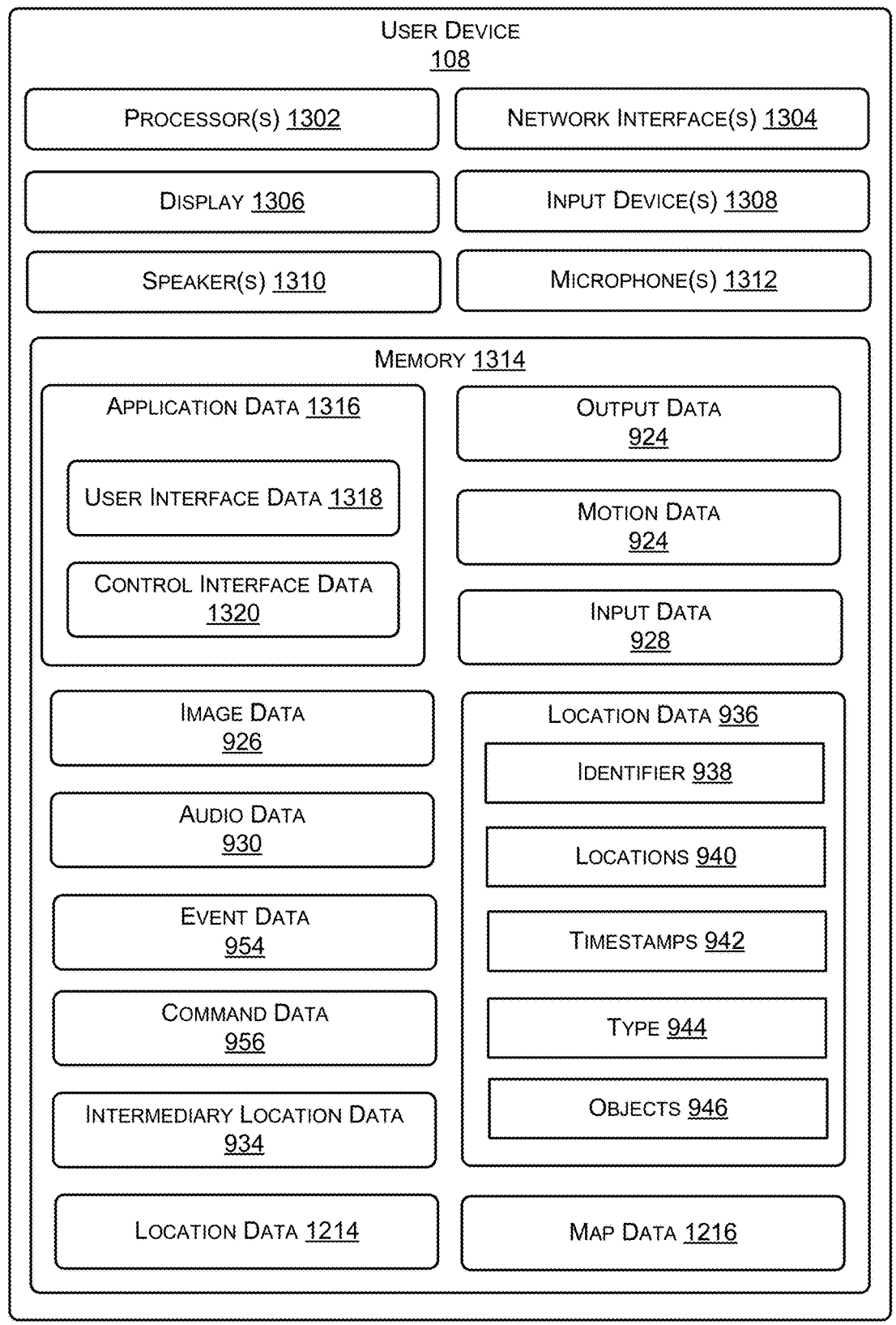
FIG. 13 illustrates an example architecture of a user device, according to various examples of the present disclosure.

As further described herein, the remote system(s) 106 may send data to the user device 108 so that the user device 108 is able to display content. For instance, FIG. 13 illustrates an example architecture of the user device 108, according to various examples of the present disclosure. As shown, the user device 108 may include one or more processors 1302, one or more network interfaces 1304, a display 1306, one or more input devices 1308, one or more speakers 1310, one or more microphones 1312, and memory 1314. In some examples, the user device 108 may include one or more additional components not illustrated in the example of FIG. 13. Additionally, in some examples, the user device 108 may not include one or more of the components illustrated in the example of FIG. 13.

As shown, the user device 108 may store application data 1316. The application data 1316 may represent an application that performs at least some of the processes described herein with respect to the user device 108. For instance, and as shown, the application data 1316 includes user interface data 1318. The user interface data 1318 may represent user interface(s) that the application uses to provide the videos and/or the location information associated with an object. The application may further be configured to perform the processes described herein to analyze the location data 936 in order to determine positions for placing interface elements represented the location information. After determining the positions, the application may be configured to cause the display 1306 to present the interface elements at the positions and/or present the interface elements using specific characteristics.

For instance, the application may be configured to generate control interface data 1320 that causes one or more devices to perform one or more processes. For a first example, after the application determines a position on the image of the geographic area for placing an interface element, the application may be configured to generate control interface data 1320 representing the position on the image for placing an interface element, characteristic(s) for the interface element, and/or the like. The application may then be configured to send, to the display 1306, the control interface data 1320 so that the display 1306 may use the control interface data 1320 to display the interface element, at the position, and using the characteristic(s). For a second example, after the application determines to update an interface element from including first characteristic(s) to including second characteristic(s), the application may be configured to generate control interface data 1320 representing the second characteristic(s) for the interface element. The application may then be configured to send, to the display 1306, the control interface data 1320 so that the display 1306 may use the control interface data 1320 to update the interface element to include the second characteristic(s). In other words, the application may generate the control interface data 1320 that the electronic device 102 may use to update the content being displayed by the display 1306.

As further illustrated in the example of FIG. 13, the user device 108 may receive, from the remote system(s) 106, the electronic device 102, and/or another computing devices, the motion data 924, the image data 926, the input data 928, the audio data 930, the location data 936, and/or the map data 1216.

In some examples, the user may use the speaker(s) 1310 and/or the microphone(s) 1312 in order to communicate with a person located proximate to the electronic device 102. For example, the user device 108 may receive audio data 930 generated by the electronic device 102, where the audio data 930 represents first user speech from the person. The user device 108 may then use the speaker(s) 1310 to output sound represented by the audio data 930 (e.g., output sound representing the first user speech). Additionally, the user device 108 may use the microphone(s) 1312 to generate audio data 930 representing second user speech from the user. The user device 108 may then send the audio data 930 to the electronic device 102 (e.g., via the remote system(s) 106). The electronic device 102 is then able to output sound represented by the audio data 930 (e.g., output sound representing the second user speech). This way, the user is able to communicate with the person.

FIGS. 14A-19 illustrate processes for providing and displaying motion information with videos. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

Figure 14A:
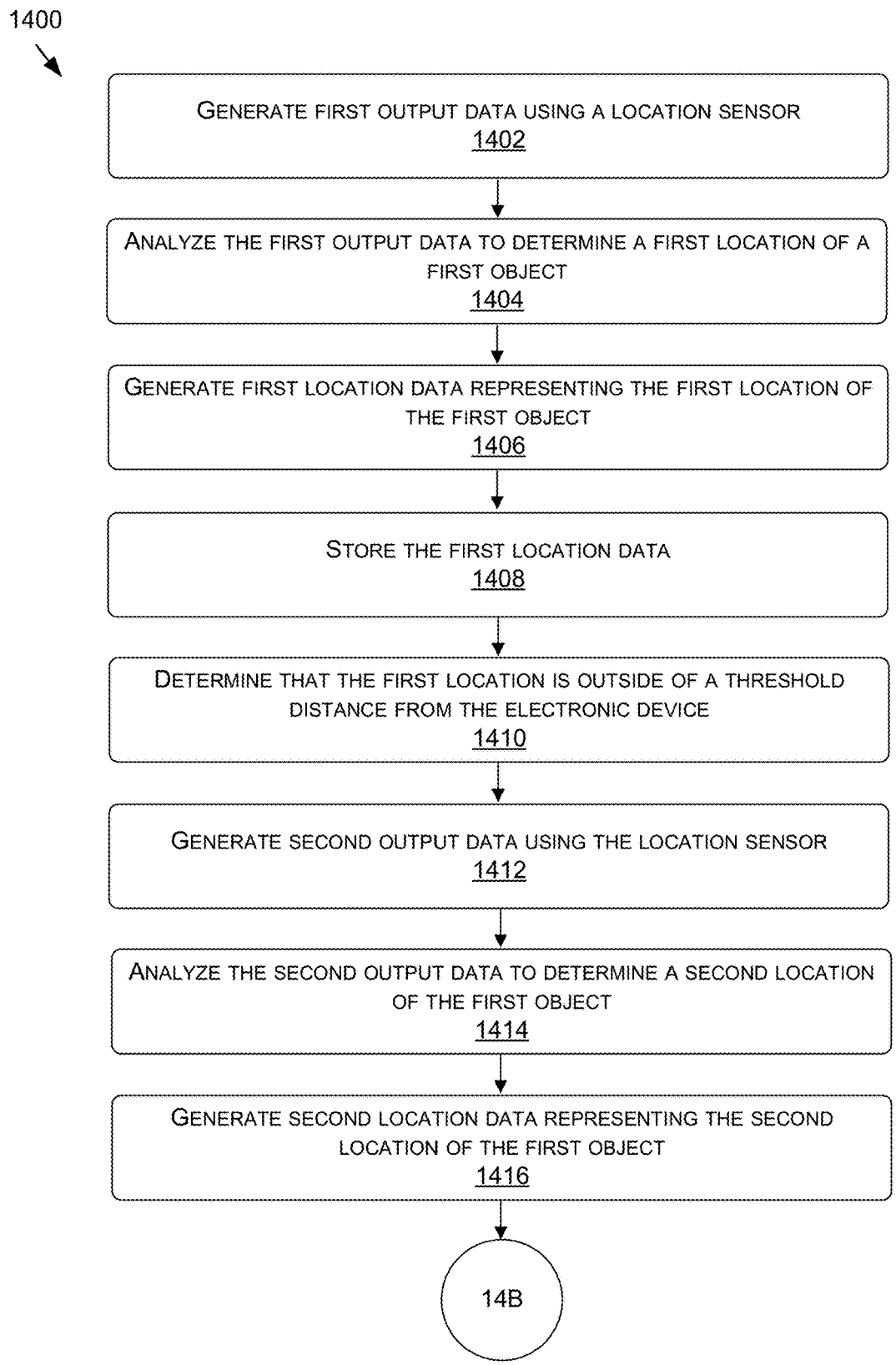

FIGS. 14A-14B are a flowchart illustrating an example process 1400 for generating location data that corresponds to an object represented by image data, according to various examples of the present disclosure. At 1402, the process 1400 may include generating first output data using a location sensor and at 1404, the process 1400 may include analyzing the first output data to determine a first location of a first object. For instance, the electronic device 102 may use the location sensor to generate the first output data. In some examples, if the location sensor includes a radar sensor, the first output data may include first radar data that represents amplitude values for first signals at various bins, where each bin corresponds to a given distance from the electronic device 102. The electronic device 102 may then analyze the first output data, using one or more of the processes described herein, to determine the first location of the first object. The first location may include, but is not limited to, a first distance and first angle relative to the electronic device 102, first coordinates relative to the electronic device 102, first geographic coordinates, and/or the like.

At 1406, the process 1400 may include generating first location data representing the first location of the first object and at 1408, the process 1400 may include storing the first location data. For instance, the electronic device 102 may generate the first location data representing the first location of the first object. In some examples, the first location data may further represent an identifier associated with the first object, a first direction of motion of the first object, a first velocity of the first object, a first time associated with the first location, and/or additional information associated with the first object. The electronic device 102 may then store the first location data in a buffer. In some examples, the buffer may be configured to store a specific amount of location data, such location data that is associated with a specific time period. For example, as the electronic device 102 continues to generate new location data, the electronic device 102 may continue to overwrite the oldest location data in the buffer with the new location data.

At 1410, the process 1400 may include determining that the first location is outside of a threshold distance from the electronic device. For instance, the electronic device 102 may compare a distance associated with the first location to the threshold distance. Based on the comparison, the electronic device 102 may determine that the first location is outside of the threshold distance. For instance, the electronic device 102 may determine that the distance is greater than the threshold distance. In some examples, based on the determination, the electronic device 102 may determine that an event associated with generating image data and/or analyzing the image data has not yet occurred.

At 1412, the process 1400 may include generating second output data using the location sensor and at 1414, the process 1400 may include analyzing the second output data to determine a second location of the first object. For instance, the electronic device 102 may use the location sensor to generate the second output data. In some examples, if the location sensor includes the radar sensor, the second output data may include second radar data that represents amplitude values for second signals at various bins, where each bin corresponds to a given distance from the electronic device 102. The electronic device 102 may then analyze the second output data, using one or more of the processes described herein, to determine the second location of the first object. The second location may include, but is not limited to, a second distance and second angle relative to the electronic device 102, second coordinates relative to the electronic device 102, second geographic coordinates, and/ or the like.

At 1416, the process 1400 may include generating second location data representing the second location of the first object and at 1418, the process 1400 may include determining that the second location is within the threshold distance from the electronic device. For instance, the electronic device 102 may generate the second location data. In some examples, the second location data may further represent the identifier associated with the first object, a second direction of motion of the first object, a second velocity of the first object, a second time associated with the second location, and/or additional information associated with the first object. The electronic device 102 may then compare a distance associated with the second location to the threshold distance. Based on the comparison, the electronic device 102 may determine that the second location is within the threshold distance. For instance, the electronic device 102 may determine that the distance is less than the threshold distance. In some examples, based on the determination, the electronic device 102 may then determine that the event associated with generating the image data and/or analyzing the image data has occurred.

At 1420, the process 1400 may include generating image data using an imaging device and at 1422, the process 1400 may include analyzing the image data to determine that the image data represents a second object. For instance, the electronic device 102 may generate the image data. In some examples, the electronic device 102 begins generating the image data based on the determination that the second location is within the threshold distance to the electronic device 102 (e.g., the event occurred). The electronic device 102 may then analyze the image data, using one or more of the processes described herein, to determine that the image data represents second object and/or determine an object type associated with the second object. As described above, in some examples, the object type may include a general object such as, but is not limited to, a person, a vehicle, a package, an animal, and/or any other type of object. Additionally, in some examples, the object type may include a specific type of object. For example, the type of object may include a specific person (e.g., a parent), a specific animal (e.g., the family dog), a specific type of vehicle (e.g., a delivery truck), and/or the like.

At 1424, the process 1400 may include determining a third location associated with the second object using the image data. For instance, the electronic device 102 may analyze the image data and, based on the analysis, determine that a portion of the image data represents the second object. The electronic device 102 may then determine the third location based on the portion of the image data. For example, each portion of the image data may correspond to a specific location relative to the electronic device 102. As such, the electronic device 102 is able to determine that the third location corresponding to the portion of the image data.

At 1426, the process 1400 may include determining, based at least in part on the third location, that the second object corresponds to the first object. For instance, the electronic device 102 may determine that the second corresponds to the first object. In some examples, to make the determination, the electronic device 102 may initially generate a hypothesis that the second object correlates to the first object. The electronic device 102 may then use predicted location(s) associated with the second object, predicted location(s) associated with the first object, location(s) represented by location data, and/or location(s) determined using the image data to determine a score associated with the hypothesis. The electronic device 102 may then use the score to determine that the second object correlates to the first object. For example, the electronic device 102 may determine that the second object correlates to the first object based on the score satisfying a threshold score and/or based on the score including a highest score.

At 1428, the process 1400 may include sending the first location data, the second location data, and the image data. For instance, the electronic device 102 may send, to the remote system(s) 106, the first location data, the second location data, and the image data. In some examples, the electronic device 102 may then continue to generate new image data and new location data. In such example, the electronic device 102 may continue to send the new image data and the new location data to the remote system(s) 106.

Figure 15:
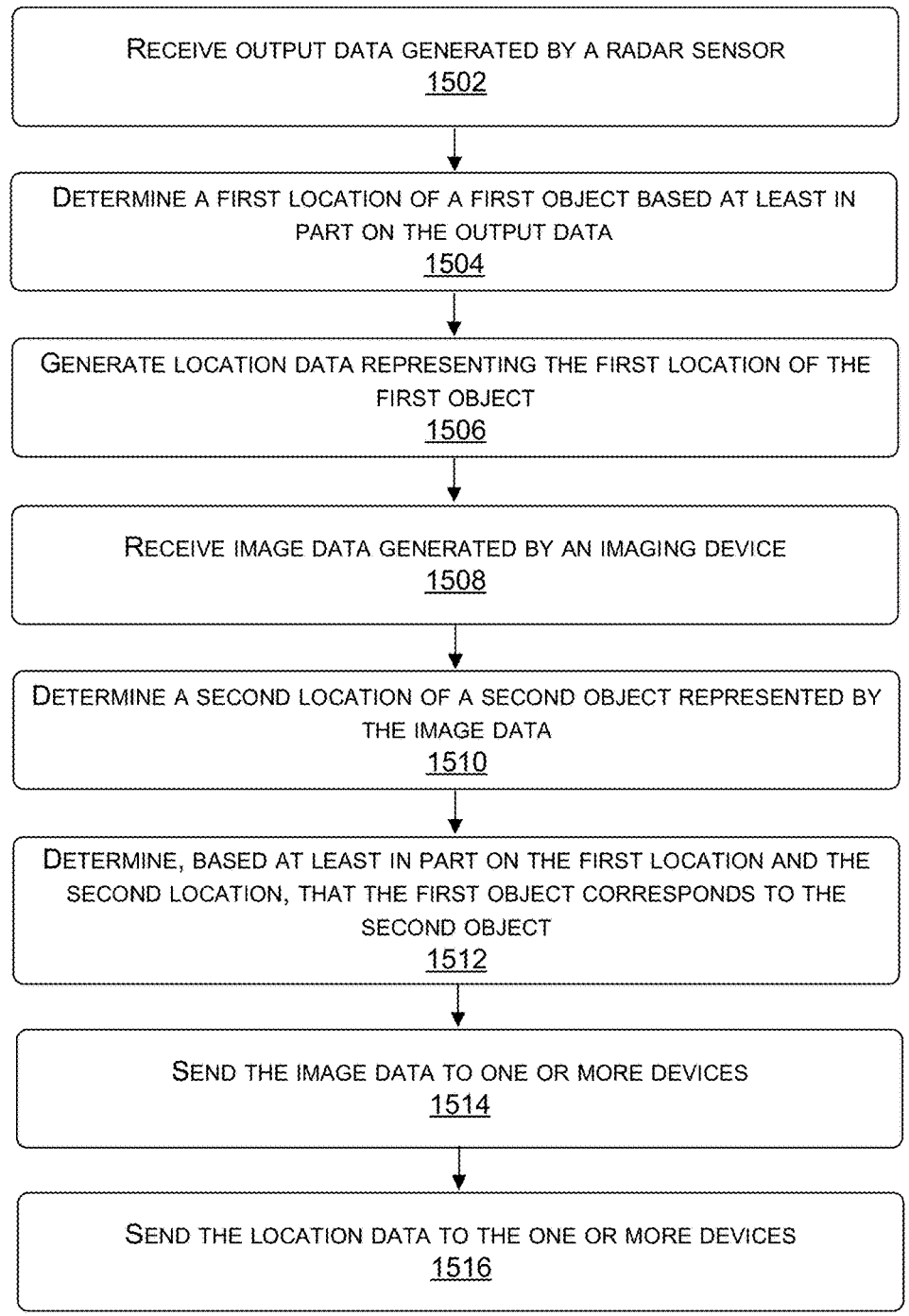
FIG. 15 is a flowchart illustrating an example process for generating location data that corresponds to an object represented by image data, according to various examples of the present disclosure.

FIG. 15 is a flowchart illustrating an example process 1500 for generating location data that corresponds to an object represented by image data, according to various examples of the present disclosure. At 1502, the process 1500 includes receiving output data generated by a location sensor and at 1504, the process 1500 includes determining a first location of a first object based at least in part on the output data. For instance, the electronic device 102 (and/or the remote system(s) 106) may receive the output data generated by the location sensor. In some examples, if the location sensor includes a radar sensor, the output data may include radar data that represents the amplitude values of signals at various bins, where each bin corresponds to a given distance from the electronic device 102 The electronic device 102 (and/or the remote system(s) 106) may then analyze the output data in order to determine the first location of the first object. The first location may include, but is not limited to, a first distance and first angle relative to the electronic device 102, first coordinates relative to the electronic device 102, first geographic coordinates, and/or the like.

At 1506, the process 1500 may include generating location data representing the first location of the first object. For instance, the electronic device 102 (and/or the remote system(s) 106) may generate the location data. In some examples, the electronic device 102 (and/or the remote system(s) 106) may then store the location data in a memory, such as a buffer memory. Additionally, in some examples, the electronic device 102 (and/or the remote system(s) 106) may determine whether the first location is within a threshold distance to the electronic device 102.

At 1508, the process 1500 may include receiving image data generated by an imaging device and at 1510, the process 1500 may include determining a second location of a second object represented by the image data. For instance, the imaging device may begin generating the image data and/or begin analyzing the image data based on the electronic device 102 detecting an event, such as the second object located within the threshold distance to the electronic device, the electronic device 102 receiving a command to generate the image data, the electronic device 102 receiving an input using an input device, and/or any other event. The electronic device 102 (and/or the remote system(s) 106) may then analyze the image data, using one or more of the processes described herein, to determine that a portion of the image data represents the second object. Additionally, the electronic device 102 (and/or the remote system(s) 106) may determine the second location of the object based on the portion of the image data. For example, each portion of the image data may correspond to a respective location. As such, the electronic device 102 (and/or the remote system(s) 106) may determine the second location based on the portion of the image data that represents the second object.

At 1512, the process 1500 may include determining, based at least in part on the first location and the second location, that the first object corresponds to the second object. For instance, the electronic device 102 (and/or the remote system(s) 106) may determine that the first object corresponds to (e.g., includes) the second object based on the first location and the second location. In some examples, to make the determination, the electronic device 102 (and/or the remote system(s) 106) may initially generate a hypothesis that the second object correlates to the first object. The electronic device 102 (and/or the remote system(s) 106) may then use predicted location(s) associated with the first object, predicted location(s) associated with the second object, the first location represented by the location data, and/or the second location determined using the image data to determine a score associated with the hypothesis. The electronic device 102 may then use the score to determine that the second object correlates to the first object. For example, the electronic device 102 may determine that the second object correlates to the first object based on the score satisfying a threshold score and/or based on the score including a highest score.

At 1514, the process 1500 may include sending the image data to one or more devices and at 1516, the process 1500 may include sending the location data to the one or more devices. For instance, and in some examples, the electronic device 102 may send, to the remote system(s) 106, the image data and the location data. Additionally, or alternatively, in some examples, the remote system(s) 106 may send, to the user device 108, the image data and the location data.

Figure 16:
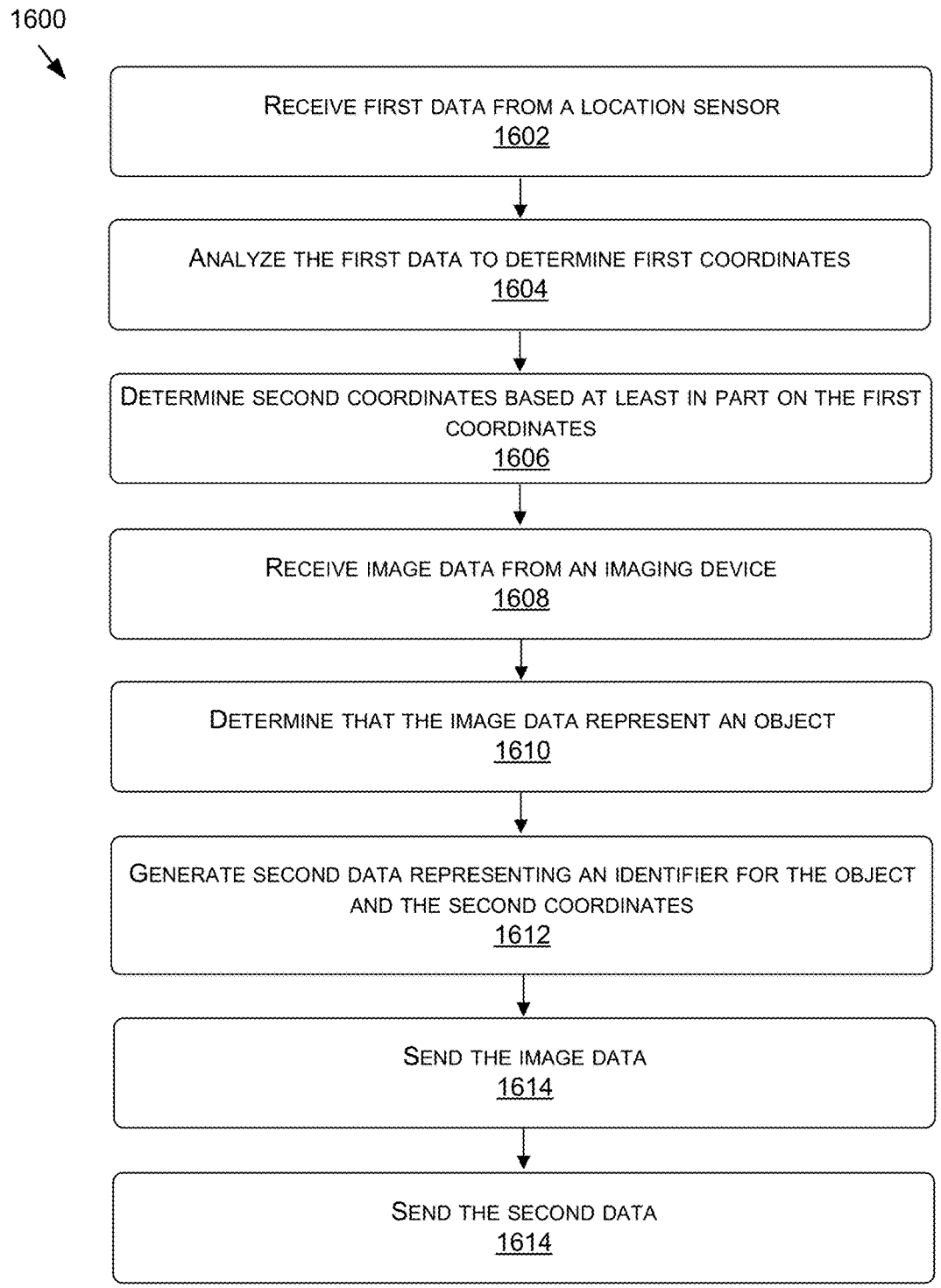
FIG. 16 is a flowchart illustrating an example process for generating location data that is associated with image data, according to various examples of the present disclosure.

FIG. 16 is a flowchart illustrating an example process 1600 for generating location data that is associated with image data, according to various examples of the present disclosure. At 1602, the process 1600 may include receiving first data from a location sensor. For instance, the electronic device 102 may receive the first data from the location sensor. In some examples, the location sensor includes a radar sensor. In such examples, the first data may represent at least a first magnitude of a frequency of a signal as received by a first antenna of the location sensor and a second magnitude of the frequency of the signal as received by a second antenna of the location sensor. Additionally, in some examples, the first data represents the magnitudes for different bins, where each bin is associated with a distance from the electronic device 102.

At 1604, the process 1600 may include analyzing the first data to determine first coordinates. For instance, the electronic device 102 may analyze the first data to determine the first coordinates, which, in some examples, may include polar coordinates (e.g., a distance and an angle). In some examples, to determine the distance, the electronic device 102 may subtract a current frame from at least one previous frame. Based on the subtraction, the electronic device 102 may generate an output that represents a magnitude of dynamic objects. The electronic device 102 may then determine that a peak magnitude corresponds to a bin and determine the distance based on the bin. Additionally, the electronic device 102 may analyze the first data to determine a phase difference. The electronic device 102 may then use a wavelength of the signal and a distance between the antennas to convert the phase difference to the angle.

At 1606, the process 1600 may include determining second coordinates based at least in part on the first coordinates. For instance, the electronic device 102 may convert the first coordinates (e.g., the polar coordinates, such as the distance and the angle) to the second coordinates. In some examples, the second coordinates include cartesian coordinates. As such, the electronic device 102 may using one or more of the algorithms described above to determine a first cartesian coordinate along a first axis and the second cartesian coordinate along a second axis by converting the polar coordinates to the cartesian coordinates.

At 1608, the process 1600 may include receiving image data from an imaging device and at 1610, the process 1600 may include determining that the image data represents an object. For instance, the electronic device 102 may generate the image data using the imaging device. The electronic device 102 may then analyze the image data, using one or more of the processes described herein, to determine that the image data represents the object. In some examples, the electronic device 102 may further analyze the image data to determine a type of the object. As described herein, the type of object may include a general object, such as a person, or the type of object may include a specific person, such as a resident of the environment.

At 1612, the process 1600 may include generating second data representing at least an identifier of the object and the second coordinates. For instance, the electronic device 102 may generate the second data that includes the identifier and the second coordinates. In some examples, the second data further represents an identifier associated with the object, the type of object, and a timestamp that relates the second data to the image data.

At 1614, the process 1600 may include sending the image data and at 1616, the process 1600 may include sending the second data. For instance, the electronic device 102 may send the image data and the second data to the remote system(s) 106. In some examples, the electronic device 102 may then continue to perform 1602-1612 in order to generate additional image data, generate additional second data, and then send the additional image data and the additional second data to the remote system(s) 106. In some examples, the electronic device 102 continues to perform 1602-1612 until detecting an event, such as the electronic device 102 no longer detecting motion, the electronic device 102 no longer detecting the object, the electronic device 102 receiving a command, the electronic device 102 determining that a threshold period of time has elapsed, and/or the like While the examples above describe the electronic device 102 as performing the process 1600, in other examples, the remote system(s) 106 may perform the process 1600. For example, the remote system(s) 106 may receive the first data and the image data from the electronic device 102. The remote system(s) 106 may then analyze the first data to determine the first coordinate and the second coordinate and analyze the image data to determine that the image data represents the object. Additionally, the electronic device 102 may generate the second data and then send the image data and the second data to the user device 108.

Figure 17A:
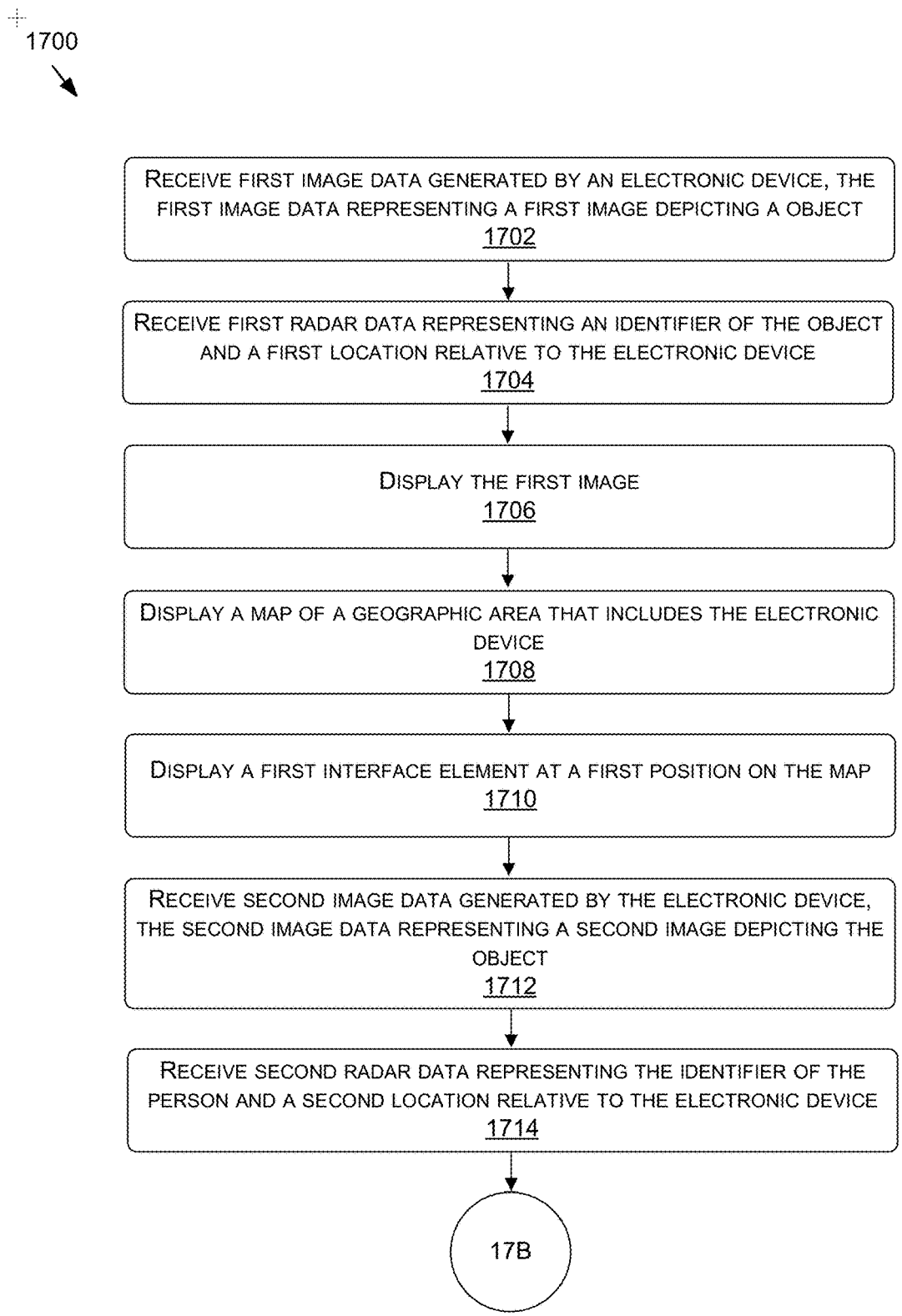

FIGS. 17A-17B are a flowchart illustrating an example process 1700 for displaying location information associated with a person along with a video depicting the person, according to various examples of the present disclosure. At 1702, the process 1700 may include receiving first image data generated by an electronic device, the first image data representing a first image depicting a person and at 1704, the process 1700 may include receiving first location data representing an identifier of the object and a first location relative to the electronic device. For instance, the user device 108 may receive, from the remote system(s) 106, the first image data and the first location data. The first location data may represent the identifier of the object, the first location, a first timestamp associated the first location, and/or additional information. In some examples, the user device 108 initially receives a notification that an event has occurred. The user device 108 may then receive an input associated with viewing the event. Based on the input, the user device 108 may then receive the first image data and the first location data.

At 1706, the process 1700 may include displaying the first image and at 1708, the process 1700 may include displaying a map of a geographic area that includes the electronic device. For instance, the user device 108 may display the first image using the user interface. The user device 108 may also display, using a portion of the user interface, the map of the geographic area. In some examples, the user device 108 stores data representing the map of the geographic area. In such examples, the user device 108 may use the data to display the map of the geographic area. In other examples, the user device 108 may receive the data representing the map, such as from the remote system(s) 106. The user device 108 may then use the received data to display the map of the geographic area.

At 1710, the process 1700 may include displaying a first interface element at a first position on the map. For instance, the user device 108 may analyze the first location and, based on the analysis, determine the first position. In some examples, the user device 108 determines the first position using a scale associated with the map. For example, and using the scale, the user device 108 may determine a first distance along a first axis that is associated with the first location and a second distance along a second axis that is associated with the first location. The user device 108 may then display the first interface element at the first position. In some examples, the first interface element may include first characteristic(s) indicating that the first location is a current location of the object. In some examples, the user device 108 displays the first interface element according to the first timestamp. For example, the user device 108 may display the first interface element, using the first timestamp, in order to synchronize the displaying of the first image with the displaying of the first interface element.

At 1712, the process 1700 may include receiving second image data generated by the electronic device, the second image data representing a second image depicting the object and at 1714, the process 1700 may include receiving second location data representing the identifier of the object and a second location relative to the electronic device. For instance, the user device 108 may receive, from the remote system(s) 106, the second image data and the second location data. The second location data may represent the identifier of the object, the second location, a second timestamp associated the second location, and/or additional information. In some examples, the user device 108 may continue to receive new image data and/or new location data until an event occurs. For example, the user device 108 may continue to receive new image data and/or new location data until the electronic device 102 no longer detects the object, a threshold period of time elapses, the user device 108 receives an input to no longer display the content, and/or any other event.

At 1716, the process 1700 may include displaying the second image and at 1718, the process 1700 may include displaying a second interface element at a second position on the map, the second position representing the second location. For instance, the user device 108 may display the second image using the user interface. The user device 108 may also analyze the second location and, based on the analysis, determine the second position. In some examples, the user device 108 determines the second position using the scale associated with the map. For example, and using the scale, the user device 108 may determine a first distance along the first axis that is associated with the second location and a second distance along the second axis that is associated with the second location. The user device 108 may then display the second interface element at the second position. In some examples, the second interface element may include the first characteristic(s) indicating that the second location is now a current location of the person. Additionally, in some examples, the user device 108 may change the first interface element to include second characteristic(s). In some examples, the user device 108 displays the second interface element according to the second timestamp. For example, the user device 108 may display the second interface element, using the second timestamp, in order to synchronize the displaying of the second image with the displaying of the second interface element.

Figure 18:
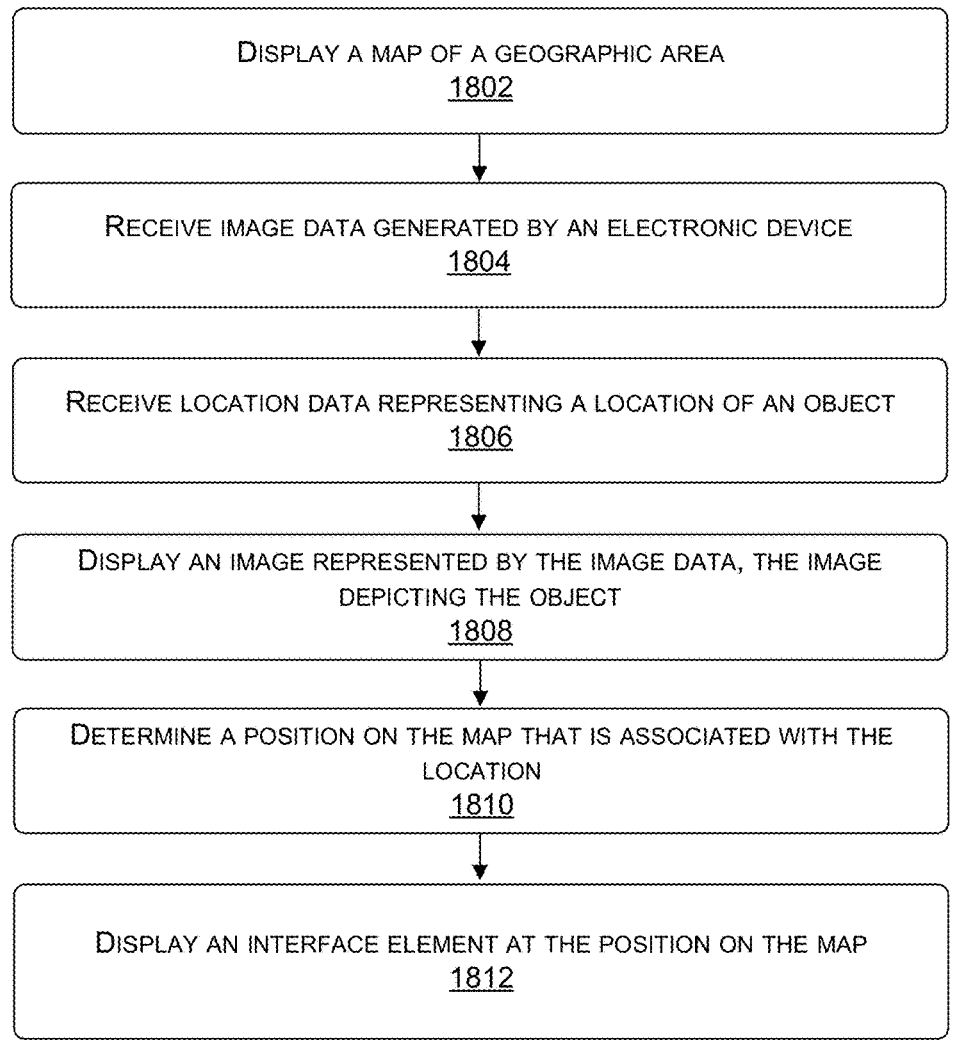
FIG. 18 is a flowchart illustrating an example process for displaying location information associated with an object along with a video depicting the object, according to various examples of the present disclosure.

FIG. 18 is a flowchart illustrating an example process 1800 for displaying location information associated with an object along with a video depicting the object, according to various examples of the present disclosure. At 1802, the process 1800 may include displaying a map of a geographic area. For instance, the user device 108 may display the map. The map may be of the geographic area that includes a location of an electronic device.

At 1804, the process 1800 may include receiving image data generated by an electronic device and at 1806, the process 1800 may include receiving location data representing a location. For instance, the user device 108 may receive, from the remote system(s) 106, the image data and the location data. The location data may represent the location of the object relative to the electronic device, an identifier associated with the object, a type associated with the object, a timestamp associated with the location, and/or any other information. In some examples, the user device 108 initially receives a notification that an event has occurred. The user device 108 may then receive an input associated with viewing the event. Based on the input, the user device 108 may then receive the image data and the location data.

At 1808, the process 1800 may include displaying an image represented by the image data, the image depicting the object. For instance, the user device 108 may display the image depicting the object. In some instances, the image depicts the object at a location that corresponds to the location represented by the location data.

At 1810, the process 1800 may include determining a position on the map that is associated with the location and at 1812, the process 1800 may include displaying an interface element at the position on the map. For instance, the user device 108 may analyze the location and, based on the analysis, determine the position. In some examples, the user device 108 determines the position using a scale associated with the map. For example, and using the scale, the user device 108 may determine a first distance along a first axis that is associated with the location and a second distance along a second axis that is associated with the location. Additionally, or alternatively, in some examples, the location data may indicate the position on the map. The user device 108 may then display the interface element at the position. In some examples, the interface element may include characteristic(s) indicating that the location is a current location of the object.

In some examples, the example process 1800 may continue to repeat such that the user device 108 continues to receive new image data, receive new radar data, display new image(s) represented by the new image data, determine new position(s) on the map that are associated with new location(s) represented by the new radar data, and display new interface element(s) at the new position(s). This way, the user is able to use the user device 108 to not only watch a video depicting the object moving around an environment, but also determine the locations of the object.

FIG. 19 is a flowchart illustrating an example process 1900 for creating a map of a geographic area that includes the electronic device 102, according to various examples of the present disclosure. At 1902, the process 1900 may include determining a first location associated with an environment. For instance, in some examples, the user device 108 may determine the first location by receiving an input representing the first location, retrieving data representing the first location from memory of the user device 108, and/or receiving, from the remote system(s) 106, data representing the first location. Additionally, in some examples, the remote system(s) 106 may determine the first location by receiving, from the user device 108, data representing the first location and/or retrieving data representing the first location from memory of the remote system(s) 106. In either of the examples, the first location may include, but is not limited to, an address, a geographic area (e.g., the street, city, county, state, and/or the like), geographic coordinates (e.g., GPS coordinates), and/or the like.

At 1904, the process 1900 may include receiving image data representing an image depicting a geographic area that includes the first location. For instance, in some examples, the user device 108 may receive the image data from the remote system(s) 106 and/or the third-party system(s) 1212. Additionally, in some examples, the remote system(s) 106 may receive the image data from the third-party system(s) 1212. In either of the examples, the remote system(s) 106, the user device 108, and/or the third-party system(s) 1212 may scale the image. For example, the remote system(s) 106, the user device 108, and/or the third-party system(s) 1212 may determine an altitude associated with the first location. The remote system(s) 106, the user device 108, and/or the third-party system(s) 1212 may then scale the image based on the altitude, which is described in more detail above.

At 1906, the process 1900 may include determining a position on the image that is associated with a second location of an electronic device. For instance, in some examples, the user device 108 may determine position by receiving, from a user, input representing the position on the image. Additionally, in some examples, the remote system (s) 106 may determine the position by receiving, from the user device 108, data representing the position on the image. In either of the examples, the user device 108 and/or the remote system(s) 106 may then store data representing the position on the image. The user device 108 and/or the remote system(s) 106 may also store data representing a height associated with the electronic device 102.

At 1908, the process 1900 may include determining an orientation of the electronic device with respect to the image. For instance, in some examples, the user device 108 may determine the orientation by receiving, from the user, input representing the orientation of the electronic device 102. For example, the user may select a portion of the image that is located directly in front of the electronic device 102. Additionally, in some examples, the remote system(s) 106 may determine the orientation by receiving, from the user device 108, data representing the orientation. In either of the examples, the user device 108 and/or the remote system(s) 106 may then store data representing the orientation of the electronic device 102. Additionally, in some examples, the user device 108 and/or the remote system(s) 106 may change an orientation of the image based on the orientation of the electronic device 102.

At 1910, the process 1900 may include causing a storing of the image data representing the image. For instance, in some examples, the user device 108 may cause the storing by storing the image data in the memory of the user device 108, sending the image data to the remote system(s) 106 for storing, and/or storing a Universal Resource Locator (URL) for the image data. Additionally, in some examples, the remote system(s) 106 may cause the storing of the image data by storing the image data in the memory of the remote system(s) 106. In either of the examples, the user device 108 and/or the remote system(s) 106 may then use the image data to later provide the motion information described herein.

Figure 20:
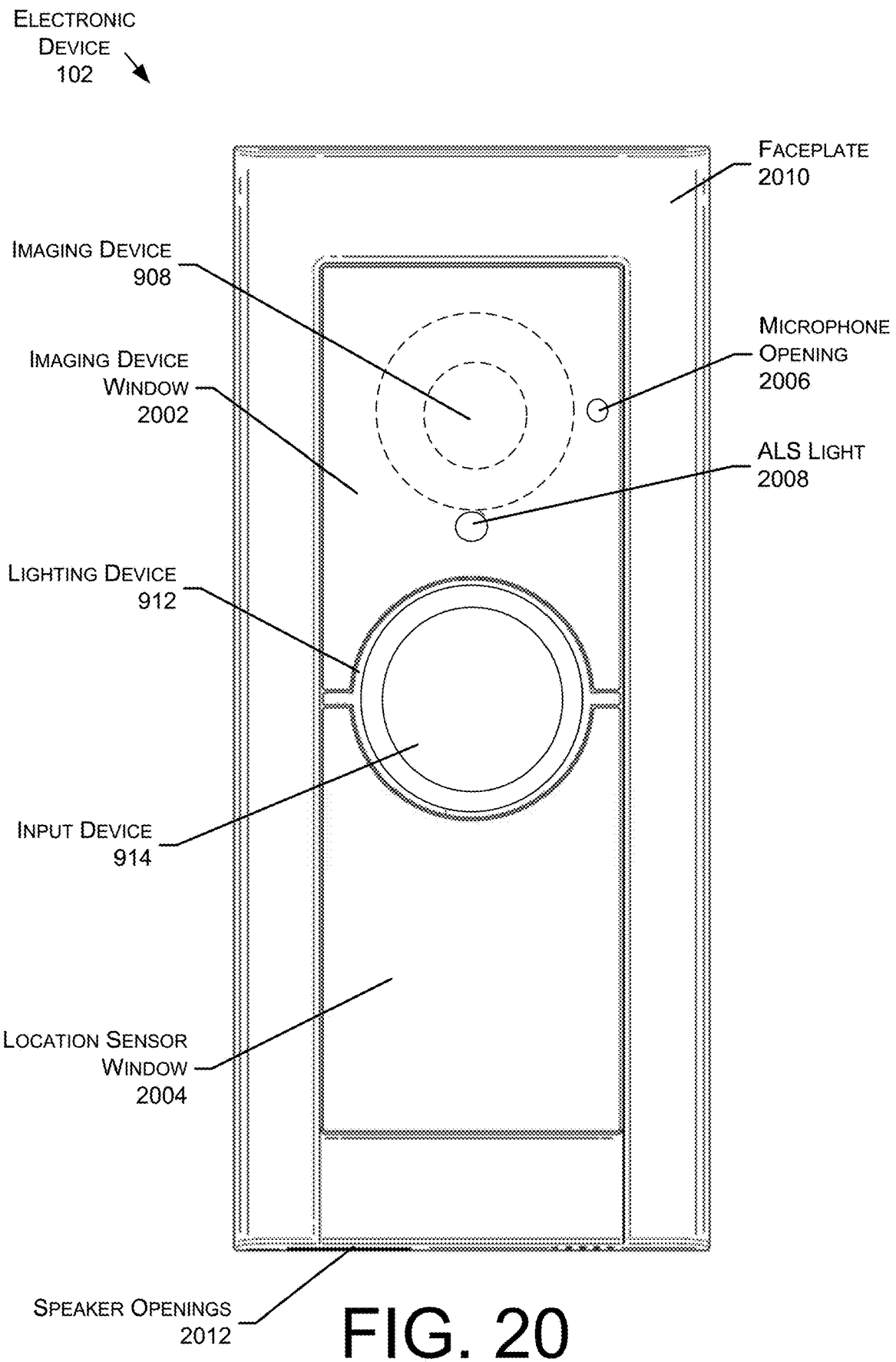
FIG. 20 illustrates an example of an electronic device, according to various examples of the present disclosure.

FIG. 20 illustrates an example of the electronic device 102, according to various examples of the present disclosure. As shown, the electronic device 102 may include at least the imaging device 908, the lighting device 912, the input device 914, an imaging device window 2002, a location sensor window 2004, a microphone opening 2006, an approach lighting system (ALC) light 2008, a faceplate 2010, and speaker openings 2012.

In the example of FIG. 20, the lighting device 912 includes a light ring that is configured to surround the input device 912. This way, during times of low ambient light, the lighting device 912 may illuminate and cause the input device 912 to be visible. The imaging device window 908 may include a transparent material, such as glass, plastic, and/or any other type of transparent material. This way, the imaging device 908, which is located behind the imaging device window 908, is able to capture images.

The electronic device 102 further includes the microphone opening 2006 and the speaker openings 2012. The microphone opening 2006 may allow for sound to travel from outside of the electronic device 102 to inside of the electronic device 102 and to the microphone(s) 920. Additionally, the speaker openings 2012 may be configured to allow for sound that is output by the speaker(s) 918 to travel from within the electronic device 102 to outside of the electronic device 102.

The location sensor window 2004 may include a material that is optimized for various location sensor(s) 910. For example, if the location sensor(s) 910 include a radar sensor, then the location sensor window 2004 may be optimized for radar. In the example of FIG. 20, the location sensor 910, which is located behind the location sensor window 2004, is located towards a bottom end of the electronic device 102 while the imaging device 908 is located towards a top end of the electronic device 102. The electronic device 102 may include such a configuration such that the imaging device 908 and the location sensor 910 do not interfere with one another.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A video doorbell comprising:
an imaging device;
a radar sensor comprising at least a first antenna and a second antenna;
one or more processors; and
one or more non-transitory computer-readable media storing instructions that, when executed by the one or more processors, cause the video doorbell to perform operations comprising:
generating, using the radar sensor, first radar data representing at least a first magnitude value for a first frequency bin of a signal, determining a distance value based on the first frequency bin associated with the first magnitude value,
determining a phase difference associated with the signal as received by the first antenna and the second antenna,
determining an angle value based at least in part on the phase difference, determining, based at least in part on the distance value and the angle value, a first location associated with a first radar object,
determining, based at least in part on the first radar data, a first speed associated with the first radar object,
determining, based at least in part on the first location and the first speed, a predicted second location for the first radar object,
generating image data using the imaging device,
analyzing the image data in order to determine that the image data represents a first image object,
determining an object type associated with the first image object, determining, based at least in part on the image data, a third location associated with the first image object,
determining, based at least in part on comparing the third location associated with the first image object to the predicted second location for the first radar object, that the first image object corresponds to the first radar object,
generating, using the radar sensor, second radar data,
determining, based at least in part on the second radar data, a fourth location associated with the first radar object,
sending the image data to one or more computing devices; and
based on the determining that the first image object corresponds to the first radar object, sending location data indicating the fourth location to the one or more computing devices.

2. The video doorbell of claim 1, wherein the one or more non-transitory computer-readable media store instructions that, when executed by the one or more processors, cause the video doorbell to perform operations comprising:
determining a first hypothesis associating the first radar object with the first image object, and
updating, based at least in part on comparing the third location associated with the first image object to the predicted second location for the first radar object, a first score for the first hypothesis,
wherein the determining that the first image object corresponds to the first radar object is based at least in part on the updating of the first score for the first hypothesis.

3. The video doorbell of claim 2, wherein the one or more non-transitory computer-readable media store instructions that, when executed by the one or more processors, cause the video doorbell to perform operations comprising:
comparing the first score for the first hypothesis to a first threshold, wherein the determining that the first image object corresponds to the first radar object is based at least in part on the comparing of the first score for the first hypothesis to the first threshold.

4. The video doorbell of claim 2, wherein the one or more non-transitory computer-readable media store instructions that, when executed by the one or more processors, cause the video doorbell to perform operations comprising:
comparing the first score for the first hypothesis to a second score for a second hypothesis,
wherein the determining that the first image object corresponds to the first radar object is based at least in part on the comparing of the first score for the first hypothesis to the second score.

5. An electronic device comprising:
a camera;
a location sensor;
one or more processors; and
one or more non-transitory computer-readable media storing instructions that, when executed by the one or more processors, cause the electronic device to perform operations comprising:
generating, using the location sensor, first sensordata,
determining, based at least in part on the first sensor data, a first location and a first speed associated with a first sensorobject,
determining, based at least in part on the first location and the first speed, a predicted second location for the first sensor object,
generating image data using the camera,
determining, based at least in part on the image data, a third location associated with a first image object,
determining, based at least in part on comparing the third location associated with the first image object to the predicted second location for the first sensor object, that the first image object corresponds to the first sensor object,
generating, using the location sensor, second sensor data,
determining, based at least in part on the second sensor data, a fourth location associated with the first sensor object,
sending the image data to one or more computing devices, and
based on the determining that the first image object corresponds to the first sensor object, sending the first data indicating the fourth location to the one or more computing devices.

6. The electronic device of claim 5, wherein the one or more non-transitory computer-readable media store instructions that, when executed by the one or more processors, cause the electronic device to perform operations comprising:
determining a first hypothesis associating the first sensorobject with the first image object, and
updating, based at least in part on comparing the third location associated with the first image object to the predicted second location for the first sensor object, a first score for the first hypothesis,
wherein the determining that the first image object corresponds to the first sensor object is based at least in part on the updating of the first score for the first hypothesis.

7. The electronic device of claim 6, wherein the one or more non-transitory computer-readable media store instructions that, when executed by the one or more processors, cause the electronic device to perform operations comprising:
comparing the first score for the first hypothesis to a first threshold,
wherein the determining that the first image object corresponds to the first sensor object is based at least in part on the comparing of the first score for the first hypothesis to the first threshold.

8. The electronic device of claim 6, wherein the one or more non-transitory computer-readable media store instructions that, when executed by the one or more processors, cause the electronic device to perform operations comprising:
comparing the first score for the first hypothesis to a second score for a second hypothesis,
wherein the determining that the first image object corresponds to the first sensor object is based at least in part on the comparing of the first score for the first hypothesis to the second score.

9. An electronic device comprising:
a camera;
a location sensor;
one or more processors; and
one or more non-transitory computer-readable media storing instructions that, when executed by the one or more processors, cause the electronic device to perform operations comprising:
determining, based at least in part on first sensordata generated by the location sensor, a first location and a first speed associated with a first sensor object,
determining, based at least in part on the first location and the first speed, a predicted second location for the first sensor object,
generating image data using the camera,
determining, based at least in part on the image data, a third location associated with a first image object,
comparing the third location associated with the first image object to the predicted second location for the first sensor object, and
based on the comparing of the third location to the predicted second location, sending first data to one or more computing devices.

10. The electronic device of claim 9, wherein the one or more non-transitory_computer-readable media store instructions that, when executed by the one or more processors, cause the electronic device to perform operations comprising:
determining a first hypothesis associating the first sensor object with the first image object, and
updating, based at least in part on comparing the third location associated with the first image object to the predicted second location for the first sensorobject, a first score for the first hypothesis, and
determining that the first image object corresponds to the first sensor object based at least in part on the updating of the first score for the first hypothesis.

11. The electronic device of claim 10, wherein the one or more non-transitory computer-readable media store instructions that, when executed by the one or more processors, cause the electronic device to perform operations comprising:
comparing the first score for the first hypothesis to a first threshold, and determining that the first image object corresponds to the first sensor object based at least in part on the comparing of the first score for the first hypothesis to the first threshold.

12. The electronic device of claim 10, wherein the one or more non-transitory computer-readable media store instructions that, when executed by the one or more processors, cause the electronic device to perform operations comprising:
   comparing the first score for the first hypothesis to a second score for a second hypothesis, and
   determining that the first image object corresponds to the first sensor object based at least in part on the comparing of the first score for the first hypothesis to the second score.

13. The electronic device of claim 9, wherein the electronic device comprises a video doorbell.

14. The electronic device of claim 9, wherein the location sensor comprises a radar sensor.

15. The electronic device of claim 9, wherein the one or more non-transitory computer-readable media store instructions that, when executed by the one or more processors, cause the electronic device to perform operations comprising:
   generating, using the location sensor, second se nsordata, and
   determining, based at least in part on the second se nsordata, a fourth location associated with the first sensor object, and
   wherein the first data indicates the fourth location.

16. The electronic device of claim 9, wherein the one or more non-transitory computer-readable media store instructions that, when executed by the one or more processors, cause the electronic device to perform operations comprising:
   determining, based at least in part on previous image data generated by the camera, a fourth location and a second speed associated with the first image object,
   determining, based at least in part on the fourth location and the second speed, a predicted fifth location for the first image object,
   comparing the first location associated with the first sensor object to the predicted fifth location for the first image object, and
   determining that the first image object corresponds to the first sensor object based at least in part on:
      the comparing of the third location associated with the first image object to the predicted second location for the first sensor object, and
      the comparing of the first location associated with the first sensor object to the predicted fifth location for the first image object.

17. An electronic device comprising:
a camera;
a location sensor;
one or more processors; and
one or more non-transitory computer-readable media storing instructions that, when executed by the one or more processors, cause the electronic device to perform operations comprising:
   determining, based at least in part on first image data generated by the camera, a first location and a first speed associated with a first image object,
   determining, based at least in part on the first location and the first speed, a predicted second location for the first image object,
   determining, based at least in part on first se nsordata generated by the location sensor, a third location associated with a first sensor object,
   comparing the third location associated with the first se nsorobject to the predicted second location for the first image object, and
   based on the comparing of the third location to the predicted second location, sending first data to one or more computing devices.

18. The electronic device of claim 17, wherein the electronic device comprises a video doorbell.

19. The electronic device of claim 17, wherein the location sensor comprises a radar sensor.

20. The electronic device of claim 17, wherein the first data indicates the third location.

* * * * *